US008713025B2

(12) United States Patent  
Eder

(10) Patent No.: US 8,713,025 B2
(45) Date of Patent: *Apr. 29, 2014

(54) COMPLETE CONTEXT SEARCH SYSTEM

(75) Inventor: Jeffrey Scott Eder, Mill Creek, WA (US)

(73) Assignee: Square Halt Solutions, Limited Liability Company, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/300,605

(22) Filed: Nov. 20, 2011

(65) Prior Publication Data

US 2012/0066217 A1   Mar. 15, 2012

Related U.S. Application Data

(63) Continuation-in-part of application No. 12/114,784, filed on May 4, 2008, and a continuation-in-part of application No. 12/497,656, filed on Jul. 4, 2009, which is a continuation of application No. 11/094,171, filed on Mar. 31, 2005, now Pat. No. 7,730,063.

(51) Int. Cl.
*G06F 17/30* (2006.01)

(52) U.S. Cl.
USPC ............................. 707/741; 707/711; 707/748

(58) Field of Classification Search
USPC .......................................... 707/741, 711, 748
See application file for complete search history.

(56) References Cited

U.S. PATENT DOCUMENTS

| 3,749,892 | A | 7/1973 | Stenning |
| 3,933,305 | A | 1/1976 | Murphy |
| 4,626,992 | A | 12/1986 | Greaves et al. |
| 4,656,592 | A | 4/1987 | Spaanenburg et al. |
| 4,821,220 | A | 4/1989 | Duisberg |
| 4,839,804 | A | 6/1989 | Roberts et al. |
| 4,989,141 | A | 1/1991 | Lyons |
| 5,128,861 | A | 7/1992 | Kagami |
| 5,191,522 | A | 3/1993 | Bosco et al. |
| 5,193,055 | A | 3/1993 | Brown |
| 5,224,034 | A | 6/1993 | Katz |
| 5,237,495 | A | 8/1993 | Morii |
| 5,237,496 | A | 8/1993 | Kagami |
| 5,311,421 | A | 5/1994 | Nomura et al. |
| 5,317,504 | A | 5/1994 | Nakayama |
| 5,361,201 | A | 11/1994 | Jost et al. |

(Continued)

FOREIGN PATENT DOCUMENTS

| EP | 0 587 290 A2 | 3/1994 |
| GB | 2 253 081 A | 2/1992 |

OTHER PUBLICATIONS

Xi, Wensi, Iterative Computing over a Unified Relationship Matrix for Information Integration, pp. 1-145, Jun. 2006, Virginia Polytechnic University, USA.

(Continued)

*Primary Examiner* — Thanh-Ha Dang

(74) *Attorney, Agent, or Firm* — Brundidge & Stanger, P.C.

(57) ABSTRACT

A system, method and computer program product for developing an entity context frame or situation summary before using said context frame/situation summary to develop an index, perform a context search and return prioritized results. The search results may comprise a plurality of health related data where said health related data comprises a plurality of microbiome data.

28 Claims, 26 Drawing Sheets

(56) References Cited

U.S. PATENT DOCUMENTS

| | | |
|---|---|---|
| 5,377,116 A | 12/1994 | Wayne et al. |
| 5,377,122 A | 12/1994 | Werner et al. |
| 5,406,477 A | 4/1995 | Harhen |
| 5,408,411 A | 4/1995 | Nakamura et al. |
| 5,414,621 A | 5/1995 | Hough |
| 5,459,659 A | 10/1995 | Takenaka |
| 5,471,611 A | 11/1995 | McGregor |
| 5,485,600 A | 1/1996 | Joseph et al. |
| 5,563,988 A | 10/1996 | Maes et al. |
| 5,621,790 A | 4/1997 | Grossman et al. |
| 5,644,727 A | 7/1997 | Atkins |
| 5,649,181 A | 7/1997 | French et al. |
| 5,666,288 A | 9/1997 | Jones et al. |
| 5,668,591 A | 9/1997 | Shintani |
| 5,677,997 A | 10/1997 | Talatik |
| 5,680,305 A | 10/1997 | Agpar |
| 5,694,539 A | 12/1997 | Haley et al. |
| 5,704,045 A | 12/1997 | King et al. |
| 5,704,055 A | 12/1997 | George et al. |
| 5,706,495 A | 1/1998 | Chadha et al. |
| 5,737,581 A | 4/1998 | Keane |
| 5,742,775 A | 4/1998 | King |
| 5,765,154 A | 6/1998 | Horikiri |
| 5,768,475 A | 6/1998 | Godbole et al. |
| 5,774,761 A | 6/1998 | Rai |
| 5,774,873 A | 6/1998 | Berent et al. |
| 5,783,909 A | 7/1998 | Hochstein |
| 5,790,778 A | 8/1998 | Bush et al. |
| 5,794,219 A | 8/1998 | Brown |
| 5,802,501 A | 9/1998 | Graff |
| 5,809,282 A | 9/1998 | Cooper |
| 5,812,404 A | 9/1998 | Hamalainen et al. |
| 5,812,987 A | 9/1998 | Luskin et al. |
| 5,812,988 A | 9/1998 | Sandretto |
| 5,819,237 A | 10/1998 | Garman |
| 5,825,653 A | 10/1998 | Huovila et al. |
| 5,831,853 A | 11/1998 | Bobrow et al. |
| 5,844,563 A * | 12/1998 | Harada et al. ................. 345/420 |
| 5,852,811 A | 12/1998 | Atkins |
| 5,875,431 A | 2/1999 | Heckman et al. |
| 5,889,823 A | 3/1999 | Agazzi et al. |
| 5,905,789 A | 5/1999 | Will |
| 5,917,891 A | 6/1999 | Will |
| 5,933,345 A | 8/1999 | Martin et al. |
| 5,938,594 A | 8/1999 | Poon et al. |
| 5,950,182 A | 9/1999 | Godbole et al. |
| 5,991,758 A | 11/1999 | Ellard |
| 5,995,945 A | 11/1999 | Notani et al. |
| 5,997,167 A | 12/1999 | Crater et al. |
| 6,043,867 A | 3/2000 | Saban |
| 6,064,971 A | 5/2000 | Hartnett |
| 6,064,972 A | 5/2000 | Jankowitz et al. |
| 6,065,003 A | 5/2000 | Sedluk |
| 6,078,901 A | 6/2000 | Ching |
| 6,092,056 A | 7/2000 | Tull, Jr. et al. |
| 6,112,188 A | 8/2000 | Hartnett |
| 6,125,355 A | 9/2000 | Bekaert et al. |
| 6,134,536 A | 10/2000 | Shepherd |
| 6,148,293 A | 11/2000 | King |
| 6,167,117 A | 12/2000 | Will |
| 6,173,276 B1 | 1/2001 | Kant |
| 6,189,011 B1 | 2/2001 | Lim et al. |
| 6,207,936 B1 | 3/2001 | de Waard et al. |
| 6,209,124 B1 | 3/2001 | Vermeire et al. |
| 6,219,649 B1 | 4/2001 | Jameson |
| 6,230,486 B1 | 5/2001 | Yasui et al. |
| 6,249,784 B1 | 6/2001 | Macke et al. |
| 6,263,314 B1 | 7/2001 | Donner |
| 6,266,605 B1 | 7/2001 | Yasui et al. |
| 6,272,449 B1 | 8/2001 | Passera |
| 6,278,899 B1 | 8/2001 | Piche et al. |
| 6,278,981 B1 | 8/2001 | Dembo et al. |
| 6,282,531 B1 | 8/2001 | Haughton et al. |
| 6,308,162 B1 | 10/2001 | Ouimet et al. |
| 6,315,735 B1 | 11/2001 | Joeken et al. |
| 6,317,787 B1 | 11/2001 | Boyd et al. |
| 6,327,590 B1 | 12/2001 | Chidlovskii et al. |
| 6,332,130 B1 | 12/2001 | Notani et al. |
| 6,332,163 B1 | 12/2001 | Bowman-Amuah |
| 6,337,552 B1 | 1/2002 | Inoue et al. |
| 6,362,589 B1 | 3/2002 | Inoue et al. |
| 6,366,934 B1 | 4/2002 | Cheng et al. |
| 6,377,263 B1 | 4/2002 | Falacara et al. |
| 6,418,448 B1 | 7/2002 | Sarkar |
| 6,487,459 B1 | 11/2002 | Martin et al. |
| 6,490,560 B1 | 12/2002 | Ramaswamy et al. |
| 6,490,579 B1 | 12/2002 | Gao et al. |
| 6,507,353 B1 | 1/2003 | Huard et al. |
| 6,520,861 B2 | 2/2003 | Shoji et al. |
| 6,564,213 B1 | 5/2003 | Ortega et al. |
| 6,584,507 B1 | 6/2003 | Bradley et al. |
| 6,625,577 B1 | 9/2003 | Jameson |
| 6,633,865 B1 | 10/2003 | Liao |
| 6,639,591 B2 | 10/2003 | Shoji et al. |
| 6,654,389 B1 | 11/2003 | Brunheroto et al. |
| 6,654,469 B1 | 11/2003 | Nelson et al. |
| 6,654,649 B2 | 11/2003 | Treiber et al. |
| 6,667,593 B2 | 12/2003 | Inoue et al. |
| 6,671,773 B2 | 12/2003 | Kazar et al. |
| 6,684,204 B1 | 1/2004 | Lal |
| 6,700,923 B1 | 3/2004 | Dowling et al. |
| 6,704,032 B1 | 3/2004 | Falcon et al. |
| 6,732,095 B1 | 5/2004 | Warshavsky et al. |
| 6,735,483 B2 | 5/2004 | Martin et al. |
| 6,738,677 B2 | 5/2004 | Martin et al. |
| 6,738,753 B1 | 5/2004 | Hogan |
| 6,741,973 B1 | 5/2004 | Dove et al. |
| 6,745,114 B2 | 6/2004 | Elgin |
| 6,785,651 B1 | 8/2004 | Wang |
| 6,795,811 B1 | 9/2004 | Epstein |
| 6,816,753 B2 | 11/2004 | Sakamoto et al. |
| 6,823,253 B2 | 11/2004 | Brunell |
| 6,826,521 B1 | 11/2004 | Hess et al. |
| 6,826,531 B2 | 11/2004 | Fukada |
| 6,836,719 B2 | 12/2004 | Andersson et al. |
| 6,836,773 B2 | 12/2004 | Tamayo et al. |
| 6,866,024 B2 | 3/2005 | Rizzoni et al. |
| 6,876,992 B1 | 4/2005 | Sullivan |
| 6,892,155 B2 | 5/2005 | Gee et al. |
| 6,909,708 B1 | 6/2005 | Krishnaswamy et al. |
| 6,910,135 B1 | 6/2005 | Grainger |
| 6,934,931 B2 | 8/2005 | Plumer et al. |
| 6,941,499 B1 | 9/2005 | Sung et al. |
| 6,947,870 B2 | 9/2005 | Zhu et al. |
| 6,947,988 B1 | 9/2005 | Saleh |
| 6,961,731 B2 | 11/2005 | Holbrook |
| 7,006,939 B2 | 2/2006 | Voorakaranam et al. |
| 7,006,992 B1 | 2/2006 | Packwood |
| 7,024,589 B2 | 4/2006 | Hartman et al. |
| 7,039,475 B2 | 5/2006 | Sayyarrodsari et al. |
| 7,047,089 B2 | 5/2006 | Martin et al. |
| 7,047,227 B2 | 5/2006 | Batachia et al. |
| 7,050,866 B2 | 5/2006 | Martin et al. |
| 7,069,204 B1 | 6/2006 | Solden et al. |
| 7,076,713 B1 | 7/2006 | Hess |
| 7,080,207 B2 | 7/2006 | Bergsten |
| 7,089,237 B2 | 8/2006 | Turnbull et al. |
| 7,089,518 B2 | 8/2006 | Bair et al. |
| 7,091,779 B2 | 8/2006 | Sahlman |
| 7,096,299 B2 | 8/2006 | Meynard |
| 7,142,307 B1 | 11/2006 | Stark |
| 7,146,353 B2 | 12/2006 | Garg et al. |
| 7,155,390 B2 | 12/2006 | Fukada |
| 7,155,510 B1 | 12/2006 | Kaplan |
| 7,162,379 B2 | 1/2007 | Jang et al. |
| 7,170,510 B2 | 1/2007 | Kawahara et al. |
| 7,181,438 B1 | 2/2007 | Szabo |
| 7,188,637 B2 | 3/2007 | Dreyer et al. |
| 7,194,070 B2 | 3/2007 | Starbuck et al. |
| 7,216,121 B2 | 5/2007 | Bachman et al. |
| 7,219,040 B2 | 5/2007 | Renou et al. |
| 7,219,073 B1 | 5/2007 | Taylor et al. |
| 7,219,087 B2 | 5/2007 | Panfilov et al. |
| 7,219,105 B2 | 5/2007 | Kummamuru et al. |

(56) References Cited

U.S. PATENT DOCUMENTS

| | | |
|---|---|---|
| 7,224,761 B2 | 5/2007 | Popa |
| 7,233,933 B2 | 6/2007 | Horvitz et al. |
| 7,246,080 B2 | 7/2007 | Feldman et al. |
| 7,249,007 B1 | 7/2007 | Dutton |
| 7,249,342 B2 | 7/2007 | Pack et al. |
| 7,251,582 B2 | 7/2007 | Singh et al. |
| 7,260,498 B2 | 8/2007 | Battenfelder et al. |
| 7,283,982 B2 | 10/2007 | Pednault |
| 7,299,080 B2 | 11/2007 | Acosta et al. |
| 7,347,365 B2 | 3/2008 | Rowe |
| 7,426,423 B2 | 9/2008 | Schneider et al. |
| 7,542,932 B2 | 6/2009 | Chalermkraivuth et al. |
| 7,561,158 B2 | 7/2009 | Abe et al. |
| 7,590,619 B2 | 9/2009 | Hurst-hiller et al. |
| 7,599,870 B2 | 10/2009 | Merkoulovitch et al. |
| 7,603,112 B2 | 10/2009 | Huomo et al. |
| 7,617,141 B2 | 11/2009 | Chiappetta et al. |
| 7,617,142 B2 | 11/2009 | Markov et al. |
| 7,617,200 B2 | 11/2009 | Budzik et al. |
| 7,627,565 B2 | 12/2009 | Budzik et al. |
| 7,702,615 B1 | 4/2010 | DeLurgio et al. |
| 7,716,108 B2 | 5/2010 | Chiappetta et al. |
| 7,716,158 B2 | 5/2010 | McConnel |
| 7,716,333 B2 | 5/2010 | Bowman-Amuah |
| 7,725,374 B2 | 5/2010 | Van Erlach et al. |
| 7,769,684 B2 | 8/2010 | Del Bianco et al. |
| 7,774,179 B2 | 8/2010 | Guirguis |
| 7,778,856 B2 | 8/2010 | Reynolds et al. |
| 7,778,910 B2 | 8/2010 | Ballow et al. |
| 7,788,195 B1 | 8/2010 | Subramanian et al. |
| 7,799,761 B2 | 9/2010 | Fein |
| 7,822,738 B2 | 10/2010 | Andersen et al. |
| 7,827,557 B2 | 11/2010 | Zhu et al. |
| 7,836,002 B2 | 11/2010 | Macbeth et al. |
| 7,856,441 B1 | 12/2010 | Kraft et al. |
| 7,881,956 B2 | 2/2011 | Kenyon et al. |
| 7,899,695 B2 | 3/2011 | Kenyon et al. |
| 7,899,723 B2 | 3/2011 | Ostergard et al. |
| 7,912,769 B2 | 3/2011 | Ostergard |
| 7,921,061 B2 | 4/2011 | Rangarajan et al. |
| 7,933,863 B2 | 4/2011 | Werner |
| 2001/0009590 A1 | 7/2001 | Holm |
| 2001/0034628 A1 | 10/2001 | Eder |
| 2001/0034686 A1 | 10/2001 | Eder |
| 2001/0041995 A1 | 11/2001 | Eder |
| 2001/0041996 A1 | 11/2001 | Eder |
| 2002/0002520 A1 | 1/2002 | Gatto |
| 2002/0016758 A1 | 2/2002 | Grigsby |
| 2002/0023034 A1 | 2/2002 | Brown et al. |
| 2002/0046143 A1 | 4/2002 | Eder |
| 2002/0052820 A1 | 5/2002 | Gatto |
| 2002/0087532 A1 | 7/2002 | Barritz |
| 2002/0087535 A1 | 7/2002 | Kotcheff |
| 2002/0097245 A1 | 7/2002 | Jeong et al. |
| 2002/0147880 A1 | 10/2002 | Wang et al. |
| 2002/0152222 A1 | 10/2002 | Holbrook |
| 2002/0169759 A1 | 11/2002 | Kraft et al. |
| 2003/0018961 A1 | 1/2003 | Ogasawara |
| 2003/0028267 A1 | 2/2003 | Hales et al. |
| 2003/0037043 A1 | 2/2003 | Chang et al. |
| 2003/0046130 A1 | 3/2003 | Golightly et al. |
| 2003/0083973 A1 | 5/2003 | Horsfall |
| 2003/0115090 A1 | 6/2003 | Mujtaba et al. |
| 2003/0120433 A1 | 6/2003 | Yokota et al. |
| 2003/0176931 A1 | 9/2003 | Pednault et al. |
| 2003/0182394 A1 | 9/2003 | Ryngler et al. |
| 2003/0217097 A1 | 11/2003 | Eitel |
| 2003/0233310 A1 | 12/2003 | Stavrovski |
| 2004/0015906 A1 | 1/2004 | Goraya |
| 2004/0083101 A1 | 4/2004 | Brown et al. |
| 2004/0088239 A1 | 5/2004 | Eder |
| 2004/0100494 A1 | 5/2004 | Ragoler et al. |
| 2004/0107181 A1 | 6/2004 | Rodden |
| 2004/0124742 A1 | 7/2004 | Takemura et al. |
| 2004/0139106 A1 | 7/2004 | Bachman et al. |
| 2004/0172319 A1 | 9/2004 | Eder |
| 2004/0193503 A1 | 9/2004 | Eder |
| 2004/0193894 A1 | 9/2004 | Chaudhari et al. |
| 2004/0194099 A1 | 9/2004 | Lamping et al. |
| 2004/0199445 A1 | 10/2004 | Eder |
| 2004/0215495 A1 | 10/2004 | Eder |
| 2004/0215522 A1 | 10/2004 | Eder |
| 2004/0225629 A1 | 11/2004 | Eder |
| 2004/0236621 A1 | 11/2004 | Eder |
| 2004/0236673 A1 | 11/2004 | Eder |
| 2004/0254932 A1 | 12/2004 | Gupta et al. |
| 2004/0260695 A1 | 12/2004 | Brill |
| 2005/0027507 A1 | 2/2005 | Patrudu |
| 2005/0060311 A1 | 3/2005 | Tong et al. |
| 2005/0071266 A1 | 3/2005 | Eder |
| 2005/0071328 A1 | 3/2005 | Lawrence |
| 2005/0119900 A1 | 6/2005 | Eder |
| 2005/0119919 A1 | 6/2005 | Eder |
| 2005/0119922 A1 | 6/2005 | Eder |
| 2005/0119959 A1 | 6/2005 | Eder |
| 2005/0144664 A1 | 6/2005 | Smith et al. |
| 2005/0149496 A1 | 7/2005 | Mukherjee et al. |
| 2005/0154711 A1 | 7/2005 | McConnell |
| 2005/0165777 A1 | 7/2005 | Hurst-Hiller |
| 2005/0187920 A1 | 8/2005 | Tenembaum |
| 2005/0193739 A1 | 9/2005 | Brunell et al. |
| 2005/0197994 A1 | 9/2005 | Fujii et al. |
| 2005/0237939 A1 | 10/2005 | Corl et al. |
| 2005/0251468 A1 | 11/2005 | Eder |
| 2006/0117002 A1* | 6/2006 | Swen ................. 707/4 |
| 2006/0143115 A1 | 6/2006 | Eder |
| 2006/0184449 A1 | 8/2006 | Eder |
| 2007/0156677 A1 | 7/2007 | Szabo |
| 2007/0174260 A1 | 7/2007 | Bachman et al. |
| 2008/0222166 A1* | 9/2008 | Hultgren et al. ............. 707/100 |
| 2009/0100022 A1* | 4/2009 | Nayak et al. ..................... 707/3 |
| 2009/0313041 A1* | 12/2009 | Eder ................. 705/2 |
| 2010/0021900 A1* | 1/2010 | Gong et al. ......... 435/6 |
| 2010/0172874 A1* | 7/2010 | Turnbaugh et al. .......... 424/93.4 |
| 2011/0184930 A1* | 7/2011 | Pfleger et al. ................. 707/708 |
| 2011/0238643 A1* | 9/2011 | Tong et al. .................... 707/706 |
| 2012/0005200 A1* | 1/2012 | Lawrence .................... 707/723 |
| 2012/0010867 A1* | 1/2012 | Eder ................. 703/13 |
| 2012/0158633 A1* | 6/2012 | Eder ................. 706/46 |

OTHER PUBLICATIONS

Davidow, William; Accounting systems are completely wrong, Red Herring, Jan. 1, 1995, pp. 1-3, Red Herring, U.S.A.

McTaggert, James, Kontes, Peter and Mankins, Michael, The value imperative, 1994, pp. 1-350, The Free Press, U.S.A.

Rappaport, Alfred; Creating shareholder value; 1986 & 1998, pp. 1-195, The Free Press, U.S.A.

Ritchken, Peter, Options, Theory, Strategy and Applications, 1987, pp. 1-407, Foresman and Company, U.S.A.

Dixit, Avinash & Pindyck, Robert; Investment under uncertainty; 1994; pp. 3-444, Princeton University Press, U.S.A.

Garson, David; Interpreting neural network connection weights, Apr. 1, 1991, pp. 47-51, AI Expert, U.S.A.

Wellstead, Stephen; Neural network and fuzzy logic applications in C/C++; 1994; pp. 3-447, John Wiley & Sons, U.S.A.

Most, Kenneth; Accounting theory; 1977,pp. 1-348, Grid, Inc., U.S.A.

Hendriksen, Elden, Accounting theory, 1982, pp. 1-524, Richard D. Irwin, U.S.A.

Kulkarni, Arun; Artificial neural networks for image understanding; 1994; pp. 1-204, Van Norstrand Reinhold, U.S.A.

Ward Systems Group; NeuroWindows User Manual; Jul. 1993; pp. 1-1 to A4-2, Ward Systems Group, U.S.A.

Brealey, Richard & Myers, Stewart; Principles of Corporate Finance; 1991; pp. 1-741, McGraw Hill, U.S.A.

Faulkner, Terrence; Applying options thinking to R&D valuation; May/Jun. 1996; pp. 50-56, Research Technology Management, U.S.A.

Miller, Merton & Modigliani, Franco, Dividend policy, growth and the valuation of shares, Oct. 1961, pp. 411-433, V34, The Journal of Business, U.S.A.

(56) References Cited

OTHER PUBLICATIONS

Dey, Anind, Kokinov, Boicho, et al; Modeling and Using Context—Context 2005, pp. 1-572, Jul. 2005, Springer, Germany.
Wilson, Albert, Emerging approaches to impaired property valuation, Apr. 1996, pp. 155-170, V64, Appraisal Journal, U.S.A.
Brown, Gordon T, Free cash flow appraisal, a better way, Apr. 1996, pp. 171-182, V64, Appraisal Journal, U.S.A.
Business Editors & Real Estate Industry Writers, EQK Realty Investors I, Apr. 2, 1992, pp. 1-3, Press Release, U.S.A.
Swad, Randy, Business valuation, applicable standards for CPA's, Sep. 1995, pp. 38-43, V65, CPA Journal, U.S.A.
Reilly, Robert; Valuation of intangibles for bankruptcy and reorganization purposes; Aug. 1994; pp. 25-30, V53, Ohio CPA Journal, U.S.A.
Liebich, Kim; How to value a bank; Aug. 1995; pp. 21-25, V87, ABA Banking Journal, U.S.A.
Baumann, Barbara H & Oxaal, Marjorie R; Estimating the value of a group medical practice, a primer; Dec. 1993; pp. 58-65, V47, Healthcare Financial Management, U.S.A.
Maxson, Mark; Will you get your money's worth?, May/Jun. 1993, pp. 54-58, V9, Financial Executive, U.S.A.
Friedman, Richard; Business valuation: calculating it right; Oct. 1994; pp. 34-39, V10, The Practical Accountant, U.S.A.
Mullen, Maggie; How to value intangibles; Nov. 1993; pp. 92-94, V112, Accountancy, U.K.
Stewart, Thomas; Trying to grasp the intangible; Oct. 2, 1995, pp. 157-159, V132, Fortune,U.S.A.
Ourosoff, Alexandra; What the world's top brands are worth; Sep. 1, 1992; pp. 33-49, Finance World, U.S.A.
Phillips Business Information, Inc.; Five ways to reduce risk with neural networks; Sep. 27, 1993; V3, Credit Risk Management Report, Philips Business Information.
Lippitt, Jeffrey & Mastracchio, Nicholas, Developing capitalization rates for valuing a business, Nov. 1995; pp. 24-28, V65, The CPA Journal, U.S.A.
Hirsch, A. Ethan, What's it worth?, Dec. 21, 1992, p. 16, V6, Accounting Today, U.S.A.
Myers, Stewart & Howe, Christopher; A life-cycle financial model of Pharmaceutical R&D; Apr. 1997; pp. 1-38, MIT Sloan School of Management, USA.
Simon, Carol J. & Sullivan, Mary W.; The Measurement and Determinants of Brand Equity; Winter 1993; pp. 28-52, V12 , Marketing Science, U.S.A.
Sveiby, Karl & Mellander, Klas; Tango Learning Guide Version 2.1; 1994; pp. 4-30, Celemi, Sweden.
Kaufman, J. Jerry; Value Management; 1998; pp. 1-90, Crisp Publications, U.S.A.
HBS Press; Harvard Business Review on Measuring Corporate Performance; 1998; pp. 1-216, HBS Press, U.S.A.
Kaplan, Robert & Norton, David; The Balanced Scorecard; 1996; pp. 1-311, HBS Press, U.S.A.
Morris, Henry; Extending the Business Process, Oct. 6, 1998, slides 1-20, IDC Presentation, San Francisco, CA, U.S.A.
Amir, Eli; & Lev, Baruch, "Value-relevance of non-financial information", Aug.-Dec. 1996, pp. 3-30, Journal of Accounting and Economics, U.S.A.
Ernst & Young, Measures that Matter, 1997, pp. 1-16, Ernst & Young Center for Business Innovation, U.S.A.
Bouquet, Paolo, Searafini, Luciano, et al; Modeling and Using Context—Context 1999, 1999, pp. 1-526, Springer, Germany.
Akman, Varol, Bouquet, Paolo, et al; Modeling and Using Context—Context 2001, 2001, pp. 1-469, Springer, Germany.
Kuehne, Sven, et al, "SEQL: Category learning as progressive abstraction using structure mapping", Aug. 2000, pp. 770-775, Proceedings of 22nd Annual Cognitive Science Conference Philadelphia, PA, U.S.A.
Franke, Jurgen, Hardle, Wolfgang, et al; Measuring Risk in Complex Stochastic Systems; 2000, pp. 1-255, Springer, U.S.A.
Shimpi, Prakash, Integrating Corporate Risk Management, 1999 & 2001, pp. 3-266, Texere, LLC, U.S.A.

Brewka, Gerhard, Principles of Knowledge Representation, 1996, pp. 1-311, CSLI Publications, Stanford University, U.S.A.
Reiter, Raymond, Knowledge in Action, 2001, pp. 1-418, MIT Press, U.S.A.
Tissen, Rene, Andriessen, Daniel, et al; The Knowledge Dividend, 2000, pp. 3-258, Prentice Hall, U.K.
Brown, John Seely, et al, Loosening up: How process networks unlock the power of specialization, 2002, pp. 59-69, McKinsey Quarterly Special Edition, McKinsey, USA.
Blythe, Jim, "An Integrated Environment for Knowledge Acquisition", 2001, pp. 13-20, Proceedings Internation Conference on Intelligent User Interfaces, ACM, U.S.A.
Koller, Timothy, "What is value based management", 3rd Quarter 1994, pp. 87-101, McKinsey Quarterly, McKinsey, U.S.A.
Brown, Carol; Coakley, James; Phillips, Mary Ellen,Neural Networks Enter World of Mgmt Accounting, May 1995, pp. 51-57, V76, Management Accounting, US.
Bielinski, Daniel, "How to sort out the premium drivers of post deal value", Jul./ Aug. 1993, pp. 33-37, V28, Mergers & Acquisitions, U.S.A.
Bergstrom, Peter; Kimber Eliot, "Formal data models for SGML and HyTime", Mar. 1999, pp. 271-287, XML Europe 1999 Conference Proceedings, Granada, Spain.
Harold, Elliotte, XML Bible, 1999, pp. 3-15, IDG Books, U.S.A.
Knight, James, Value Based Management, 1998, pp. 1-301, McGraw Hill, U.S.A.
Neurosolutions, Application Summaries from web site, Apr. 1999.
Copeland, Tom, Koller, Tim, Murrin, Jack, Valuation, 1990, pp. 1-413, John Wiley and Sons, U.S.A.
Brown, Carolyn, Phillips, Mary Ellen, Expert Systems for Management Accounting Tasks, 1995, pp. 1-204, IMA Foundation, U.S.A.
Anonymous, "Survey: Too Clever by Half",Jan. 24, 2004, p. 12, V370, The Economist, U.K.
Culp, Christopher et al, "Value at Risk for Asset Managers", Derivatives Quarterly, Jan. 8, 1999, pp. 22-33, V 5, New York, U.S.A.
Chicago Mercantile Exchange, "SPAN—Frequently Asked Questions", CME web site, Feb. 17, 2006, FAQ pp. 1-4, U.S.A.
Chicago Board of Trade, "SPAN Margin System", Aug. 27, 1991, pp. 1-72, Chicago Board of Trade, U.S.A.
W3C, "Extensible Markup Language (XML)", W3C web site archives, pp. 1-5, Apr. 1999.
Goldfarb, Charles; & Prescod, Paul; XML Handbook;1998, pp. 20-37, Prentice Hall, U.S.A.
Maier, David, "Database Desiderata for an XML Query Language"; W3C web site archives, pp. 1-6, Mar. 2001.
Widom, Jennifer, "Data Management for XML, Research Directions", Sep. 1999, pp. 44-52, V22, IEEE Data Engineering Bulletin, Special Issue on XML, U.S.A.
Chambers, Robert; Quiggins, John; "Resource Allocation and Asset Pricing", pp. 1-29, Nov. 2002, University of Maryland Working Paper 02-20, U.S.A.
Hasendoncks, Michel, "VBM—Value Driver Tree", Jun. 8, 2005, SAP Corporate Performance Monitoring Seminar. Belgium.
Barua Anitesh; Lee, C.H. Sophie; Whinston, Andrew, "The Calculus of Reengineering", Aug. 1996, pp. 409-428, V7, Information Systems Research, USA.
Baghai, Mehrdad, Coley, Stephen & White, David, "The Alchemy of Growth", 1999, pp. 2-244, Perseus Books, U.S.A.
Brisys, Eric, De Varenne, Francois, Insurance from underwriting to derivatives, 2001, pp. 1-158, John Wiley and Sons, Inc., U.S.A.
Anonymous, "The future of finance", The Economist, Dec. 11, 1999, pp. 71-72, v353, U.K.
Dowd, Kevin, Beyond Value at Risk, 1998, pp. 3-266, John Wiley & Sons, U.K.
The Appraisal Foundation, Uniform Standards of Professional Appraisal Practice 97, 1997. pp. 55-61, The Appraisal Foundation, U.S.A.
Mauboussin, Michael, "Get Real", Jun. 23, 1999, pp. 3-30, Credit Suisse First Boston, U.S.A.
Siegel, Jeremy, "The Noisy Market Hypothesis", Jun. 14, 2006, p. A14, The Wall Street Journal, U.S.A.

(56) References Cited

OTHER PUBLICATIONS

Eder, Jeff, Hard facts about soft assets (and real options), Apr. 3, 2001, pp. 1-54, Casualty Actuary Society Seminar on Enterprise Risk Management, U.S.A.
Farquhar, Peter & Han, Julie, "Recognizing and measuring your brand assets", Jul. 1991, pp. 1-29, Report 91-199, Marketing Science Institute, U.S.A.
Hull, John C., Options, futures and other derivatives, 2000, pp. 1-371, Prentice Hall. U.S.A.
Kluge, Jurgen, Stein, Wolfram, Licht, Thomas, Knowledge Unplugged, 2001, pp. 3-207, Palgrave, U.K.
Quinn, James Brian, Intelligent Enterprise, 1992, pp. 3-458, The Free Press, U.S.A.
Fowler, Martin; Analysis Patterns: Reusable Object Models, 1997, pp. 1-342, Addison Wesley, U.S.A.
Shafer, Glenn & Vovk, Vladimir, Probability and Finance, 2001, pp. 1-404, John Wiley & Sons, U.S.A.
Fahy, Martin, Strategic Enterprise Management Systems, 2002, pp. 1-177, AICPA, U.S.A.
Caouette, John, Altman, Edward & Narayanan, Paul, Managing Credit Risk, 1998, pp. 1-442, John Wiley and Sons, Inc., U.S.A.
Halford, Graeme, Baker, Rosemary, Bain, John, "How many variables can a human process", Psychological Science, Jan. 2005, pp. 70-76, V16, U.S.A.
Lorh, Steve, "Gates tries to inspire future techies", Mar. 2, 2005, p. 19, International Herald Tribune, France.
Clark, Peter et al, "Knowledge entry as the graphical assembly of components", submitted to K-CAP 2001 Oct. 2001, pp. 1-8, Victoria BC, Canada.
Alexander, Carol, Risk Management and Analysis, 1998, pp. 1-275, John Wiley and Sons, U.S.A.
Myers, Randy, "Measure for Measure", Nov. 1, 1997, pp. 31-37, CFO Magazine, U.S.A.
Biddle, Gary; Bowen, Robert; Wallace, James; "Does EVA Beat Earnings?", pp. 301-336, V24, Dec. 1997, Journal of Accounting and Economics, U.S.A.
Hildenbrand, Carol, "Putting two and two together", pp. 1-8, Jan. 2002, Darwin Magazine, U.S.A.
Roll, Richard, "A Mean/Variance Analysis of Tracking Error", pp. 13-22, V18, Summer 1992, Journal of Portfolio Management, U.S.A.
The Encode Project Consortium, "Identification and analysis of functional elements in 1% of the human genome", Nature, Jun. 14, 2007, V 445, p. 799-816, USA.
Caruso, Denise, "A challenge to gene theory, a tougher look at biotech", New York Times, Jul. 1, 2007, New York, U.S.A.
Hypknowsys, "Web-Log Preparaton with WUM Prep", Oct. 18, 2005, www.sourceforge.com.
Eder, Jeff, "Economics of sustainable design", from Resource Guide for Sustainable Development, pp. 25-43, Vulcan Real Estate, Oct. 4, 2002, Seattle, WA.
Everest, Gordon, Database Management, McGraw Hill, 1986.
Ballow, John; Burgman, Roland;Burgoz, Scott; "Enhanced Business Reporting"; Oct. 2004, pp. 1-30, Asset Economics, U.S.A.
Charoenrook, Anchanda; "Does Sentiment Matter?"; Dec. 2003, pp. 1-44, Financial Management Association International, U.S.A.
Bandopadhyaya, Arindam, Jones, Anne Leah; "Measuring investor sentiment in equity markets"; Feb. 2006, v7, pp. 208-215, Journal Asset Management, U.S.A.
physorg.com, "How much information is too much information?"; pp. 1-2;, Feb. 15, 2005, physorg.com, University of Queensland, Australia.
Upton, Wayne, "Special Report: Business and Financial Reporting, Challenges of the New Economy," pp. 1-118, 2001, FASB, USA.
Blackburn, Patrick, Ghidini, Chiara, et al; Modeling and Using Context—Context 2003, pp. 1-524, Jun. 2003, Springer, Germany.
Link, Jonathan, "Petition for relief for U.S. Appl. No. 11/360,087", Jan. 7, 2011, pp. 1-89, Kilpatrick Townsend, U.S.A.
Morris, Cohen, Fisher, Marshall, Ramchadran, Jaikumar; "Managing International Manufacturing", pp. 67-93, 1989, Elsevier, USA.
Care, Algo; Garatti, Simone et al, "Data-driven optimization through the scenario approach", pp. 1-12, Sep. 2010, University of Brescia, Italy.
Schleicher, Christoph, "An introduction to wavelets for economists", Bank of Canada Working Paper 2002-3, pp. 1-30, Jan. 2002, Canada.
Kim, Jinwoo and Ziegler, Bernard, "Hierarchical Distributed Genetic Algorithms: A Fuzzy Logic Controller Design Application", IEEE Expert, pp. 76-84, 1996, USA.
Kim, Jinwoo, "Hierarchical asynchronous genetic algorithms for paraellel/distributed simulation based optimization", pp. 1-186, University of Arizona, 1994, USA.
Jang, Jhy-Shing Roger, "Adaptive Network Based Fuzzy Inference System", IEEE Transactions Systems, Man, Cybernetics, p. 665-685, 1993, USA.
Kim, Sangbae and In, Francis Hauck, "The relationship between financial variables and real financial activity", Studies in nonlinear dynamics and econometrics, pp. 76-84, vol. 7, Issue 4, 2003, USA.
Ramsey, James and Lampart, Camille, "Decomposition of economic relationships by timescale using wavelets," Macroeconomic Dynamics, 2, 1998, pp. 49-71, USA.
Owens, Terry J; Lorin, Hubert C.; and Fetting, Anton, "Decision on Appeal 2009-012839, U.S. Appl. No. 09/688,983"; Mar. 16, 2011; pp. 1-18, U.S.P.T.O., USA.
Jensen, Paul and Bard, Jonathan, Operations Research Models and Methods, pp. A1-A6, John Wiley and Sons, 2003.
Rauenzahn, Rick, "Declaration under Rule 132 for U.S. Appl. No. 10/237,021", Sep. 16, 2011, pp. 1-5, USA.
Treynor, Jack and Mazuy, Kay, "Can Mutual Funds Outguess the Market?", Harvard Business Review, Jul.-Aug. 1996, pp. 131-136, USA.
Schulze, Mark; "Linear Programming for Optimization", 1998; pp. 1-8; Perceptive Scientific Instruments, USA.
Smith, Cole et al, "A Tutorial Guide to Mixed-Integer Programming Models and Solution Techniques", 2007, pp. 1-23, Univeristy of Florida, USA.
Heching, Aliza; and King, Alan; "Financial Engineering"; Operations research and management science handbook, pp. 21-1 through 21-37; 2008, CRC Press, USA.
Link, Jonathan, "Addendum to petition for relief for U.S. Appl. No. 11/360,087", Mar. 1, 2011, pp. 1-10, Kilpatrick Townsend, U.S.A.
Eppen, Gary; Martin, R.; Schrage, Linus, "A Scenario Approach to Capacity Planning", Operations Research, vol. 37, No. 4, Jul. 1989, pp. 517-527.
Stein, Jeremy et al, "A comparables approach to measuring cash flow at risk for non financial firms", Journal of Applied Corporate Finance, Winter 2001, pp. 100-109.
Hodder, J., "Financial Market Approaches to Facility Location under Uncertainty", Operations Research, vol. 32, pp. 1374-1380, 1984.
Hodder, J., et al., "A Simple Plant-Location Model for Quantity Setting Firms Subject to Price Uncertainty", European Journal of Operational Research; Amsterdam, vol. 21, pp. 39-46, 1985.
Bradley, Stepehen; Hax, Arnoldo; Magnanti, Thomas; "Applied Mathematical Programming", pp. 227-271, 1977, Addison Wesley, USA.
Zomaya, Albert; Kazman, Rick, "Simulated Annealing Techniques," Algorithms and theory of computation handbook, pp. 33-1 to 33-18, 2010, CRC Press, USA.
Rabiner, Lawrence, "A Tutorial on Hidden Markov Models and Selected Applications in Speech Recognition", Proceedings of the IEEE, Feb. 1989, p. 257-286, USA.
Forney, David, "The Viterbi Algorithm", Proceedings of the IEEE, Mar. 1973, pp. 268-278, USA.
Viterbi, Andrew, "Error Bounds for Convolutional Codes", IEEE Transactions on Information Theory, Apr. 1967, pp. 260-269, USA.
Expert, Economic, "Viterbi Algorithm", www.economicexpert.com, Jul. 19, 2011, pp. 1-2, USA.
Hauser, John and Urban, Glen, "Assessment of attribute importances and consumer utility functions", Journal of Consumer Research,p. 251-262, Mar. 1979, USA.
Lu, Zhidong, et al., "A robust language independent OCR system", 1998, pp. 1-9, BBN Technologies, USA.
Englebrecht, Herman, "Efficient decoding of hidden markov models", Sep. 2007, pp. 1-151, University of Stellenbosch, South Africa.

(56) References Cited

OTHER PUBLICATIONS

Hsu, William, "Time Series Learning With Probabilistic Networks", 1998, pp. 1-135, University of Illinois, USA.

Link, Jonathan, "Addendum to petition for relief for U.S. Appl. No. 11/360,087", Aug. 31, 2011, pp. 1-52, Kilpatrick Townsend, U.S.A.

Chen, Peter, "The Entity Relationship Model", Mar. 1976, pp. 9-36, ACM Transactions on Database Systems, USA.

Someren, Maarten, Verdeneus, Floor; "Introducing inductive methods in knowledge acquisition by divide- and- conquer", 1998, pp. 20-28, AAAI, USA.

Geman, Stuart, Bienenstock, Elie; "Neural networks and the bias/variance dilemma", 1992, Neural Computation, pp. 1-58, MIT, USA.

Schuurmans, Dale; "A new metric based approach to model selection", 1997, pp. 1-7, AAAI National Conference Proceedings, AAAI, USA.

Kohavi, Ron, "Wrappers for feature subset selection", 1997, Artificial Intelligence, pp. 273-324, Elsevier, Holland.

Michalski, Ryzard, "A theory and methodology of inductive learning", 1982, pp. 111-161, Tioga Publishing, USA.

Mitchell, Tom, "Machine Learning", 1997, pp. 1-414, McGraw Hill, USA.

Piramuthu, Selwyn, et al, "Using Feature Construction to Improve the Performance of Neural Networks", 1998, pp. 416-430, Management Science, USA.

Kohavi, Ron; "Wrappers for performance enhancement and oblivious decision graphs"; 1995, pp. 1-302, Stanford University, USA.

Kira, Kenji, Rendell, Larry, "The feature selection problem, traditional methods and a new algorithm", 1992, pp. 129-134, Learning Inductive, AAAI, USA.

Jordan, Michael, Jacobs, Robert, "Hierarchical Mixtures of Experts and the EM Algorithm", 1993, pp. 1-30, MIT, USA.

Rockefeller, R.T., Wets, Roger, "Scenario and policy aggregation in optimization under uncertainty", Mathematics of Operation Research, pp. 119-147, 1991, USA.

Mulvey, John and Andrzej Ruszczynski "A New Scenario Decomposition Method for Large-Scale Stochastic Optimization" Operations Research, vol. 43 (1995), No. 3, p. 477-490, USA.

Kon, Stanley and Jen, Frank, "The Investment Performance of Mutual Funds", The Journal of Business, vol. 52, No. 2 (Apr. 1979), pp. 263-289, USA.

Ippolito, Richard, On Studies of Mutual Fund Performance, 1962-1991, Financial Analysts Journal, vol. 49, No. 1 (Jan.-Feb. 1993), pp. 42-50, USA.

Wang, Jason, et al, "Data Mining in Bioinformatics", 2005, pp. 1-340, Springer-Verlag, London, U.K.

Beigl, Michael et al, "Modeling and Using Context", 2011, pp. 1-336, Springer-Verlag, Berlin Heidelberg, Germany.

Kokinov, Boicho et al, "Modeling and Using Context", 2007, pp. 1-574, Springer-Verlag, Heidelberg, Germany.

Fama, Eugene & French, Kenneth, "The Capital Asset Pricing Model: Theory and Evidence", Summer 2004, pp. 25-46, Journal of Economic Perspectives, U.S.A.

Eder, Jeff, "Economics of sustainable development", Oct. 4, 2002, pp. 26-50, Vulcan Real Estate, USA.

* cited by examiner

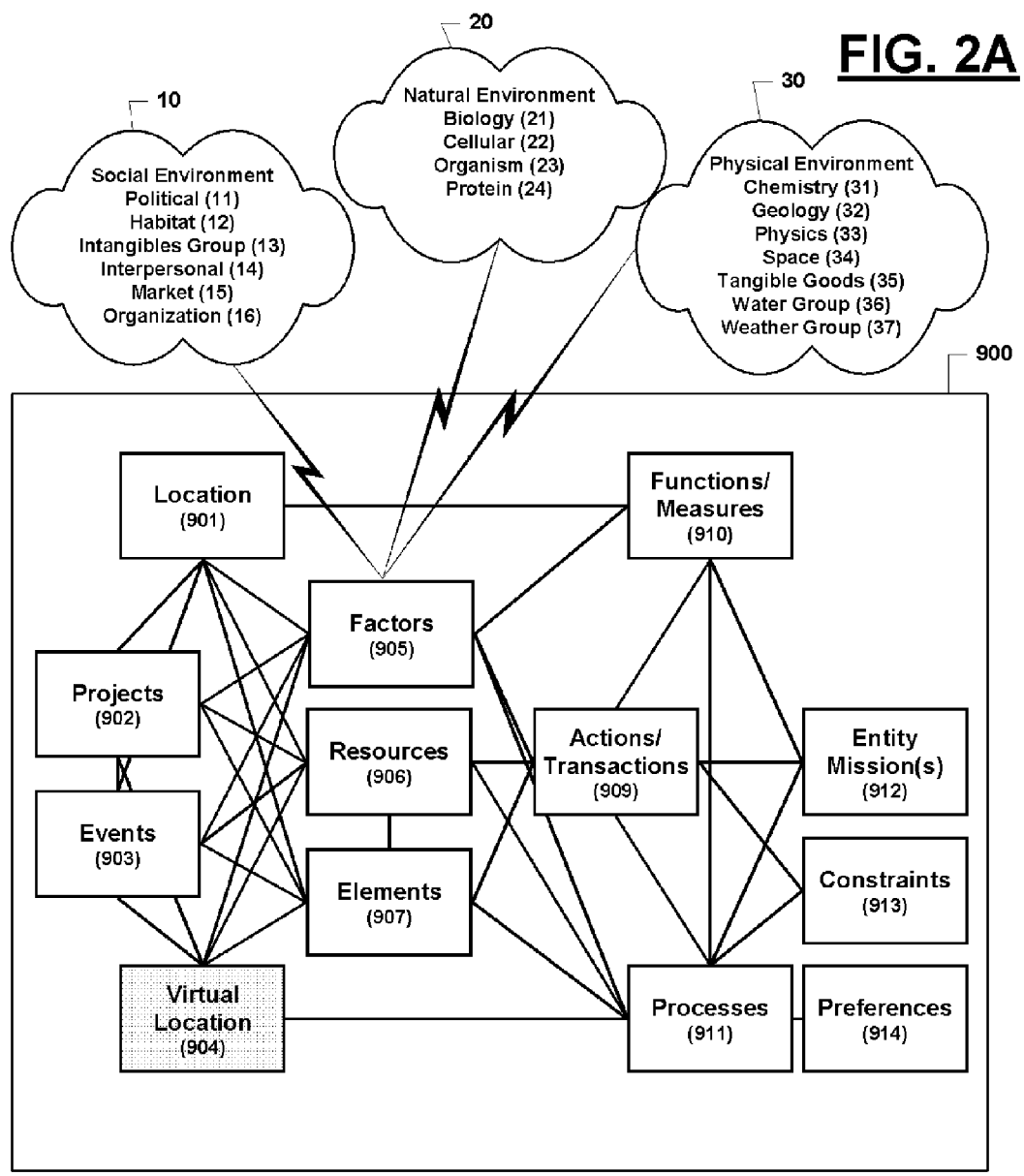

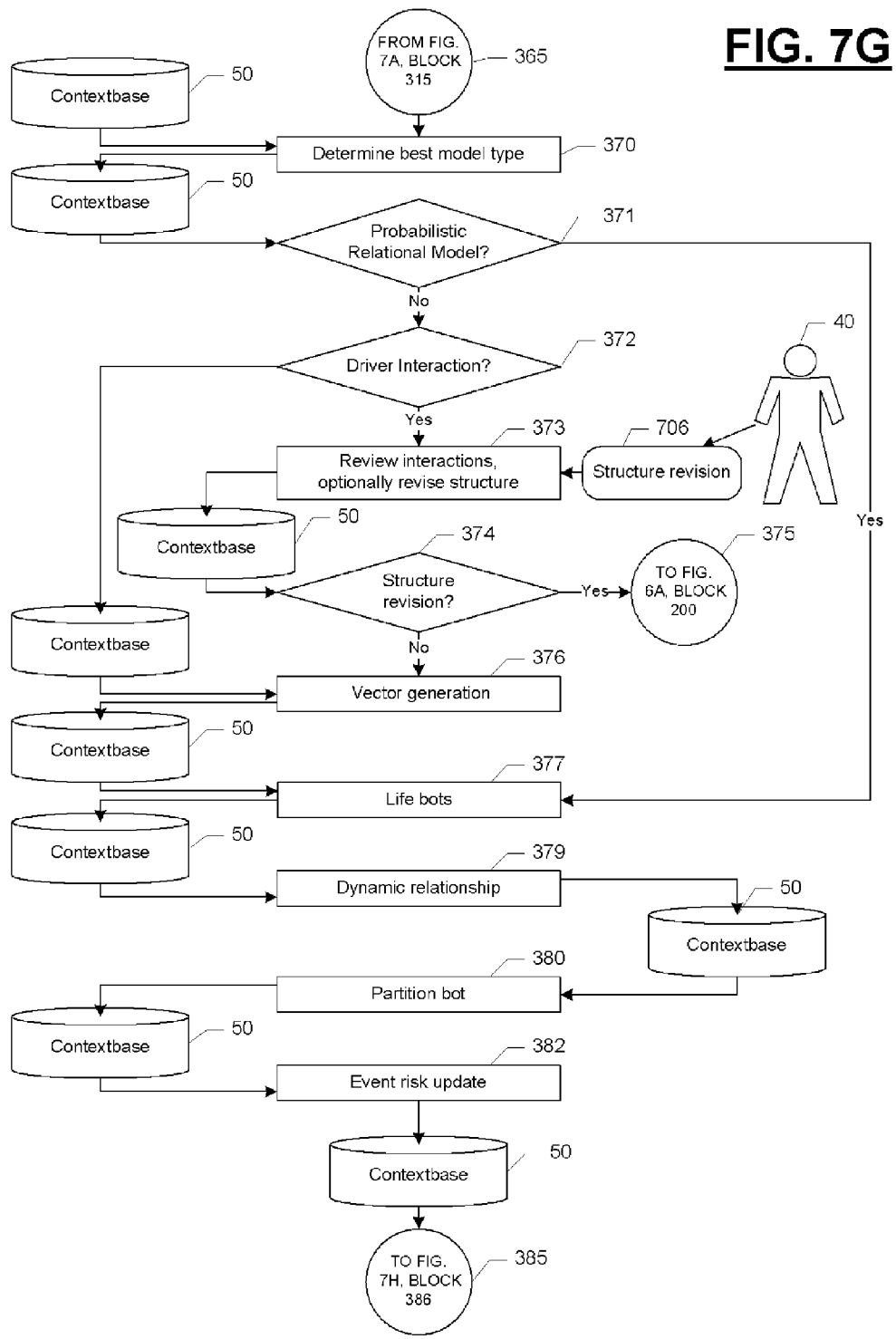

FIG. 15

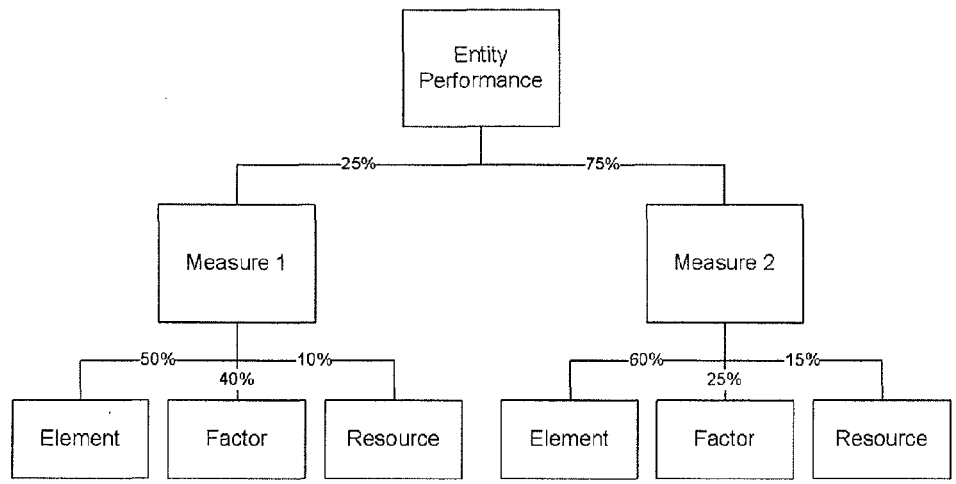

Example:
With node depth of 2 and a cutoff criteria of 15%, the layers shown below would be indexed:

1) Element layer is indexed because:
Measure 1  25% X 50% = 12.5% (meets criteria)
Measure 2  75% X 60% = 45.0% (meets criteria)

2) Factor layer is indexed because:
Measure 1 25% X 40% = 10.0% (does not meet criteria)
Measure 2 75% X 25% = 18.75% (meets criteria)

3) Resource layer is not indexed because:
Measure 1 25% X 10% = 2.5% (does not meet criteria)
Measure 2 75% X 15% = 11.25% (does not meet criteria)

FIG. 16

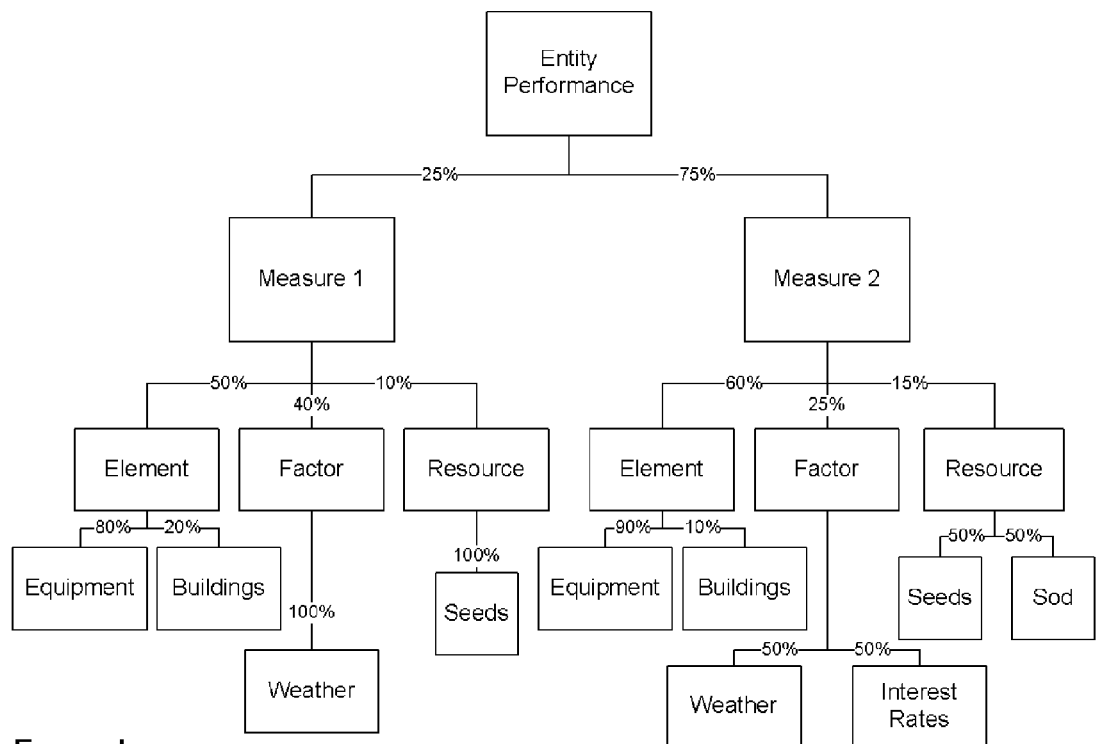

Example:
With node depth of 3 and a cutoff criteria of 10%, the components of context shown below would be indexed:

1) Equipment data are indexed because:
Measure 1  25% X 50% X 80% = 10.0% (meets criteria)
Measure 2  75% X 60% X 90% = 45.0% (meets criteria)

2) Building data are not indexed because:
Measure 1  25% X 50% X 20% = 2.5% (does not meet criteria)
Measure 2  75% X 60% X 10% = 4.5% (does not meet criteria)

3) Weather data are indexed because:
Measure 1  25% X 40% X 100% = 10.0% (meets criteria)
Measure 2  75% X 25% X 50% = 9.375% (does not meet criteria)

4) Interest rate data are not indexed because:
Measure 2  75% X 25% X 50% = 9.375% (does not meet criteria)

5) Seeds and Sod are not indexed because:
Measure 1  25% X 10% X 100% = 2.5% (does not meet criteria)
Measure 2  75% X 15% X 50% = 5.625% (does not meet criteria)

COMPLETE CONTEXT SEARCH SYSTEM

RELATED PROVISIONAL APPLICATIONS

This application is a continuation in part of U.S. patent application Ser. No. 12/114,784 filed May 4, 2008 the disclosure of which is incorporated herein by reference and a continuation in part of U.S. patent application Ser. No. 12/497,656 filed Jul. 4, 2009 the disclosure of which is incorporated herein by reference. U.S. patent application Ser. No. 12/497,656 is a continuation of U.S. patent application Ser. No. 11/094,171 filed Mar. 31, 2005 the disclosure of which is incorporated herein by reference. This application is also related to provisional application No. 60/432,283 filed on Dec. 10, 2002, provisional application No. 60/464,837 filed on Apr. 23, 2003, provisional patent application No. 60/566,614 filed on Apr. 29, 2004, U.S. patent application Ser. No. 09/688,983 filed Oct. 17, 2000, U.S. patent application Ser. No. 10/237,021 filed Sep. 9, 2002; U.S. patent application Ser. No. 10/717,026 filed Nov. 19, 2003 which matured into U.S. Pat. No. 7,401,057, U.S. patent application Ser. No. 10/743,417 filed Dec. 22, 2003, U.S. patent application Ser. No. 10/750,792 filed Jan. 3, 2004, U.S. patent application Ser. No. 11/094,171 filed Mar. 31, 2005 which matured into U.S. Pat. No. 7,730,063, U.S. Pat. No. 7,580,848 issued Aug. 25, 2009, U.S. patent application Ser. No. 11/262,146 filed Oct. 28, 2005, U.S. patent application Ser. No. 11/268,081 filed Nov. 7, 2005, U.S. patent application Ser. No. 11/279,104 filed Apr. 8, 2006 and U.S. patent application Ser. No. 11/358,196 filed Jul. 9, 2005, U.S. patent application Ser. No. 12/910,829 filed Oct. 24, 2010 and U.S. patent application Ser. No. 13/239,241 filed Sep. 21, 2011 the disclosures of which are all also incorporated herein by reference.

BACKGROUND OF THE INVENTION

This invention relates to methods, systems and computer program products for a system that develops an entity situation summary (aka context or context frame) before using said situation summary to develop an index, perform a search and return prioritized results.

SUMMARY OF THE INVENTION

It is a general object of the present invention to provide a novel, useful system that performs Complete Context™ search. The innovative system of the present invention supports the development and integration of any combination of data, information and knowledge from systems that analyze, monitor and/or support entities in three distinct areas, a social environment area (1000), a natural environment area (2000) and a physical environment area (3000). Each of these three areas can be further subdivided into domains. Each domain can in turn be divided into a hierarchy or group. Each member of a hierarchy or group is a type of entity.

The social environment area (1000) includes a political domain hierarchy (1100), a habitat domain hierarchy (1200), an intangibles domain group (1300), an interpersonal domain hierarchy (1400), a market domain hierarchy (1500) and an organization domain hierarchy (1600). The political domain hierarchy (1100) includes a voter entity type (1101), a precinct entity type (1102), a caucus entity type (1103), a city entity type (1104), a county entity type (1105), a state/province entity type (1106), a regional entity type (1107), a national entity type (1108), a multi-national entity type (1109) and a global entity type (1110). The habitat domain hierarchy includes a household entity type (1202), a neighborhood entity type (1203), a community entity type (1204), a city entity type (1205) and a region entity type (1206). The intangibles domain group (1300) includes a brand entity type (1301), an expectations entity type (1302), an ideas entity type (1303), an ideology entity type (1304), a knowledge entity type (1305), a law entity type (1306), a money entity type (1307), a right entity type (1308), a relationship entity type (1309) and a service entity type (1310). The interpersonal domain hierarchy includes (1400) includes an individual entity type (1401), a nuclear family entity type (1402), an extended family entity type (1403), a clan entity type (1404) and an ethnic group entity type (1405). The market domain hierarchy (1500) includes a multi entity type organization entity type (1502), an industry entity type (1503), a market entity type (1504) and an economy entity type (1505). The organization hierarchy (1600) includes team entity type (1602), a group entity type (1603), a department entity type (1604), a division entity type (1605), a company entity type (1606) and an organization entity type (1607). These relationships are summarized in Table 1.

TABLE 1

| Social Environment Domains | Members (lowest level to highest for hierarchies) |
| --- | --- |
| Political (1100) | voter (1101), precinct (1102), caucus (1103), city (1104), county (1105), state/province (1106), regional (1107), national (1108), multi-national (1109), global (1110) |
| Habitat (1200) | household (1202), neighborhood (1203), community (1204), city (1205), region (1206) |
| Intangibles Group (1300) | brand (1301), expectations (1302), ideas (1303), ideology (1304), knowledge (1305), law (1306), money (1307), right (1308), relationship (1309), service (1310) |
| Interpersonal (1400) | individual (1401), nuclear family (1402), extended family (1403), clan (1404), ethnic group (1405) |
| Market (1500) | multi entity organization (1502), industry (1503), market (1504), economy (1505) |
| Organization (1600) | team (1602), group (1603), department (1604), division (1605), company (1606), organization (1607) |

The natural environment area (2000) includes a biology domain hierarchy (2100), a cellular domain hierarchy (2200), an organism domain hierarchy (2300) and a protein domain hierarchy (2400) as shown in Table 2. The biology domain hierarchy (2100) contains a species entity type (2101), a genus entity type (2102), a family entity type (2103), an order entity type (2104), a class entity type (2105), a phylum entity type (2106) and a kingdom entity type (2107). The cellular domain hierarchy (2200) includes a macromolecular complexes entity type (2202), a protein entity type (2203), a rna entity type (2204), a dna entity type (2205), an x-ylation** entity type (2206), an organelles entity type (2207) and cells entity type (2208). The organism domain hierarchy (2300) contains a structures entity type (2301), an organs entity type (2302), a systems entity type (2303) and an organism entity type (2304). The protein domain hierarchy contains a monomer entity type (2400), a dimer entity type (2401), a large oligomer entity type (2402), an aggregate entity type (2403) and a particle entity type (2404). These relationships are summarized in Table 2.

TABLE 2

| Natural Environment Domains | Members (lowest level to highest for hierarchies) |
| --- | --- |
| Biology (2100) | species (2101), genus (2102), family (2103), order (2104), class (2105), phylum (2106), kingdom (2107) |
| Cellular* (2200) | macromolecular complexes (2102), protein (2103), rna (2104), dna (2105), x-ylation** (2106), organelles (2107), cells (2108) |
| Organism (2300) | structures (2301), organs (2302), systems (2303), organism (2304) |

TABLE 2-continued

| Natural Environment Domains | Members (lowest level to highest for hierarchies) |
|---|---|
| Proteins (2400) | monomer (2400), dimer (2401), large oligomer (2402), aggregate (2403), particle (2404) |

*includes viruses
**x = methyl, phosphor, etc.

The physical environment area (3000) contains a chemistry group (3100), a geology domain hierarchy (3200), a physics domain hierarchy (3300), a space domain hierarchy (3400), a tangible goods domain hierarchy (3500), a water group (3600) and a weather group (3700) as shown in Table 3. The chemistry group (3100) contains a molecules entity type (3101), a compounds entity type (3102), a chemicals entity type (3103) and a catalysts entity type (3104). The geology domain hierarchy contains a minerals entity type (3202), a sediment entity type (3203), a rock entity type (3204), a landform entity type (3205), a plate entity type (3206), a continent entity type (3207) and a planet entity type (3208). The physics domain hierarchy (3300) contains a quark entity type (3301), a particle zoo entity type (3302), a protons entity type (3303), a neutrons entity type (3304), an electrons entity type (3305), an atoms entity type (3306), and a molecules entity type (3307). The space domain hierarchy contains a dark matter entity type (3402), an asteroids entity type (3403), a comets entity type (3404), a planets entity type (3405), a stars entity type (3406), a solar system entity type (3407), a galaxy entity type (3408) and universe entity type (3409). The tangible goods hierarchy contains a compounds entity type (3502), a minerals entity type (3503), a components entity type (3504), a subassemblies entity type (3505), an assembly's entity type (3506), a subsystems entity type (3507), a goods entity type (3508) and a systems entity type (3509). The water group (3600) contains a pond entity type (3602), a lake entity type (3603), a bay entity type (3604), a sea entity type (3605), an ocean entity type (3606), a creek entity type (3607), a stream entity type (3608), a river entity type (3609) and a current entity type (3610). The weather group (3700) contains an atmosphere entity type (3701), a clouds entity type (3702), a lightning entity type (3703), a precipitation entity type (3704), a storm entity type (3705) and a wind entity type (3706).

TABLE 3

| Physical Environment Domains | Members (lowest level to highest for hierarchies) |
|---|---|
| Chemistry Group (3100) | molecules (3101), compounds (3102), chemicals (3103), catalysts (3103) |
| Geology (3200) | minerals (3202), sediment (3203), rock (3204), landform (3205), plate (3206), continent (3207), planet (3208) |
| Physics (3300) | quark (3301), particle zoo (3302), protons (3303), neutrons (3304), electrons (3305), atoms (3306), molecules (3307) |
| Space (3400) | dark matter (3402), asteroids (3403), comets (3404), planets (3405), stars (3406), solar system (3407), galaxy (3408), universe (3409) |
| Tangible Goods (3500) | compounds (3502), minerals (3503), components (3504), subassemblies (3505), assemblies (3506), subsystems (3507), goods (3508), systems (3509) |
| Water Group (3600) | pond (3602), lake (3603), bay (3604), sea (3605), ocean (3606), creek (3607), stream (3608), river (3609), current (3610) |
| Weather Group (3700) | atmosphere (3701), clouds (3702), lightning (3703), precipitation (3704), storm (3705), wind (3706) |

Individual entities are items of one or more entity type, elements associated with one or more entity type, resources associated with one or more entity type and combinations thereof. Because of this, analyses of entities can be linked together to support an analysis that extends vertically across several domains. Entities can also be linked together horizontally to follow a chain of events that impacts an entity. These vertical and horizontal chains are partially recursive. The domain hierarchies and groups shown in Tables 1, 2 and 3 can be organized into different areas and they can also be expanded, modified, extended or pruned as required to support different analyses.

Data, information and knowledge from these seventeen different domains are integrated and analyzed as required to support the creation of subject entity knowledge. The knowledge developed by this system is comprehensive. However, it focuses on the function performance (note the terms behavior and function performance will be used interchangeably) of a single entity as shown in FIG. 2A, a collaboration or partnership between two or more entities in one or more domains as shown in FIG. 2B and/or a multi entity system in one or more domains as shown in FIG. 3. FIG. 2A shows an entity (900) and the conceptual inter-relationships between a location (901), a project (902), an event (903), a virtual location (904), a factor (905), a resource (906), an element (907), an action/transaction (909), a function measure (910), a process (911), an entity mission (912), constraint (913) and a preference (914). FIG. 2B shows a collaboration (925) between two entities and the conceptual inter-relationships between locations (901), projects (902), events (903), virtual locations (904), factors (905), resources (906), elements (907), action/transactions (909), a joint measure (915), processes (911), a joint entity mission (916), constraints (913) and preferences (914). For simplicity we will hereinafter use the terms entity or subject entity with the understanding that they refer to an entity (900) as shown in FIG. 2A, a collaboration between two or more entities (925) as shown in FIG. 2B or a multi entity system (950) as shown in FIG. 3.

Once the entity knowledge has been developed it can be reviewed, analyzed, and applied using one or more Complete Context™ applications described in the applications incorporated herein by reference. Processing in the Complete Context™ Search System (100) is completed in three steps:
 1. Entity definition and optional measure identification;
 2. Contextbase development; and
 3. Search completion.

The first processing step in the Complete Context™ Search System (100) defines the entity, entity collaboration or multi-domain system that will be analyzed, prepares the data from entity narrow system databases (5), partner narrow system databases (6), external databases (7), the World Wide Web (8) and the Complete Context™ Input System (601) for use in processing and then uses this data to specify entity functions and function measures. As part of the first stage of processing, the user (20) identifies the subject entity by using existing hierarchies and groups, adding a new hierarchy or group or modifying the existing hierarchies and/or groups as required to fully define the subject entity. As discussed previously, individual entities are defined by being items of one or more entity type.

After the subject entity definition is completed, structured data and information, transaction data and information, descriptive data and information, unstructured data and information, text data and information, geo-spatial data and information, image data and information, array data and information, web data and information, video data and video information, device data and information, etc. are processed and made available for analysis by converting data formats as required before mapping this data to an entity Contextbase (50) in accordance with a common schema, a common ontology or a combination thereof. The automated conversion and mapping of data and information from the existing devices (3) narrow computer-based system databases (5 & 6), external databases (7) and the World Wide Web (8) to a common schema, ontology or combination significantly increases the scale and scope of the analyses that can be completed by users. This innovation also promises to significantly extend the life of the existing narrow systems (4) that would otherwise become obsolete. The uncertainty associated with the data from the different systems is evaluated at the time of integration. Before going further, it should be noted that the Complete Context™ Search System (100) is also capable of operating without completing some or all narrow system database (5 & 6) conversions and integrations as it can accept data that complies with the common schema, common ontology or some combination thereof. The Complete Context™ Search System (100) is also capable of operating without any input from narrow systems. For example, the Complete Context™ Input System (601) (and any other application capable of producing xml documents) is fully capable of providing all required data directly to the Complete Context™ Search System (100).

The Complete Context™ Search System (100) supports the preparation and use of data, information and/or knowledge from the "narrow" systems (4) listed in Tables 4, 5, 6 and 7 and devices (3) listed in Table 8.

TABLE 4

| | |
|---|---|
| Biomedical Systems | affinity chip analyzer, array systems, biochip systems, bioinformatics systems; biological simulation systems, clinical management systems; diagnostic imaging systems, electronic patient record systems, electrophoresis systems, electronic medication management systems, enterprise appointment scheduling, enterprise practice management, fluorescence systems, formulary management systems, functional genomic systems, gene chip analysis systems, gene expression analysis systems, information based medical systems, laboratory information management systems, liquid chromatography, mass spectrometer systems; microarray systems; medical testing systems, molecular diagnostic systems, nano-string systems; nano-wire systems; peptide mapping systems, pharmacoeconomic systems, pharmacogenomic data systems, pharmacy management systems, practice management, protein biochip analysis systems, protein mining systems, protein modeling systems, protein sedimentation systems, protein visualization systems, proteomic data systems; structural biology systems; systems biology applications, x*-ylation analysis systems |

*x = methyl, phosphor,

TABLE 5

| | |
|---|---|
| Personal Systems | appliance management systems, automobile management systems, contact management applications, home management systems, image archiving applications, image management applications, media archiving applications, media applications, media management applications, personal finance applications, personal productivity applications (word processing, spreadsheet, presentation, etc.), personal database applications, personal and group scheduling applications, video applications |

TABLE 6

| | |
|---|---|
| Scientific Systems | atmospheric survey systems, geological survey systems; ocean sensor systems, seismographic systems, sensor grids, sensor networks, smart dust |

TABLE 7

| | |
|---|---|
| Organization Systems | accounting systems**; advanced financial systems, alliance management systems; asset and liability management systems, asset management systems; battlefield systems, behavioral risk management systems; benefits administration systems; brand management systems; budgeting/financial planning systems; business intelligence systems; call management systems; cash management systems; channel management systems; claims management systems; command systems, commodity risk management systems; content management systems; contract management systems; credit-risk management systems; customer relationship management systems; data integration systems; data mining systems; demand chain systems; decision support systems; device management systems document management systems; email management systems; employee relationship management systems; energy risk management systems; expense report processing systems; fleet management systems; foreign exchange risk management systems; fraud management systems; freight management systems; geological survey systems; human capital management systems; |

TABLE 7-continued human resource management systems; incentive management systems; information lifecycle management systems, information technology management systems, innovation management systems; insurance management systems; intellectual property management systems; intelligent storage systems, interest rate risk management systems; investor relationship management systems; knowledge management systems; litigation tracking systems; location management systems; maintenance management systems; manufacturing execution systems; material requirement planning systems; metrics creation system; online analytical processing systems; ontology systems; partner relationship management systems; payroll systems; performance dashboards; performance management systems; price optimization systems; private exchanges; process management systems; product life-cycle management systems; project management systems; project portfolio management systems; revenue management systems; risk management information systems, sales force automation systems; scorecard systems; sensors (includes RFID); sensor grids (includes RFID); service management systems; simulation systems; six-sigma quality management systems; shop floor control systems; strategic planning systems; supply chain systems; supplier relationship management systems; support chain systems; system management applications, taxonomy systems; technology chain systems; treasury management systems; underwriting systems; unstructured data management systems; visitor (web site) relationship management systems; weather risk management systems; workforce management systems; yield management systems and combinations thereof \*\*these typically include an accounts payable system, accounts receivable system, inventory system, invoicing system, payroll system and purchasing system

TABLE 8

| | |
|---|---|
| Devices | personal digital assistants, phones (mobile/wireless or fixed line), watches, clocks, lab equipment, personal computers, refrigerators, washers, dryers, hvac system controls, gps devices |

After data conversion is complete the user (20) is optionally asked to specify entity functions. The user can select from pre-defined functions for each entity or define new functions using narrow system data. Examples of predefined entity functions are shown in Table 9.

TABLE 9

| Entity Type: | Example Functions |
|---|---|
| Interpersonal (1400) | maximize income, maintaining standard of living |
| Water Group (3600) | biomass production, decomposing waste products, maintaining ocean salinity in a defined range |

Pre-defined quantitative measures can be used if pre-defined functions were used in defining the entity. Alternatively, new measures can be created using narrow system data for one or more entities and/or the system (100) can identify the best fit measures for the specified functions. The quantitative measures can take any form. For many entities the measures are simple statistics like percentage achieving a certain score, average time to completion and the ratio of successful applicants versus failures. Other entities use more complicated measures. If the user does not specify functions and/or measures, then the system uses existing information to infer the most likely functions as detailed in one or more cross-referenced applications.

After the data integration, entity definition and measure specification are completed, processing advances to the second stage where context layers for each entity are developed and stored in a Contextbase (50). The complete context for evaluating the performance of most entities can be divided into seven types of context layers. The seven types of layers are:

1. Information that defines and describes the element context over time, i.e. we store widgets (a resource) built (an action) using the new design (an element) with the automated lathe (another element) in our warehouse (an element). The lathe (element) was recently refurbished (completed action) and produces 100 widgets per 8 hour shift (element characteristic). We can increase production to 120 widgets per 8 hour shift if we add complete numerical control (a feature). This layer may be subdivided into any number of sub-layers along user specified dimensions such as tangible elements of value, intangible elements of value, processes, agents, assets, lexicon (what elements are called) and combinations thereof;
2. Information that defines and describes the resource context over time, i.e. producing 100 widgets (a resource) requires 8 hours of labor (a resource), 150 amp hours of electricity (another resource) and 5 tons of hardened steel (another resource). This layer may be subdivided into any number of sub-layers along user specified dimensions such as lexicon (what resources are called), resources already delivered, resources with delivery commitments and forecast resource requirements;
3. Information that defines and describes the environment context over time (the entities in the social, natural and/or physical environment that impact function measure performance), i.e. the market for steel is volatile, standard deviation on monthly shipments is 24%. This layer may be subdivided into any number of sub-layers along user specified dimensions;
4. Information that defines and describes the transaction context (also known as tactical/administrative) over time, i.e. we have made a commitment to ship 100 widgets to Acme by Tuesday and need to start production by Friday. This layer may be subdivided into any number of sub-layers along user specified dimensions such as lexicon (what transactions and events are called), historical transactions, committed transactions, forecast transactions, historical events, forecast events and combinations thereof;
5. Information that defines and describes the relationship context over time, i.e. Acme is also a key supplier for the new product line, Widget X, that is expected to double our revenue over the next five years. This layer may be subdivided into any number of sub-layers along user specified dimensions;

6. Information that defines and describes the measurement context over time, i.e. Acme owes us $30,000, the price per widget is $100 and the cost of manufacturing widgets is $80 so we make $20 profit per unit (for most businesses this would be a short term profit measure for the value creation function) also, Acme is one of our most valuable customers and they are a valuable supplier to the international division (value based measures). This layer may be subdivided into any number of sub-layers along user specified dimensions. For example, the instant, five year and lifetime impact of certain medical treatments may be of interest. In this instance, three separate measurement layers could be created to provide the required context. The risks associated with each measure can be integrated within each measurement layer or they can be stored in separate layers. For example, value measures for organizations integrate the risk and the return associated with measure performance. For most analyses, the performance and risk measures are integrated. However, in some instances it is desirable to separate the two;
7. Information that optionally defines the relationship of the first six layers of entity context to one or more coordinate systems over time. Pre-defined spatial reference coordinates available for use in the system of the present invention include the major organs, a human body, each of the continents, the oceans, the earth, the solar system and an organization chart. Virtual coordinate systems can also be used to relate each entity to other entities on a system such as the Internet, network or intranet. This layer may also be subdivided into any number of sub-layers along user specified dimensions and would identify system or application context if appropriate.

Different combinations of context layers and function measures from different entities are relevant to different analyses and decisions. For simplicity, we will generally refer to seven types of context layers or seven context layers while recognizing that the number of context layers can be greater (or less) than seven. It is worth noting at this point that the layers may be combined for ease of use, to facilitate processing and/or as entity requirements dictate. For example, the lexicon layers from each of the seven types of layers described above can be combined into a single lexicon layer. It is also worth noting that if the entity is a multi entity organization or an entity from the organization domain with a single function measure (financial or non-financial), then the context layers defined in U.S. patent application Ser. No. 11/262,146 filed Oct. 28, 2005 would be used for defining the complete context. Before moving on we need to define each context layer in more detail. Before we can do this we need to define key terms that we will use in the defining the layers and system (100) of the present invention:

1. Entity Type—any member of a hierarchy or group (see Tables 1, 2 and 3);
2. Entity—a particular, discrete unit that has functions defined by being an item of one or more entity type, being an element and/or resource within one or more entities and/or being an element and/or resource within one or more types of entities;
3. Subject entity—entity (900), collaboration/combination of entities (925) or a system (950) as shown in FIG. 2A, FIG. 2B or FIG. 3 respectively with one or more defined functions;
4. Function—production, destruction and/or maintenance of an element, resource and/or entity. Examples: maintaining room temperature at 72 degrees Fahrenheit, destroying cancer cells and producing insulin;
5. Characteristic—numerical or qualitative indication of entity status—examples: temperature, color, shape, distance weight, and cholesterol level (descriptive data is the source of data about characteristics) and the acceptable range for these characteristics (aka constraints);
6. Event—something that takes place in a defined point in space time, the events of interest are generally those that are recorded and change the elements, resources and/or function measure performance of a subject entity and/or change the characteristics of an entity;
7. Project—action that changes a characteristic, produces one or more new resources, produces one or more new elements or some combination thereof that impacts entity function performance—are analyzed using same method, system and media described for event and extreme event analysis;
8. Action—acquisition, consumption, destruction, production or transfer of resources, elements and/or entities in a defined point in space time—examples: blood cells transfer oxygen to muscle cells and an assembly line builds a product. Actions are a subset of events and are generally completed by a process;
9. Data—anything that is recorded—includes transaction data, descriptive data, content, information and knowledge;
10. Information—data with context of unknown completeness;
11. Knowledge—data with complete context—all seven types of layers are defined and complete to the extent possible given uncertainty;
12. Transaction—anything that is recorded that isn't descriptive data. Transactions generally reflect events and/or actions for one or more entities over time (transaction data is source);
13. Function—behavior or performance of the subject entity—the primary types of behavior are actions and maintenance;
14. Measure—quantitative indication of one or more subject entity functions—examples: cash flow, patient survival rate, bacteria destruction percentage, shear strength, torque, cholesterol level, and pH maintained in a range between 6.5 and 7.5;
15. Element—also known as a context element these are entities that participate in and/or support one or more subject entity actions without normally being consumed by the action—examples: land, heart, Sargasso sea, relationships, wing and knowledge (see FIG. 2A);
16. Element combination—two or more elements that share performance drivers to the extent that they need to be analyzed as a single element;
17. Item—an item is an instance of an element, factor or data. For example, an individual salesman would be an "item" within the sales department element (or entity). In a similar fashion a gene would be an item within a dna entity. While there are generally a plurality of items within an element, it is possible to have only one item within an element;
18. Item variables are the transaction data and descriptive data associated with an item or related group of items;
19. Indicators (also known as item performance indicators and/or factor performance indicators) are data derived from data related to an item or a factor;
20. Composite variables for a context element or element combination are mathematical combinations of item variables and/or indicators, logical combinations of item variables and/or indicators and combinations thereof;

21. Element variables or element data are the item variables, indicators and composite variables for a specific context element or sub-context element;
22. Sub Element—a subset of all items in an element that share similar characteristics;
23. Asset—subset of elements that support actions and are usually not transferred to other entities and/or consumed—examples: brands, customer relationships, information and equipment;
24. Agent—subset of elements that can participate in an action. Six distinct kinds of agents are recognized—initiator, negotiator, closer, catalyst, regulator, messenger. A single agent may perform several agent functions—examples: customers, suppliers and salespeople;
25. Resource—entities that are routinely transferred to other entities and/or consumed—examples: raw materials, products, information, employee time and risks;
26. Sub Resource—a subset of all resources that share similar characteristics;
27. Process—combination of elements actions and/or events that are required to complete an action or event—examples: sales process, cholesterol regulation and earthquake. Processes are a special class of element;
28. Commitment—an obligation to complete a transaction in the future—example: contract for future sale of products and debt;
29. Competitor—an entity that seeks to complete the same actions as the subject entity, competes for elements, competes for resources or some combination thereof;
30. Component of context—types of elements (i.e. buildings), types of factors (i.e. temperature), types of resources (i.e. water), types of transactions (i.e. purchases) and/or types of events (i.e. storms);
31. Sub-component of context—specific element (i.e. headquarters building), specific factor (i.e. temperatures above 90 degrees), specific resources (i.e. water from Reflecting Pond), specific transactions (i.e. purchase of a server) and/or events (i.e. Easter hurricane).
32. Priority—relative importance assigned to actions and measures;
33. Requirement—minimum or maximum levels for one or more elements, element characteristics, actions, events, processes or relationships, may be imposed by user (40), laws (1306) or physical laws (i.e. force=mass times acceleration);
34. Surprise—variability or events that improve subject entity performance;
35. Risk—variability or events that reduce subject entity performance;
36. Extreme risk—caused by variability or extreme events that reduce subject entity performance by producing a permanent changes in the relationship of one or more elements or factors to the subject entity;
37. Critical risk—extreme risks that can terminate a subject entity;
38. Competitor risk—risks that are a result of actions by an entity that competes for resources, elements, actions or some combination thereof;
39. Factor—entities external to subject entity that have an impact on entity performance—examples: commodity markets, weather, earnings expectation—as shown in FIG. 2A factors are associated with entities that are outside the box. All higher levels in the hierarchy of an entity are also defined as factors.
40. Composite factors—are numerical indicators of: external entities that influence performance; conditions external to the entity that influence performance, conditions of the entity compared to external expectations of entity conditions or the performance of the entity compared to external expectations of entity performance;
41. Factor variables are the transaction data and descriptive data associated with context factors;
42. Factor performance indicators (also known as indicators) are data derived from factor related data;
43. Composite factors (also known as composite variables) for a context factor or factor combination are mathematical combinations of factor variables and/or factor performance indicators, logical combinations of factor variables and/or factor performance indicators and combinations thereof;
44. A layer is software and/or information that gives an application, system, device or layer the ability to interact with another layer, device, system, application or set of information at a general or abstract level rather than at a detailed level;
45. Context frames include all context layers relevant to function measure performance for a defined combination of one or more entities and one or more entity functions. In one embodiment, each context frame is a series of pointers (like a virtual database) that are stored within a separate table;
46. Complete Context is a shorthand way of noting that all seven types of context layers have been defined for a given subject entity function measure (or six layers for multi-entity organizations or entities from the organization domain that have only one function measure) it is also a proprietary trade-name designation for applications with a context quotient of 200;
47. Complete Entity Context—Complete Context for all entity function measures;
48. Contextbase is a database that organizes data and information by context for one or more subject entities. The data can be organized by context layer in a relational database, a flat database a virtual database and combinations thereof;
49. Total risk is the sum of all variability risks and event risks for a subject entity. For an entity with publicly traded equity, total risk is defined by the implied volatility associated with options on entity equity;
50. Variability risk is a subset of total risk. It is the risk of reduced or impaired performance caused by variability in factors, resources (including processes) and/or elements. Variability risk is quantified using statistical measures like standard deviation per month, per year or over some other time period. The covariance and dependencies between different variability risks are also determined because simulations require quantified information regarding the inter-relationship between the different risks to perform effectively;
51. Industry market risk is a subset of variability risk for an entity with publicly traded equity. It is defined as the implied variability associated with a portfolio that is in the same SIC code as the entity—industry market risk can be substituted for base market risk in order to get a clearer picture of the market risk specific to stock for an entity;
52. Event risk is a subset of total risk. It is the risk of reduced or impaired performance caused by the occurrence of an event. Event risk is quantified by combining a forecast of event frequency with a forecast of event impact on subject entity resources, elements (including processes) and the entity itself;
53. Contingent liabilities are a subset of event risk where the impact of an event occurrence is defined;

54. Uncertainty measures the amount of subject entity function measure performance that cannot be explained by the elements, factors, resources and risks that have been identified by the system of the present invention. Source of uncertainty include:

55. Real options are defined as tangible options the entity may have to make a change in its behavior/performance at some future date—these can include the introduction of new elements or resources, the ability to move processes to new locations, etc. Real options are generally supported by the elements of an entity;

56. The efficient frontier is the curve defined by the maximum function measure performance an entity can expect for a given level of total risk; and 57. Services are self-contained, self-describing, modular pieces of software that can be published, located, and invoked across a World Wide Web (web services) or a grid (grid services). Bots and agents can be functional equivalents to services. There are two primary types of services: RPC (remote procedure call) oriented services and document-oriented services. RPC-oriented services request the performance of a specific function and wait for a reply before moving on. Document-oriented services allow a client to send a document to a server without having to wait for the service to be completed and as a result are more suited for use in process networks. The system of the present invention can function using: web services, grid services, bots (or agents), client server architecture, and integrated software application architecture or combinations thereof.

We will use the terms defined above and the keywords that were defined as part of complete context definition when detailing one embodiment of the present invention. In any event, we can now use the key terms to better define the seven type's context layers and identify the typical source for the required information as shown below.

1. The element context layer identifies and describes the entities that impact subject entity function measure performance. The element description includes the identification of any sub-elements and preferences. Preferences are a particularly important characteristic for process elements that have more than option for completion. Elements are initially identified by the chosen subject entity hierarchy (elements associated with lower levels of a hierarchy are automatically included) transaction data identifies others as do analysis and user input. These elements may be identified by item or sub-element. The primary sources of data are devices (3), narrow system databases (5), partner system databases (6), external databases (7), the World Wide Web (8), xml compliant applications, the Complete Context™ Input System (601) and combinations thereof.

2. The resource context layer identifies and describes the resources that impact subject entity function measure performance. The resource description includes the identification of any sub-resources. The primary sources of data are narrow system databases (5), partner system databases (6), external databases (7), the World Wide Web (8), xml compliant applications, the Complete Context™ Input System (601) and combinations thereof.

3. The environment context layer identifies and describes the factors in the social, natural and/or physical environment that impact subject entity function measure performance. The relevant factors are determined via analysis. The factor description includes the identification of any sub-factors. The primary sources of data are external databases (7) and the World Wide Web (8).

4. The transaction context layers identifies and describes the events, actions, action priorities, commitments and requirements of the subject entity and each entity in the element context layer by time period. The description identifies the elements and/or resources that associated with the event, action, action priority, commitment and/or requirement. The primary sources of data are narrow system databases (5), partner system databases (6), external databases (7), the World Wide Web (8), xml compliant applications, the Complete Context™ Input System (601) and combinations thereof.

5. The relationship context layer defines the relationships between the first three layers (elements, resources and/or factors) and the fourth layer (events and/or actions) by time period. These relationships are identified by user input (i.e. process maps and procedures) and analysis.

6. The measure context layer(s) identifies and quantifies the impact of actions, events, elements, factors, resources and processes (combination of elements) on each entity function measure by time period. The impact of risks and surprises can be kept separate or integrated with other element/factor measures. The impacts are determined via analysis; however, the analysis can be supplemented by input from simulation programs, a subject matter expert (42) and/or a collaborator (43).

7. Reference layer—the relationship of the first six layers to a specified spatial coordinate system. These relationships are identified by user input (i.e. maps) and analysis.

The sum of the information from all the specified context layers defines complete context for entity performance by time period. We can use the more precise definition of context to define knowledge. Our revised definition would state that an individual that is knowledgeable about a subject entity has information from all seven context layers for the one or more functions he or she is considering. The knowledgeable individual would be able to use the information from the seven types of context layers to identify the range of contexts where previously developed models of entity function performance are applicable; and accurately predict subject entity actions in response to events and/or actions in contexts where the previously developed knowledge is applicable.

The accuracy of the prediction created using the seven types of context layers reflects the level of knowledge. For simplicity we will use the R squared ($R^2$) statistic as the measure of knowledge level. $R^2$ is the fraction of the total squared error that is explained by the model—other statistics can be used to provide indications of the entity model accuracy including entropy measures and root mean squared error. The gap between the fraction of performance explained by the model and 100% is uncertainty. Table 10 illustrates the use of the information from six of the seven layers in analyzing a sample business context and a sample medical context.

TABLE 10

| Business (shareholder value maximization measure) | Medical (patient health & longevity, financial break even measures) |
|---|---|
| Environment: competitor is trying to form a relationship with Acme | Environment: malpractice insurance is increasingly costly |
| Measure: we will receive $20 profit per widget also Acme is a valuable customer and a key supplier, relationship damage will decrease returns and increase risk | Measure: survival rate is 99% for procedure A and 98% for procedure B; treatment in first week improves 5 year survival 18%, 5 year reoccurrence rate is 7% higher for procedure A |

TABLE 10-continued

| Business (shareholder value maximization measure) | Medical (patient health & longevity, financial break even measures) |
|---|---|
| Relationship: Acme supports project X in international division | Relationship: Dr. X has a commitment to assist on another procedure Monday |
| Resource: 25 units are in inventory | Resource: operating room A time available for both procedures |
| Transaction: need 100 widgets by Tuesday for Acme, need to start production Friday | Transaction: patient should be treated next week, his insurance will cover operation |
| Element: widgets, warehouse, automated lathe | Element: operating room, operating room equipment, Dr. X |

In addition to defining knowledge, context layers are useful in developing management tools.

In one embodiment, the Complete Context™ Search System (100) provides the functionality for integrating data from all narrow systems (4) and creating the Contextbase (50). Over time, the narrow systems (4) can be eliminated and all data can be entered directly into the complete context search system (100) as discussed previously.

The Complete Context™ Search System (100) takes a novel approach to developing the knowledge. Narrow systems (4) generally try to develop a picture of how part of an entity is performing. The user (40) can then be left with an enormous effort to integrate these different parts—often developed from different perspectives—to form a complete picture of performance. By way of contrast, the Complete Context™ Search System (100) develops complete pictures of entity performance for all defined functions in a common format, saves these pictures in the Contextbase (50) before dividing and recombining these pictures with other pictures as required to provide the detailed information regarding any portion of the entity that is being analyzed or reviewed.

The Complete Context™ Search System (100) provides several other important features, including:
1. The system learns from the data which means that the same applications can be used to manage new aspects of entity performance as they become important without having to develop a new system; and
2. The user is free to specify any combination of functions (with measures) for analysis.

BRIEF DESCRIPTION OF DRAWINGS

These and other objects, features and advantages of the present invention will be more readily apparent from the following description of one embodiment of the invention in which:

FIG. 2A and FIG. 2B are block diagrams showing a relationship of elements, events, factors, processes and subject entity measures;

FIG. 7A, FIG. 7B, FIG. 7C, FIG. 7D, FIG. 7E, FIG. 7F, FIG. 7G and FIG. 7H are block diagrams showing the sequence of steps in the present invention used for creating a Contextbase (50) for a subject entity;

FIG. 15 is a diagram showing how the node depth and impact cutoff criteria are used to determine which context layers are indexed; and FIG. 16 is a diagram showing how the node depth and impact cutoff criteria are used to determine which components of context are indexed.

DETAILED DESCRIPTION OF AN EMBODIMENT

Figure 1:
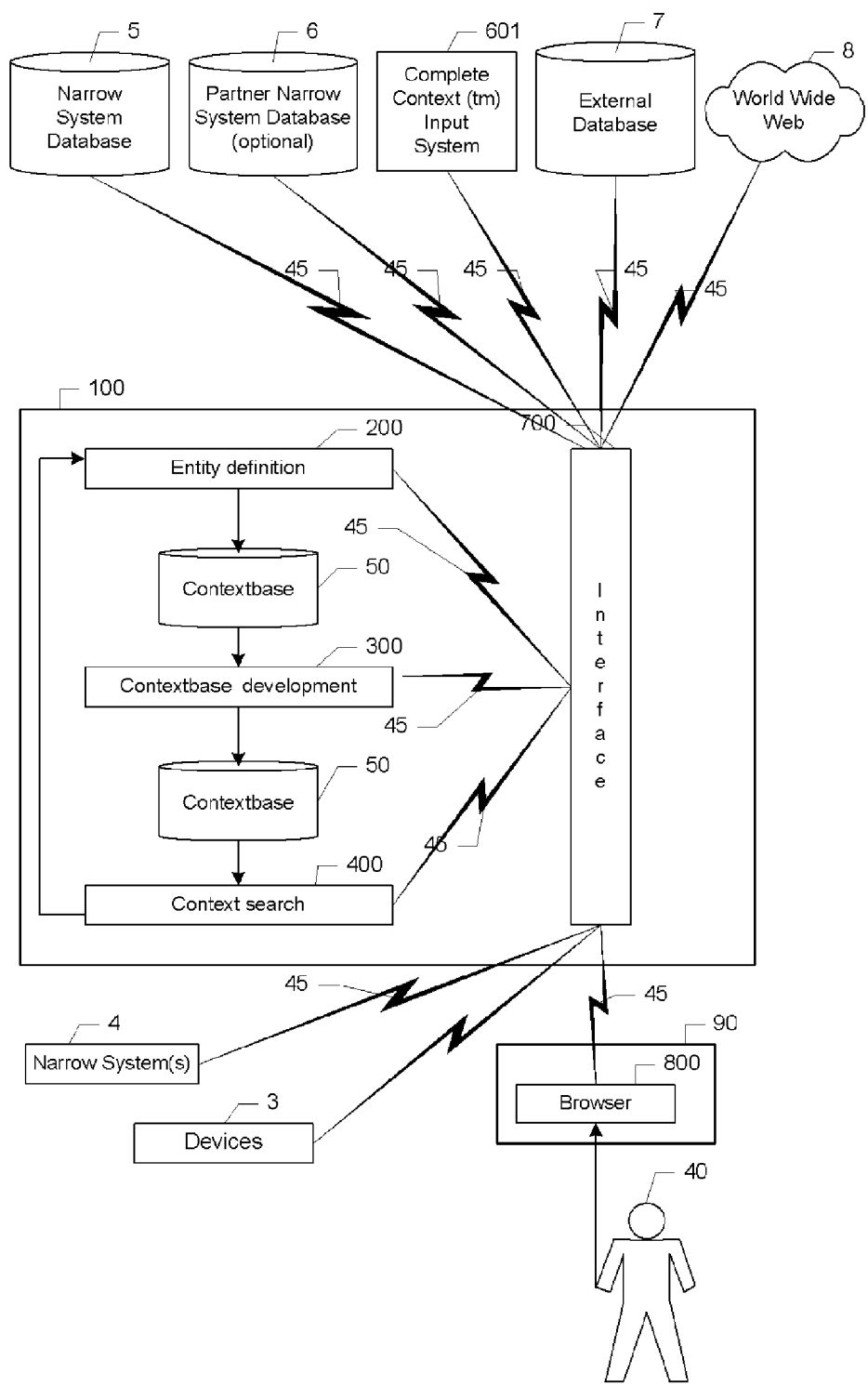
FIG. 1 is a block diagram showing the major processing steps of the present invention.

FIG. 1 provides an overview of the processing completed by the innovative system for Complete Context™ Search processing. In accordance with the present invention, an automated system (100) and method for developing a Contextbase (50) that contains up to seven types of context layers for each entity measure is provided. Processing starts in this system (100) when the data preparation portion of the application software (200) extracts data from a narrow system database (5); an external database (7); a world wide web (8) and optionally, a partner narrow system database (10) via a network (45). The World Wide Web (8) also includes the semantic web that is being developed. Data may also be obtained from a Complete Context™ Input System (601) or any other application that can provide xml output via the network (45) in this stage of processing. For example, newer versions of Microsoft® Office and Adobe® Acrobat® can be used to provide data input to the system (100) of the present invention.

After data is prepared, entity functions are defined and entity measures are identified, the Contextbase (50) is developed by the second part of the application software (300). The processing completed by the system (100) may be influenced by a user (40) or a manager (41) through interaction with a user-interface portion of the application software (700) that mediates the display, transmission and receipt of all information to and from a browser software (800) such as the Safari, Firefox, Opera or the Microsoft Internet Explorer® in an access device (90) such as a phone, personal digital assistant or personal computer where data are entered by the user (40).

The user (40) and/or manager can also use a natural language interface (714) provided by the system (100) to interact with the system.

While only one database of each type (5, 6 and 7) is shown in FIG. 1, it is to be understood that the system (100) can process information from all narrow systems (4) listed in Table 4 for each entity being supported. In one embodiment, all functioning narrow systems (4) within each entity will provide data to the system (100) via the network (45). It should also be understood that it is possible to complete a bulk extraction of data from each database (5, 6 and 7) and the World Wide Web (8) via the network (45) using peer to peer networking and data extraction applications. The data extracted in bulk could be stored in a single datamart, a data warehouse or a storage area network where the analysis bots in later stages of processing could operate on the aggregated data. A virtual database that would leave all data in the original databases where it could be retrieved and optionally converted as required for calculations by the analysis bots over a network (45) can also be used.

Figure 4:
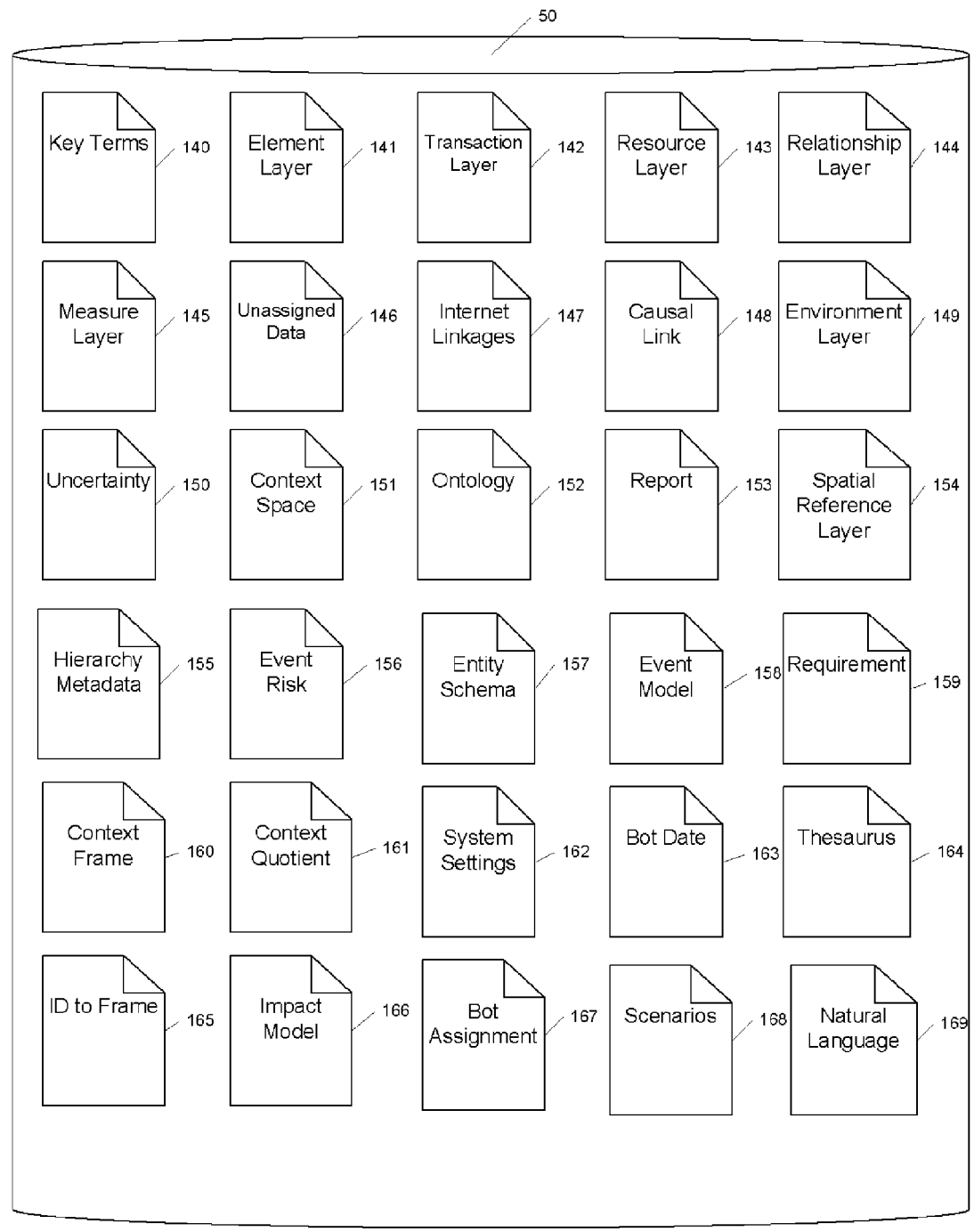
FIG. 4 is a diagram showing the tables in the Contextbase (50) of the present invention that are utilized for data storage and retrieval during the processing.

The operation of the system of the present invention is determined by the options the user (40) and manager (41) specify and store in the Contextbase (50). As shown in FIG. 4, the Contextbase (50) contains tables for storing extracted information by context layer including: a key terms table (140), a element layer table (141), a transaction layer table (142), an resource layer table (143), a relationship layer table (144), a measure layer table (145), a unassigned data table (146), an internet linkage table (147), a causal link table (148), an environment layer table (149), an uncertainty table (150), a context space table (151), an ontology table (152), a report table (153), a spatial reference layer table (154), a hierarchy metadata table (155), an event risk table (156), an entity schema table (157), an event model table (158), a requirement table (159), a context frame table (160), a context quotient table (161), a system settings table (162), a bot date table (163), a Thesaurus table (164), an id to frame table (165), an impact model table (166), a bot assignment table (167), a scenarios table (168) and a natural language table (169). The Contextbase (50) can exist as a database, datamart, data warehouse, a virtual repository, a virtual database or storage area network. The system of the present invention has the ability to accept and store supplemental or primary data directly from user input, a data warehouse, a virtual database, a data preparation system or other electronic files in addition to receiving data from the databases described previously. The system of the present invention also has the ability to complete the necessary calculations without receiving data from one or more of the specified databases. However, in one embodiment all required information is obtained from the specified data sources (5, 6, 7, 8 and 601) for the subject entity.

Figure 5:
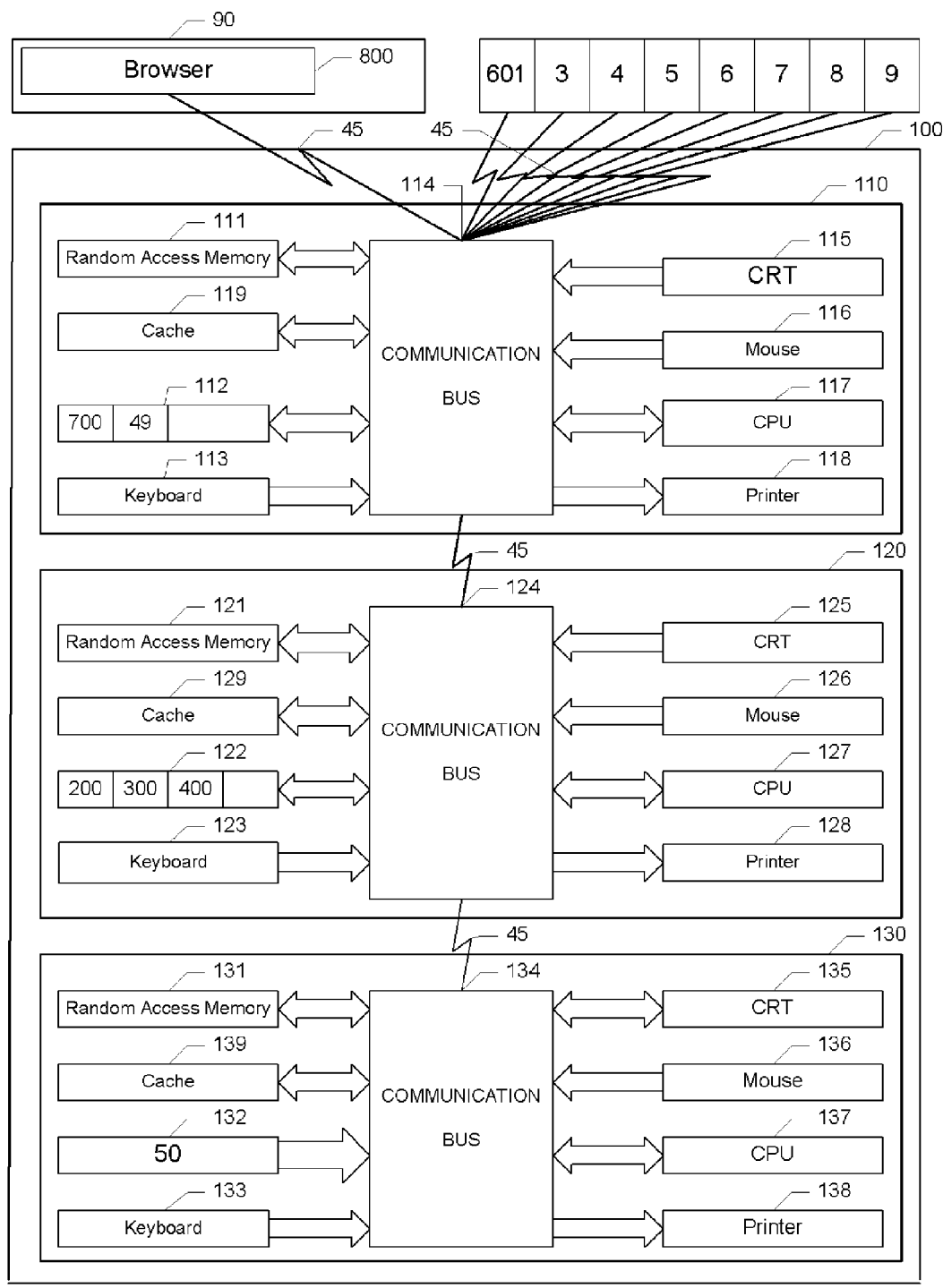
FIG. 5 is a block diagram of an implementation of the present invention.

As shown in FIG. 5, an embodiment of the present invention is a computer system (100) illustratively comprised of a user-interface personal computer (110) connected to an application-server personal computer (120) via a network (45). The application-server personal computer (120) is in turn connected via the network (45) to a database-server personal computer (130). The user interface personal computer (110) is also connected via the network (45) to an Internet browser appliance (90) that contains browser software (800) such as Microsoft Internet Explorer® or Netscape Navigator®.

In this embodiment, the database-server personal computer (130) has a read/write random access memory (131), a hard drive (132) for storage of the Contextbase (50), a keyboard (133), a communication bus (134), a display (135), a mouse (136), a CPU (137), a printer (138) and a cache (139).

The application-server personal computer (120) has a read/write random access memory (121), a hard drive (122) for storage of the non-user-interface portion of the entity section of the application software (200, 300 and 400) of the present invention, a keyboard (123), a communication bus (124), a display (125), a mouse (126), a CPU (127), a printer (128) and a cache (129). While only one client personal computer is shown in FIG. 5, it is to be understood that the application-server personal computer (120) can be networked to a plurality of client, user-interface personal computers (110) via the network (45). The application-server personal computer (120) can also be networked to a plurality of server, personal computers (130) via the network (45). It is to be understood that the diagram of FIG. 5 is merely illustrative of one embodiment of the present invention as the system of the present invention could operate with the support of a single computer, any number of networked computers, any number of virtual computers, any number of clusters, a computer grid and some combination thereof.

The user-interface personal computer (110) has a read/write random access memory (111), a hard drive (112) for storage of a client data-base (49) and the user-interface portion of the application software (700), a keyboard (113), a communication bus (114), a display (115), a mouse (116), a CPU (117), a printer (118) and a cache (119).

The application software (200, 300 and 400) controls the performance of the central processing unit (127) as it completes the calculations required to support Complete Context™ development. In the embodiment illustrated herein, the application software program (200, 300 and 400) is written in a combination of Java, C# and C++. The application software (200, 300 and 400) can use Structured Query Language (SQL) for extracting data from the databases and the World Wide Web (5, 6, 7 and 8). The user (40) and manager (41) can optionally interact with the user-interface portion of the application software (700) using the browser software (800) in the browser appliance (90) or through a natural language interface (714) provided by the system (100) to provide information to the application software (200, 300 and 400) for use in determining which data will be extracted and transferred to the Contextbase (50) by the data bots.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120, 130) shown in FIG. 5 illustratively are personal computers or workstations that are widely available for use with Linux, Unix or Windows operating systems. Typical memory configurations for client personal computers (110) used with the present invention should include at least 1028 megabytes of semiconductor random access memory (111) and at least a 200 gigabyte hard drive (112). Typical memory configurations for the application-server personal computer (120) used with the present invention should include at least 5128 megabytes of semiconductor random access memory (121) and at least a 300 gigabyte hard drive (122). Typical memory configurations for the database-server personal computer (130) used with the present invention should include at least 5128 megabytes of semiconductor random access memory (131) and at least a 750 gigabyte hard drive (132).

Using the system described above, data is extracted from the narrowly focused entity systems (4), external databases (7) and the World Wide Web (8) as required to develop a Contextbase (50), develop context frames and manage performance. In this invention, analysis bots are used to determine context element lives and the percentage of measure performance that is attributable to each context element. The resulting values are then added together to determine the contribution of each context element to the measure performance. Context factor contributions and risk impacts are calculated in a similar manner; however, they may not have defined lives.

Figure 6A:
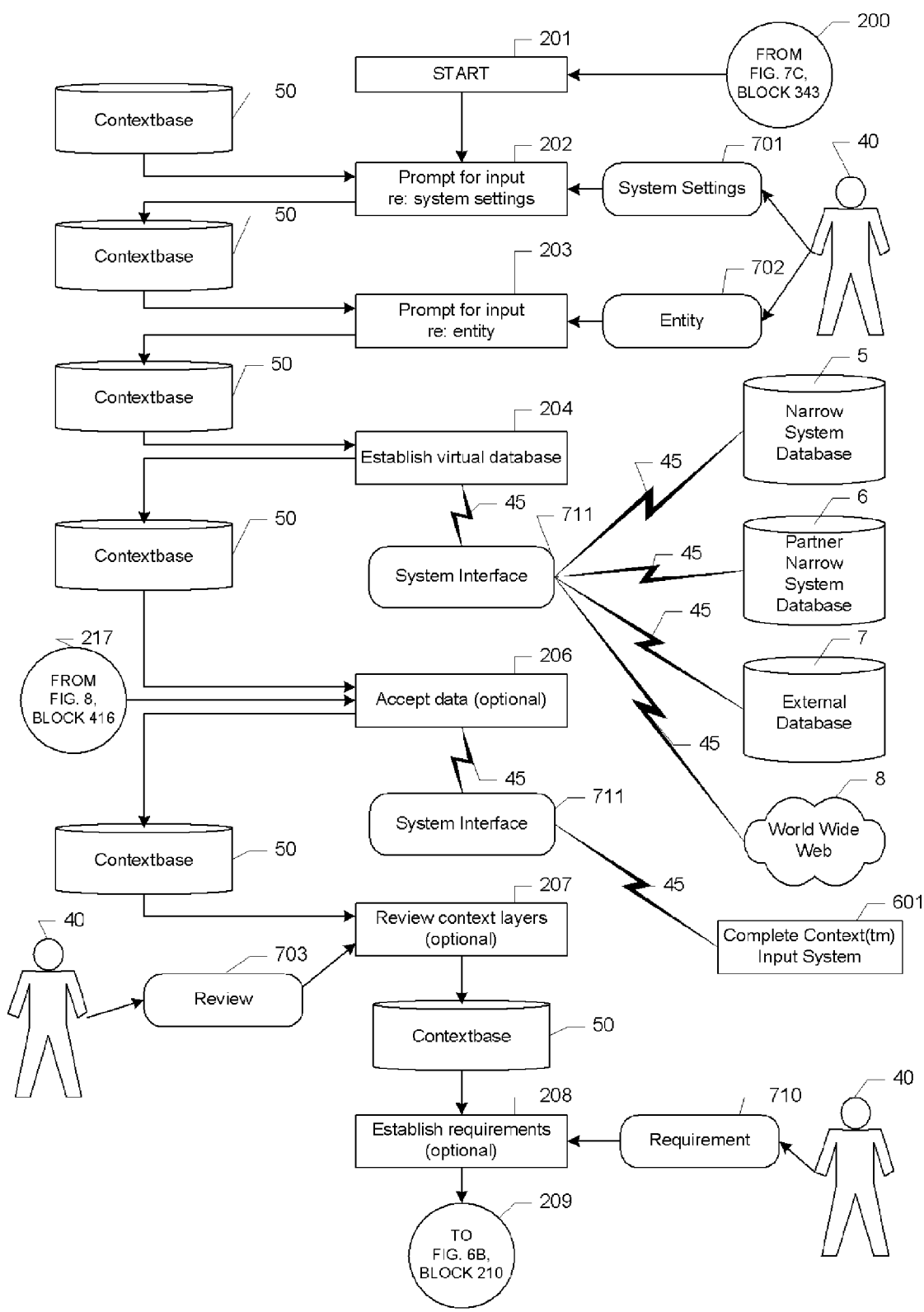
FIG. 6A, FIG. 6B and FIG. 6C are block diagrams showing the sequence of steps in the present invention used for specifying system settings, preparing data for processing and specifying the entity measures.
Figure 6B:
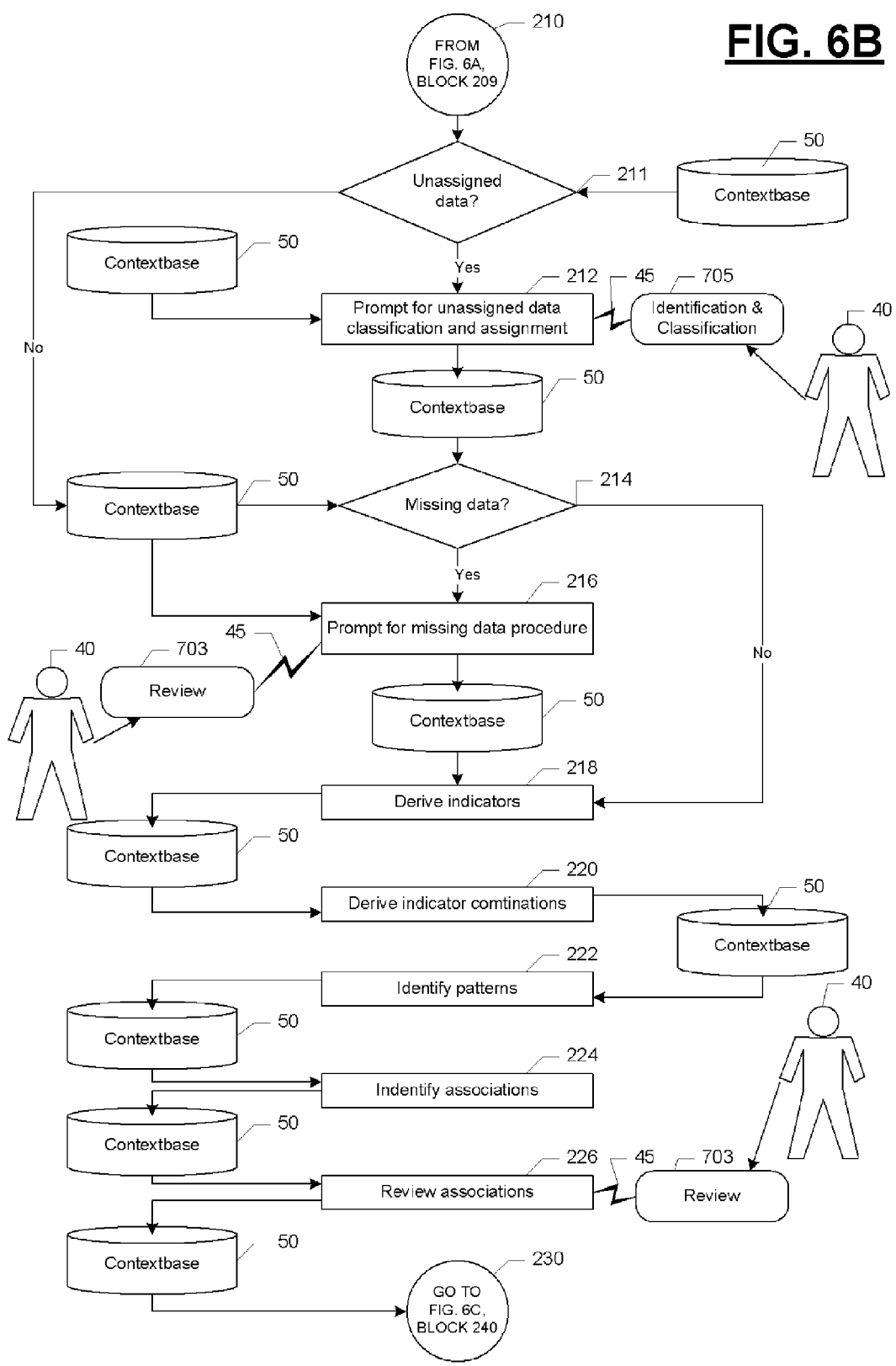
Figure 6C:
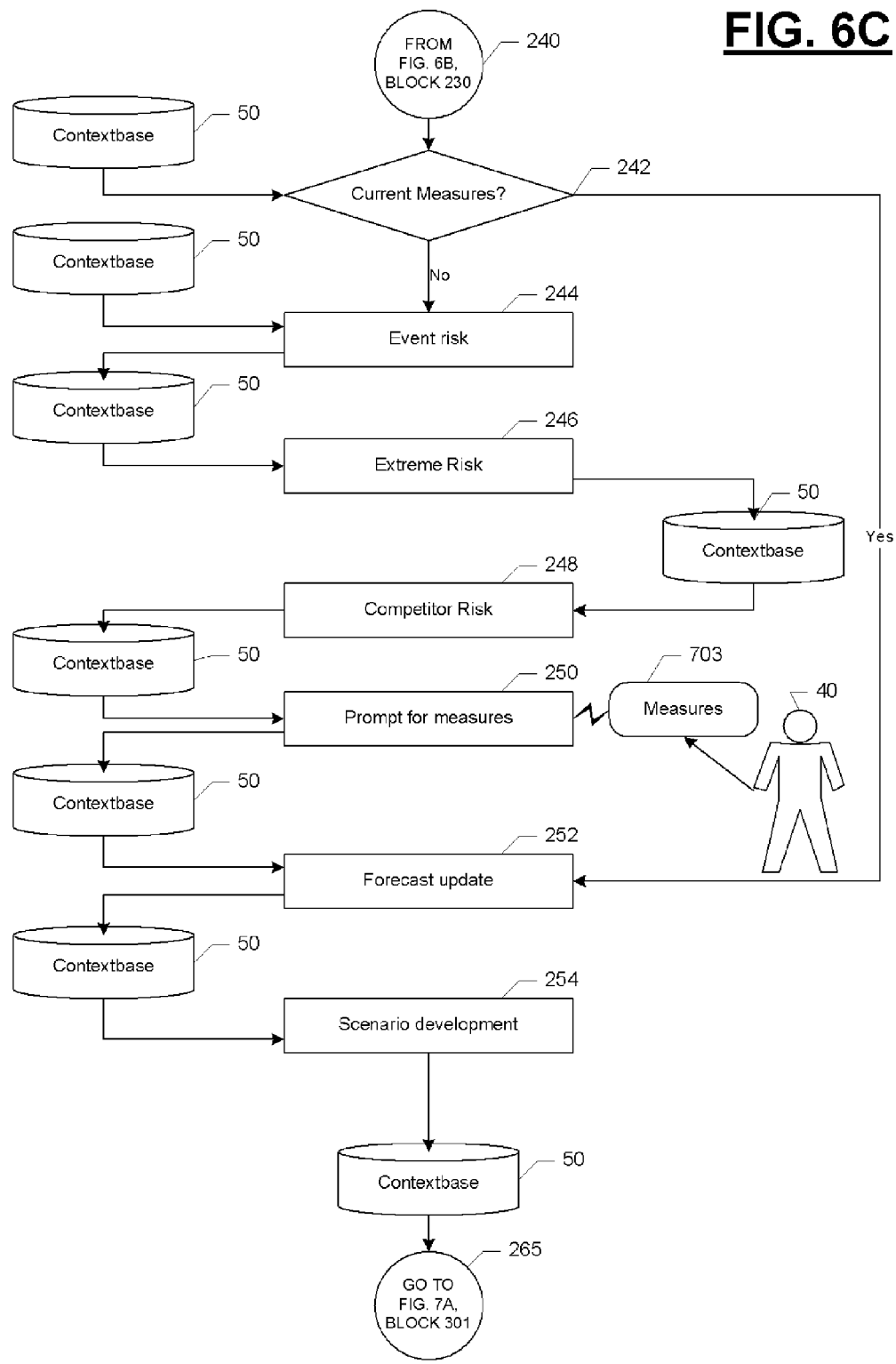
Figure 7A:
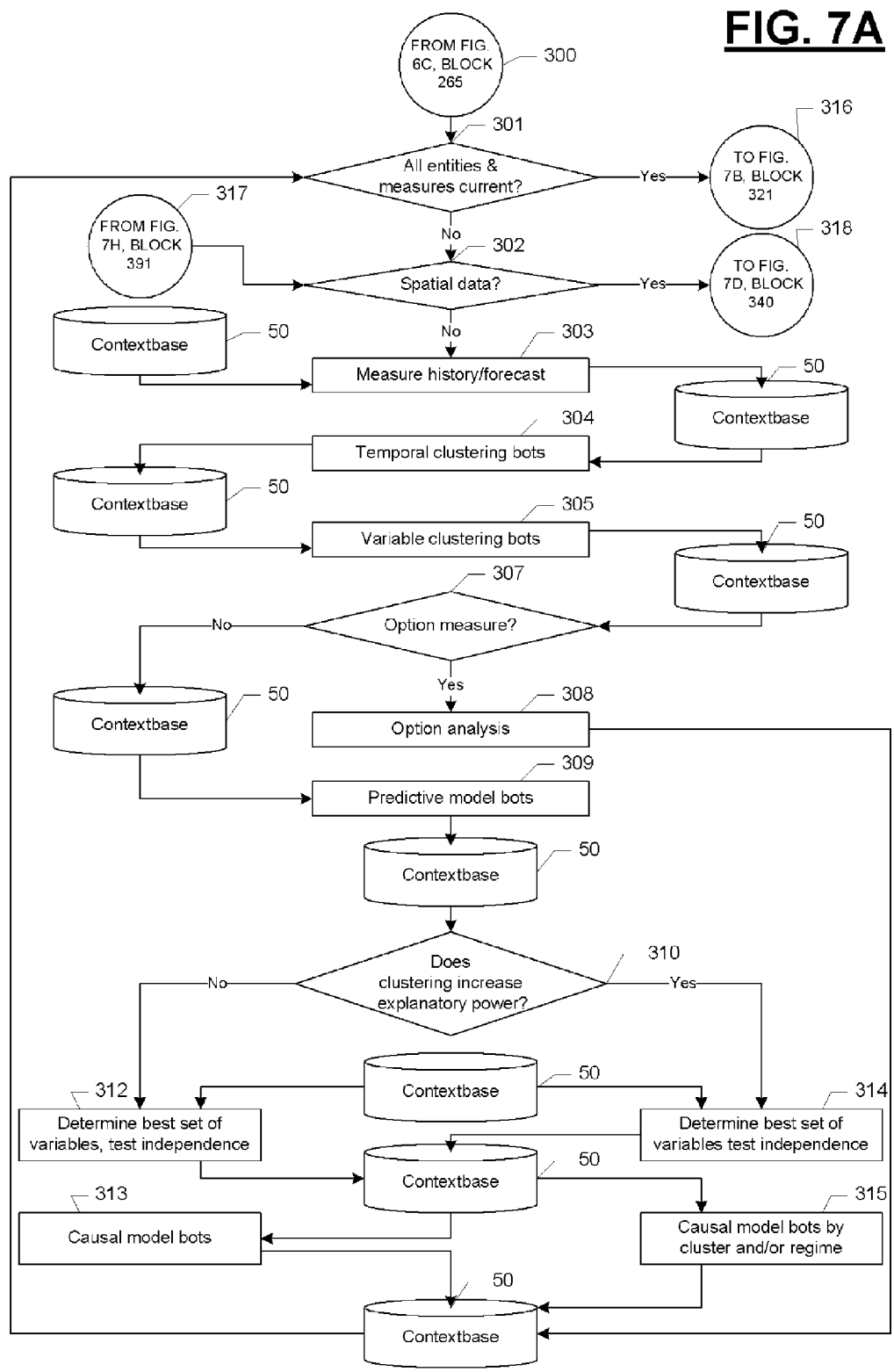
Figure 7B:
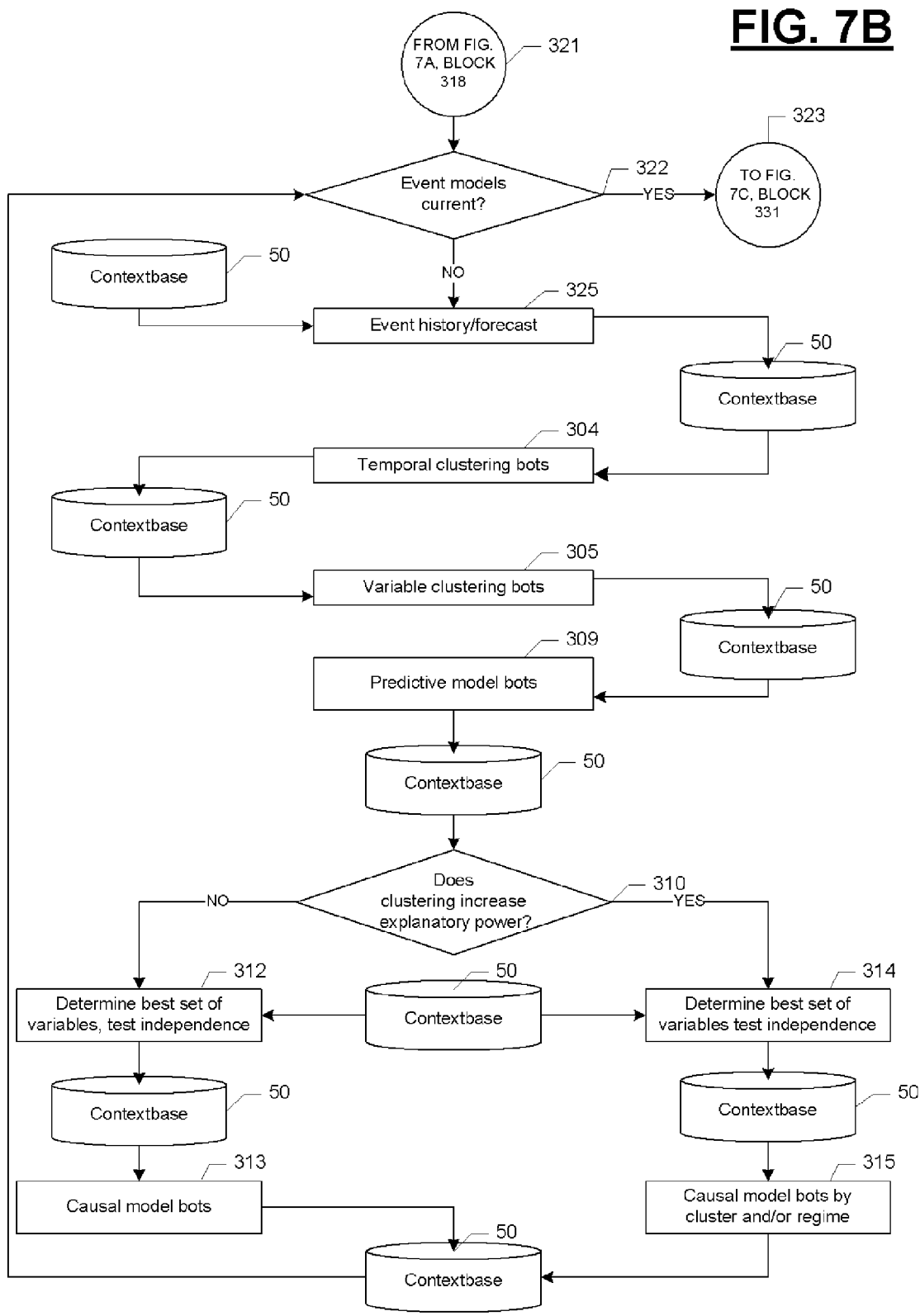
Figure 7C:
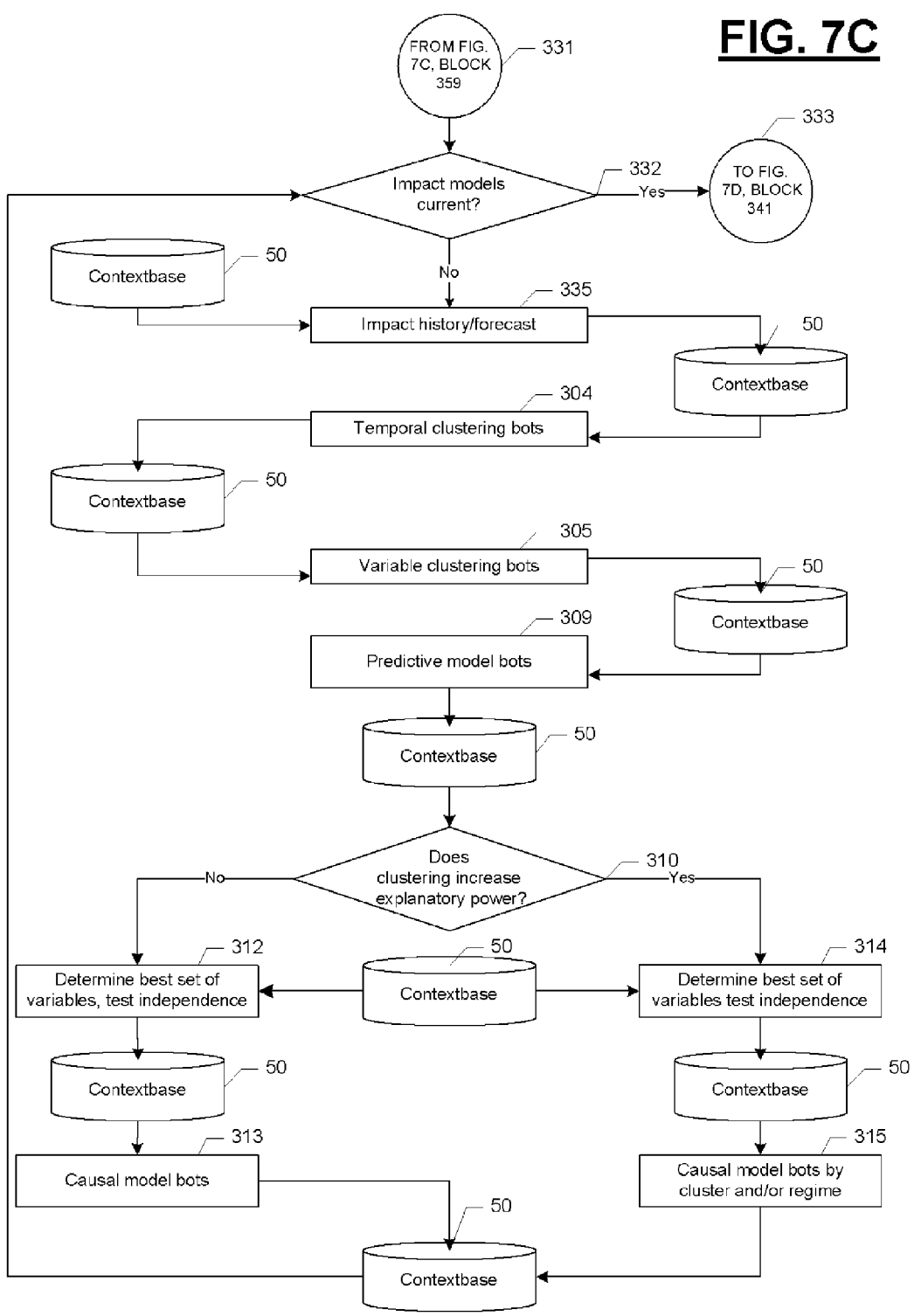
Figure 7D:
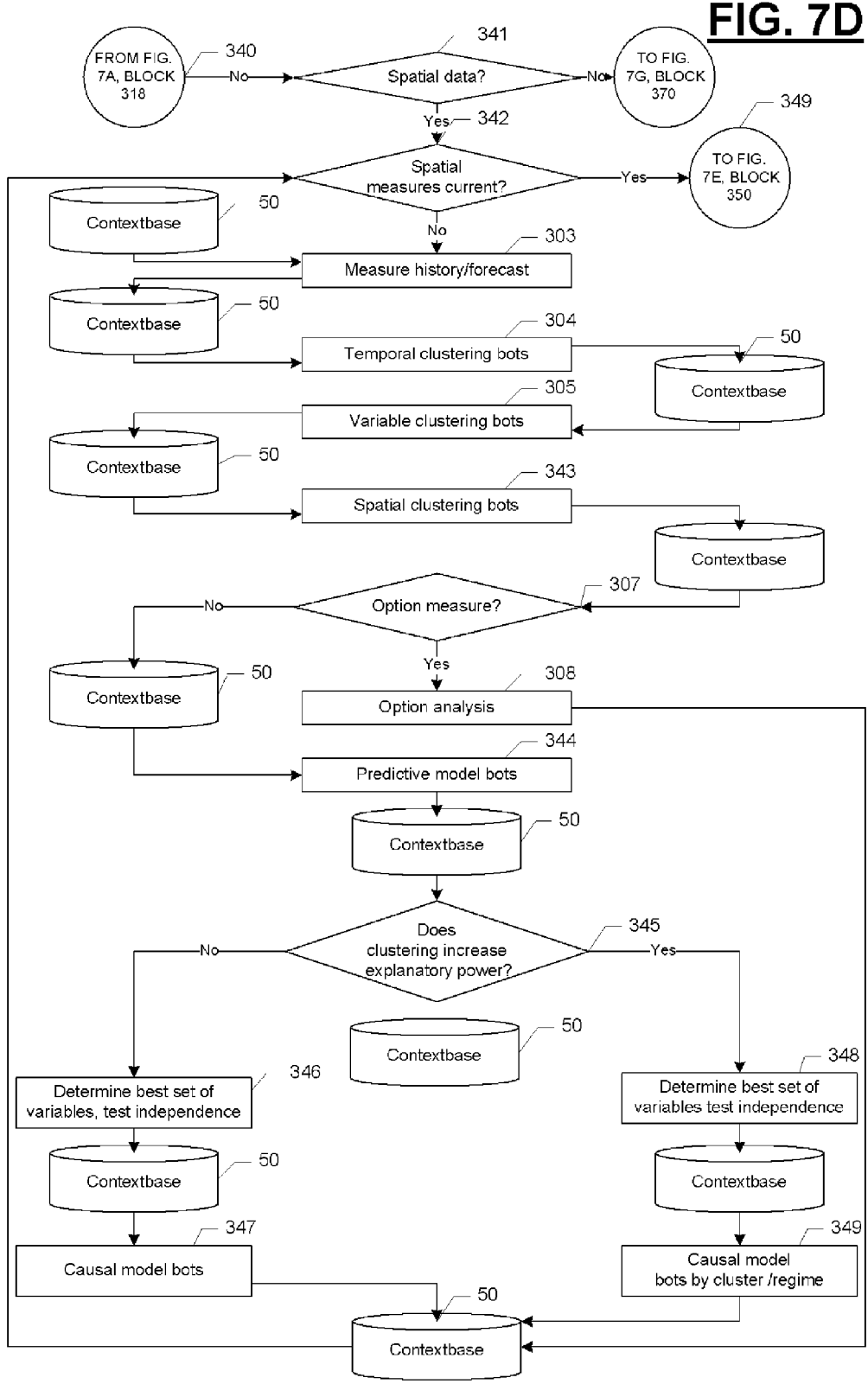
Figure 7E:
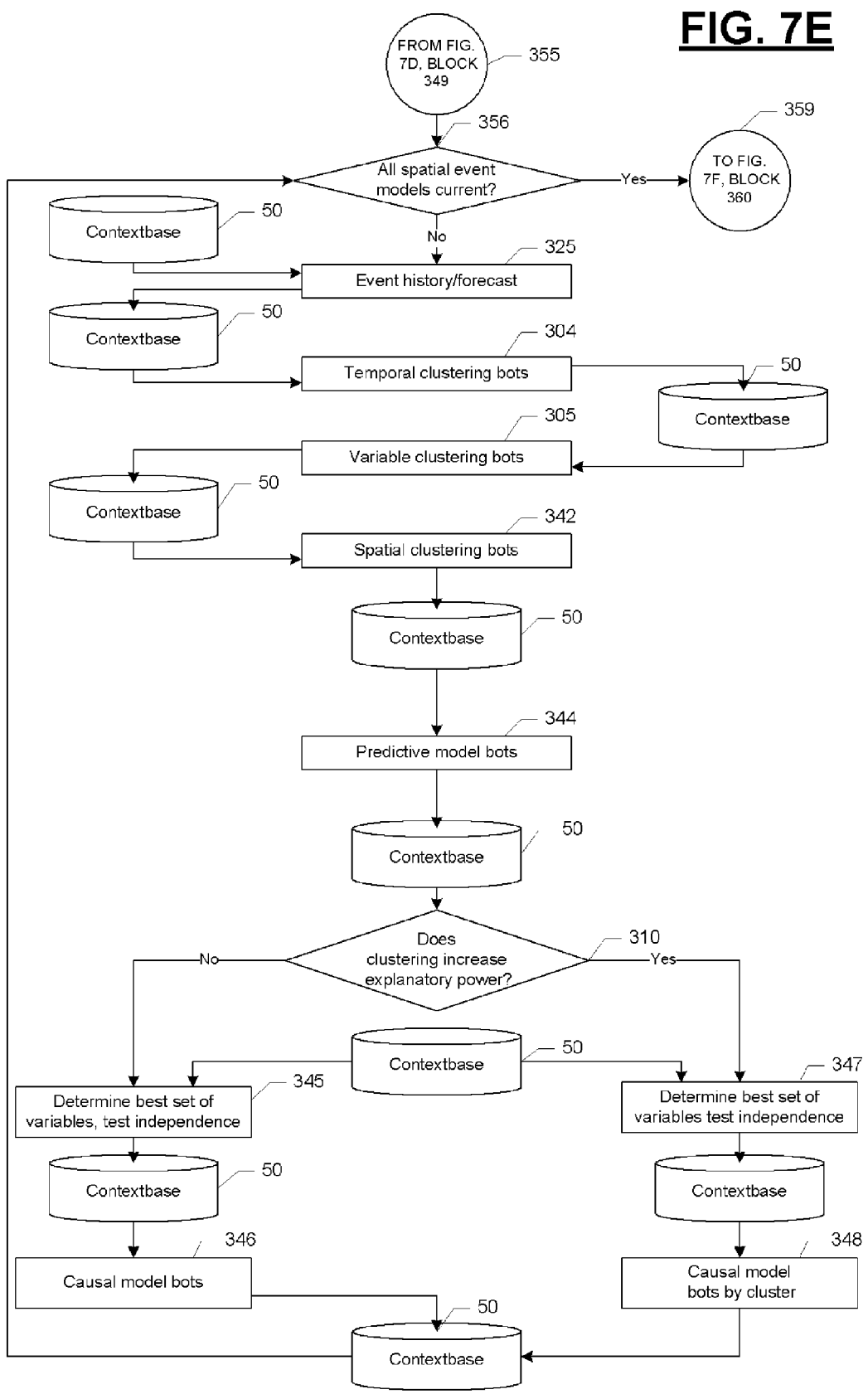
Figure 7F:
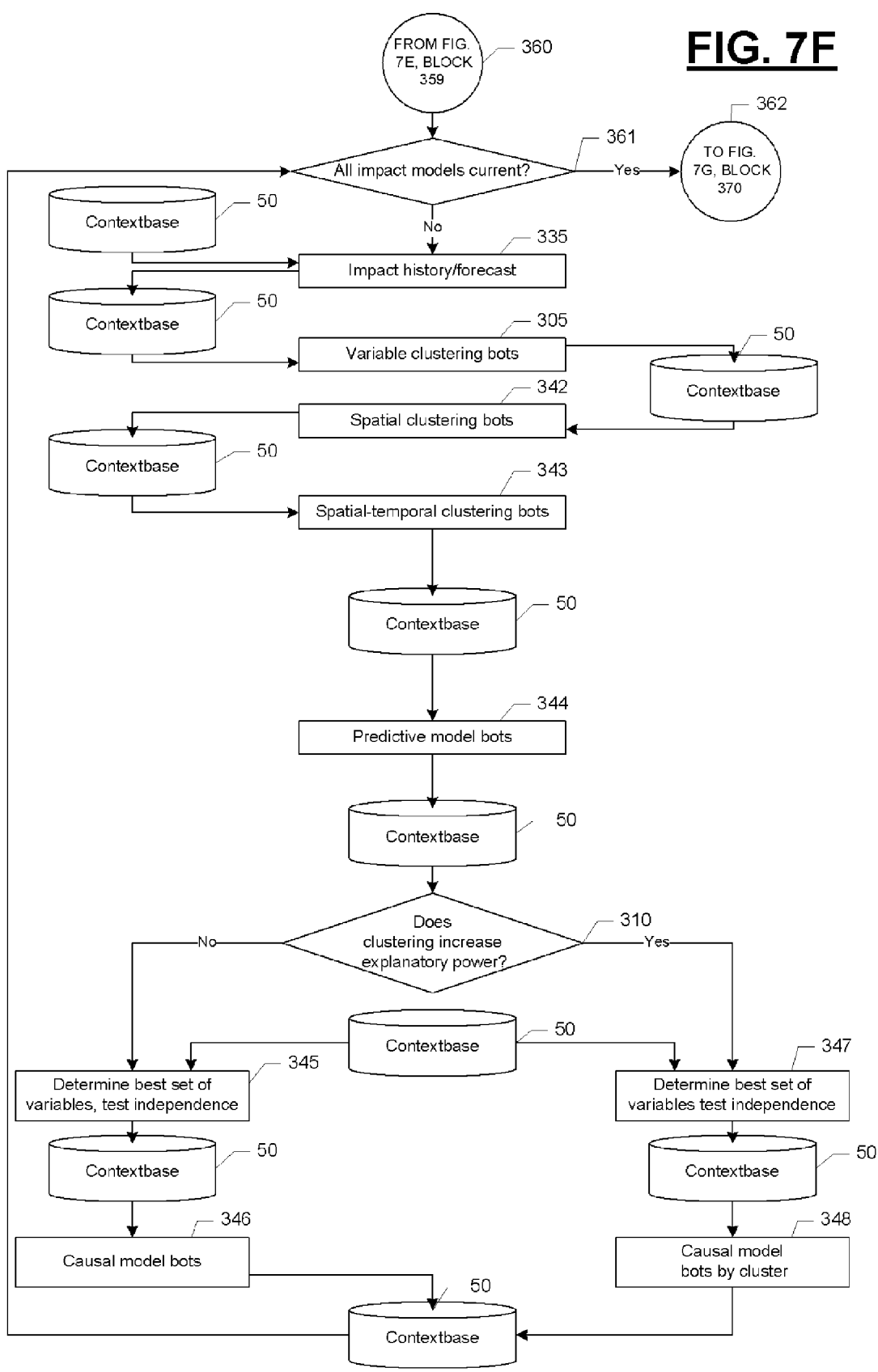
Figure 7H:
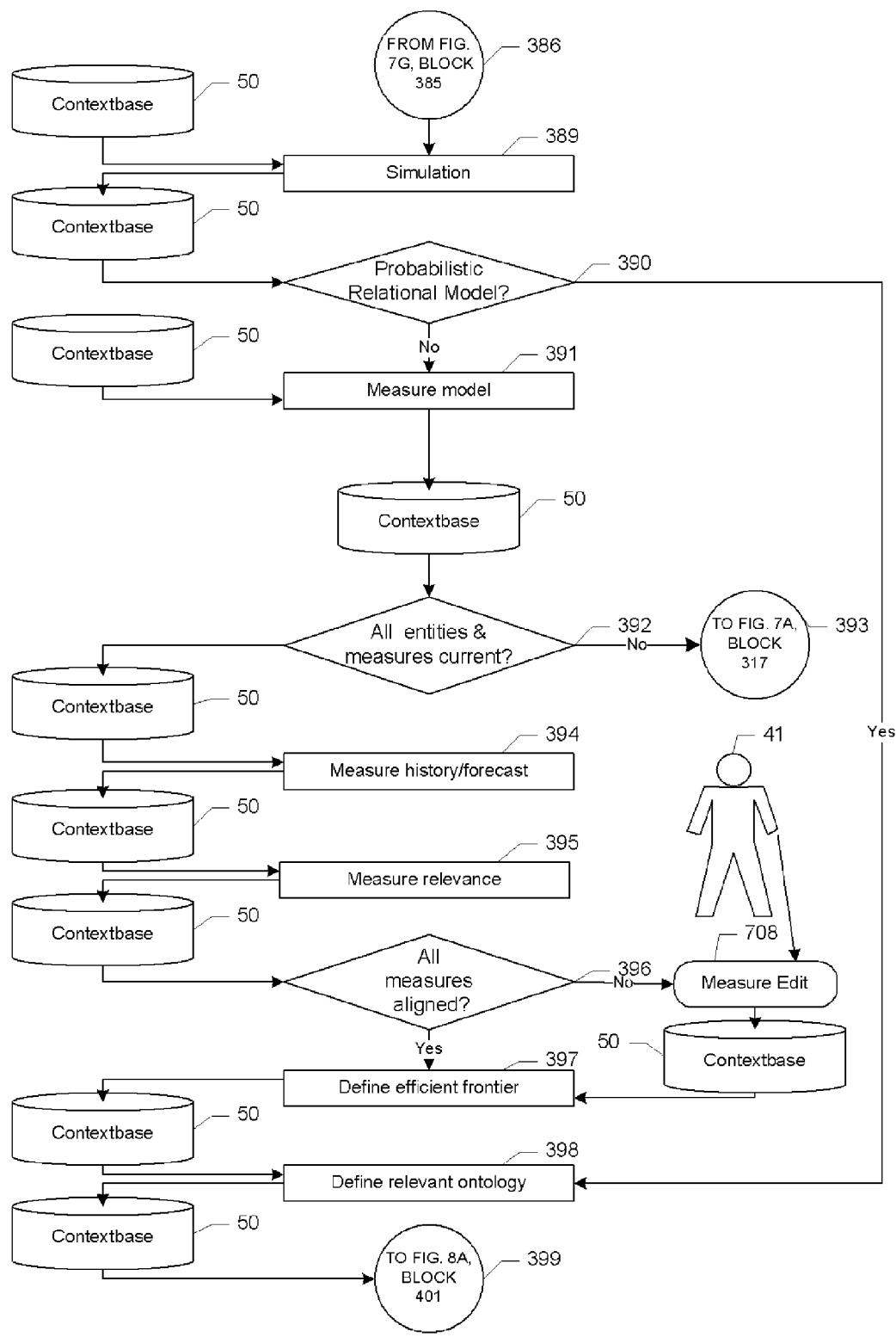
Figure 8:
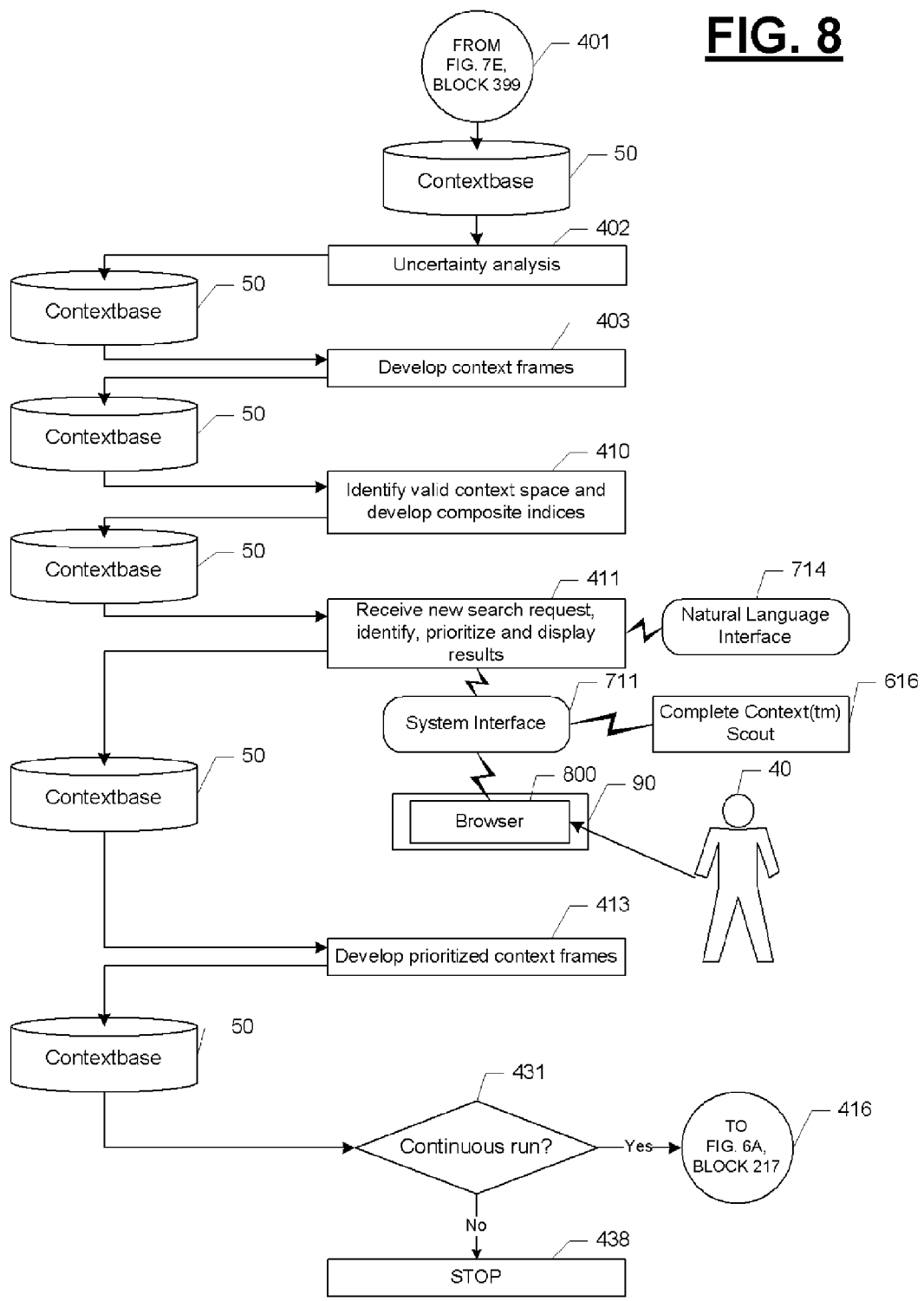
FIG. 8 is a block diagram showing the sequence in steps in the present invention used in defining context and completing queries.
Figure 9:
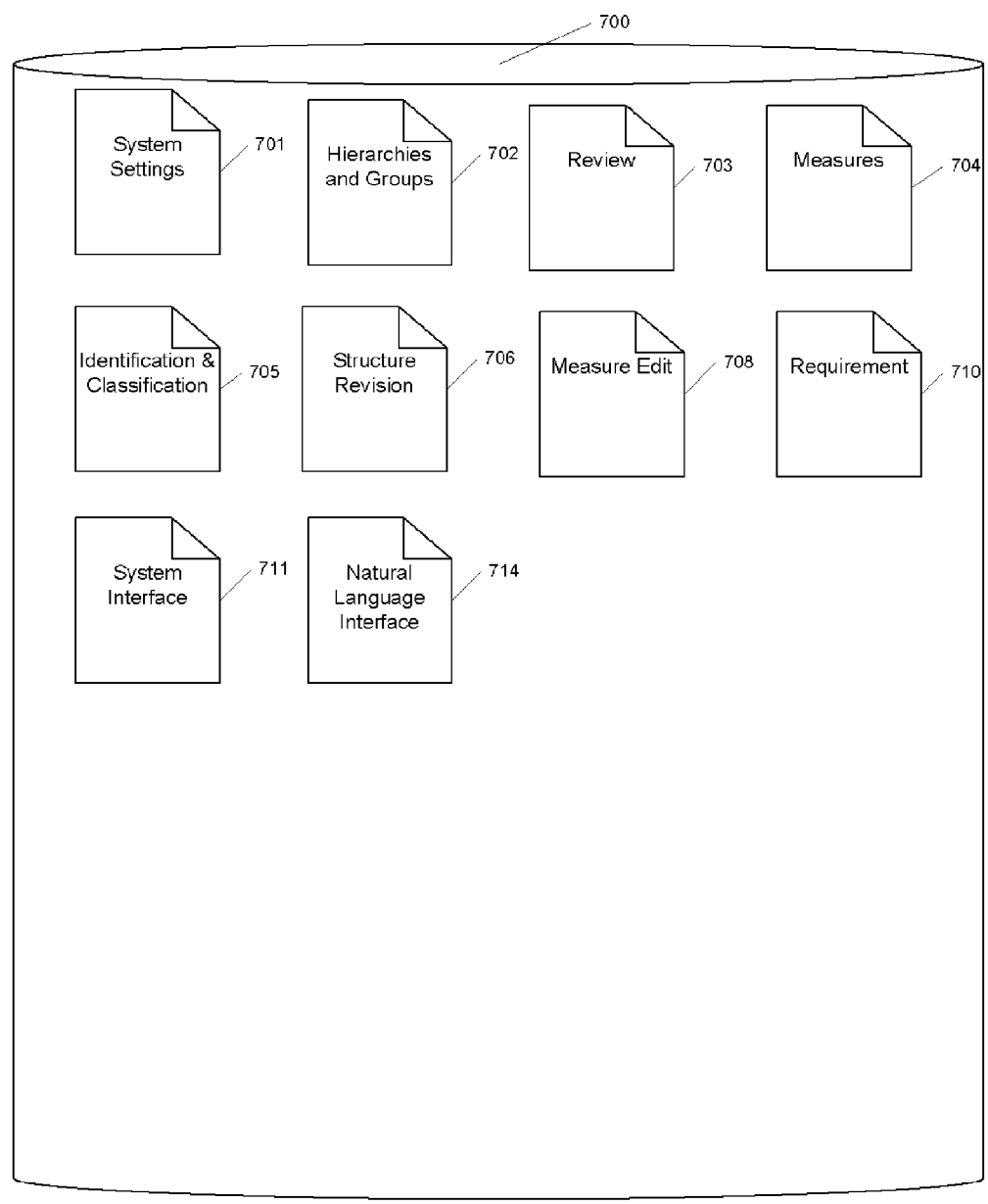
FIG. 9 is a diagram showing the data windows that are used for receiving information from and transmitting information via the interface (700)

As discussed previously, the Complete Context™ Search System (100) performs processing in three distinct stages. As shown in FIG. 6A, FIG. 6B and FIG. 6C the first stage of processing (block 200 from FIG. 1) identifies and prepares data from narrow systems (4) for processing, identifies the entity and entity function measures. As shown in FIG. 7A, FIG. 7B, FIG. 7C, FIG. 7D, FIG. 7E, FIG. 7F, FIG. 7G and FIG. 7H the second stage of processing (block 300 from FIG. 1) develops and then continually updates a Contextbase (50) by subject entity measure. As shown in FIG. 8, the third stage of processing (block 400 from FIG. 1) completes queries. If the operation is continuous, then the processing steps described are repeated continuously. As described below, one embodiment of the software is a bot or agent architecture. Other architectures including a web service architecture, a grid service architecture, an n-tier client server architecture, an integrated application architecture and some combination thereof can be used to the same effect.

Entity Definition

The flow diagrams in FIG. 6A, FIG. 6B and FIG. 6C detail the processing that is completed by the portion of the application software (200) that defines the subject entity, identifies the functions and measures for said entity and establishes a virtual database for data from other systems that is available for processing, prepares unstructured data for processing and accepts user (40) and management (41) input. As discussed previously, the system of the present invention is capable of accepting data from all the narrow systems (4) listed in Tables 4, 5, 6 and 7. Data extraction, processing and storage are normally completed by the Complete Context™ Search System (100). Operation of the system (100) will be illustrated by describing the extraction and use of structured data from a narrow system database (5) for supply chain management and an external database (7). A brief overview of the information typically obtained from these two databases will be presented before reviewing each step of processing completed by this portion (200) of the application software.

Supply chain systems are one of the narrow systems (4) identified in Table 7. Supply chain databases are a type of narrow system database (5) that contains information that may have been in operation management system databases in the past. These systems provide enhanced visibility into the availability of resources and promote improved coordination between subject entities and their supplier entities. All supply chain systems would be expected to track all of the resources ordered by an entity after the first purchase. They typically store information similar to that shown below in Table 14.

TABLE 14

Supply chain system information

1. Stock Keeping Unit (SKU)
2. Vendor
3. Total quantity on order

TABLE 14-continued

Supply chain system information

4. Total quantity in transit
5. Total quantity on back order
6. Total quantity in inventory
7. Quantity available today
8. Quantity available next 7 days
9. Quantity available next 30 days
10. Quantity available next 90 days
11. Quoted lead time
12. Actual average lead time External databases (7) are used for obtaining information that enables the definition and evaluation of context elements, context factors and event risks. In some cases, information from these databases can be used to supplement information obtained from the other databases and the World Wide Web (5, 6 and 8). In the system of the present invention, the information extracted from external databases (7) includes the data listed in Table 15.

TABLE 15

External database information

1. Text information such as that found in the Lexis Nexis database;
2. Text information from databases containing past issues of specific publications;
3. Multimedia information such as video and audio clips;
4. Idea market prices indicate likelihood of certain events occurring; and
4. Other event risk data including information about risk probability and magnitude for weather and geological events System processing of the information from the different databases (5, 6 and 7) and the World Wide Web (8) described above starts in a block 202, FIG. 6A. The software in block 202 prompts the user (40) via the system settings data window (701) to provide system setting information. The system setting information entered by the user (40) is transmitted via the network (45) back to the application-server (120) where it is stored in the system settings table (162) in the Contextbase (50) in a manner that is well known. The specific inputs the user (40) is asked to provide at this point in processing are shown in Table 16.

TABLE 16*

1. Continuous, if yes, calculation frequency? (by minute, hour, day, week, etc.)
2. Subject Entity (hierarchy or group member, collaboration or multi domain/entity system)
3. Number of function measures (only if subject entity is a multi-entity organization or a member of the organization domain)
4. SIC Codes (optional)
5. Search output format (traditional list or graphical)
6. Names of primary competitors by SIC Code or domain (optional)
7. Base account structure
8. Base units of measure
9. Base currency
10. Risk free interest rate
11. Probabilistic relational models? (yes or no)
12. Natural language interface? (yes, no or voice activated)
13. Video data extraction? (yes or no)
14. Imaging data extraction? (yes or no)
15. Internet data extraction? (yes or no)
16. Reference layer (yes or no, if yes specify coordinate system(s))
17. Geo-coded data? (if yes, then specify standard)
18. Maximum number of clusters (default is six)
19. Default missing data procedure (chose from selection)
20. Maximum time to wait for user input
21. Maximum number of sub elements
22. System time period (days, month, years, decades, light years, etc.)

TABLE 16*-continued

23. Date range for history-forecast time periods (optional)
24. Uncertainty by narrow system type (optionally, default is zero)
25. Uncertainty source for systems above zero (i.e. forecast, technology limitation, reliability, etc.)
26. Weight of evidence cutoff level
27. Time frame(s) for proactive search (hours, days, weeks, etc.)
28. Node depth for scouting and/or searching for data, information and knowledge
29. Impact cutoff for scouting and/or searching for data, information and knowledge
30. Level of detail for storage by context layer (context layer alone, component of context or subcomponent of context within context layer are other options)
31. Specify relevance measure? Yes or No (If yes, then default is cover density rankings, other choices include: vector space model measurements, okapi similarity measurements, three level relevance scores and hypertext induced topic selection algorithm scores)
32. Relevance is determined by a combination of an index position and a relevance measure ranking, how much weight should be given to the index position (10 to 90% - default is 50%).

The system settings data are used by the software in block 202 to establish context layers. As described previously, there are seven types of context layers for the subject entity. The application of the remaining system settings will be further explained as part of the detailed explanation of the system operation. The software in block 202 also uses the current system date and the system time period saved in the system settings table (162) to determine the time periods (generally in months) where data will be sought to complete the calculations. The user (40) also has the option of specifying the time periods that will be used for system calculations. After the date range is stored in the system settings table (162) in the Contextbase (50), processing advances to a software block 203.

The software in block 203 prompts the user (40) via the entity data window (702) to identify the subject entity, identify subject entity functions and identify any extensions to the subject entity hierarchy or hierarchies specified in the system settings table (162). For example if the organism hierarchy (23) was chosen, the user (40) could extend the hierarchy by specifying a join with the cell hierarchy (21). As part of the processing in this block, the user (40) is also given the option to modify the subject entity hierarchy or hierarchies. If the user (40) elects to modify one or more hierarchies, then the software in the block will prompt the user (40) to provide the information required to modify the pre-defined hierarchy metadata in the hierarchy metadata table (155) to incorporate the modifications. The user (40) can also elect to limit the number of separate levels that are analyzed below the subject entity in a given hierarchy. For example, an organization could choose to examine the impact of their divisions on organization performance by limiting the context elements to one level below the subject entity. After the user (40) completes the specification of hierarchy extensions, modifications and limitations, the software in block 203 selects the appropriate metadata from the hierarchy metadata table (155) and establishes the entity schema, ontology and metadata (157). The software in block 203 uses the extensions, modifications and limitations together with three rules for establishing the entity schema:
 1. the members of the entity hierarchy that are above the subject entity are factors;
 2. hierarchies that could be used to extend the entity hierarchy that are not selected will be excluded; and
 3. all other hierarchies and groups will be factors.
After entity schema is developed, the user (40) is asked to define process maps and procedures. The maps and procedures identified by the user (40) are stored in the relationship layer table (144) in the Contextbase (50). The information provided by the user (40) will be supplemented with information developed later in the first stage of processing. It is also possible to obtain relationship layer information concerning process maps and procedures in an automated fashion by analyzing transaction patterns or reverse engineering narrow systems (4) as they often codify the relationship between different context elements, factors, events, resources and/or actions. The knowledge capture and collaboration system (622) that is used later in processing could also be used here to supplement the information provided by the user (40). After data storage is complete, processing advances to a software block 204.

The software in block 204 prompts a system interface (711) to communicate via a network (45) with the different databases (5, 6, and 7) and the World Wide Web (8) that are data sources for the complete context search system (100). As shown on FIG. 10 the system interface (711) consists of a multiple step operation where the sequence of steps depends on the nature of the interaction and the data being provided to the system (100). In one embodiment, a data input session would be managed by the a software block (720) that identifies the data source (3, 4, 5, 6, 7 or 8) using standard protocols such as UDDI or xml headers, maintains security and establishes a service level agreement with the data source (3, 4, 5, 6, 7 or 8). The data provided at this point would include transaction data, descriptive data, imaging data, video data, text data, sensor data geospatial data, array data and combinations thereof. The session would proceed to a software block (722). If the data provided by the data source (3, 4, 5, 6, 7 or 8) was in xml format that complied with the entity schema, then the data would not require translation and the session would advanced to a software block (724) that would determine that the metadata associated with the data was in alignment with the entity schema stored in the entity schema table (157). The session would proceed to a software block (732) where any conversions to match the base units of measure, currency or time period specified in the system settings table (162) would be identified before the session advanced to a software block (734) where the location of this data would be mapped to the appropriate context layers and stored in the Contextbase (50). Establishing a virtual database in this manner eliminates the latency that can cause problems for real time processing. The virtual database information for the element layer for the subject entity and context elements is stored in the element layer table (141) in the Contextbase (50). The virtual database information for the resource layer for the subject entity resources is stored in the resource layer table (143) in the Contextbase (50). The virtual database information for the environment layer for the subject entity and context factors is stored in the environment layer table (149) in the Contextbase (50). The virtual database information for the transaction layer for the subject entity, context elements, actions and events is stored in the transaction layer table (142) in the Contextbase (50). The processing path described in this paragraph is just one of many paths for processing data input.

Figure 10:
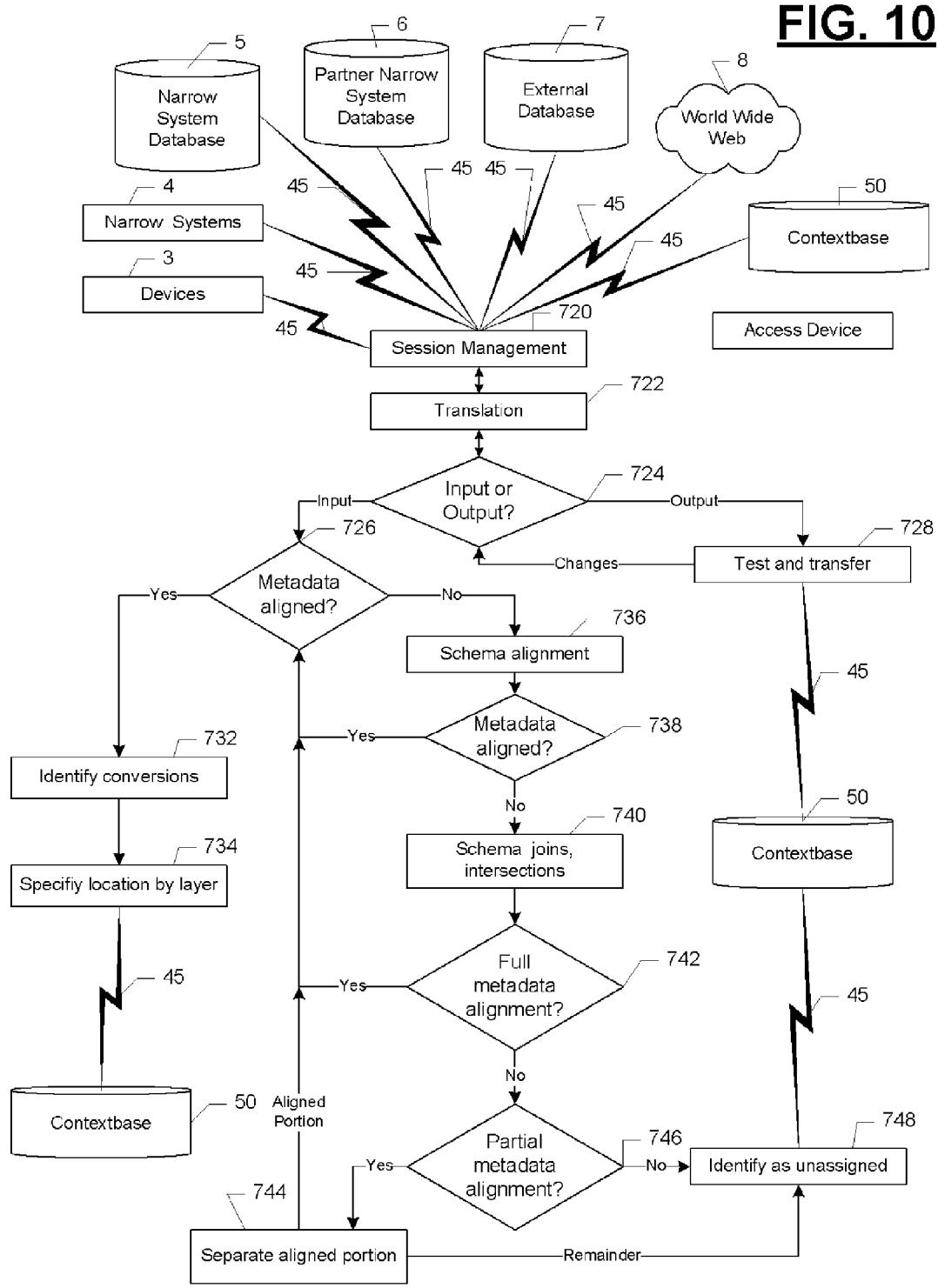
FIG. 10 is a block diagram showing the sequence of processing steps in the present invention used for identifying, receiving and transmitting data from narrow systems (4)
Figure 11:
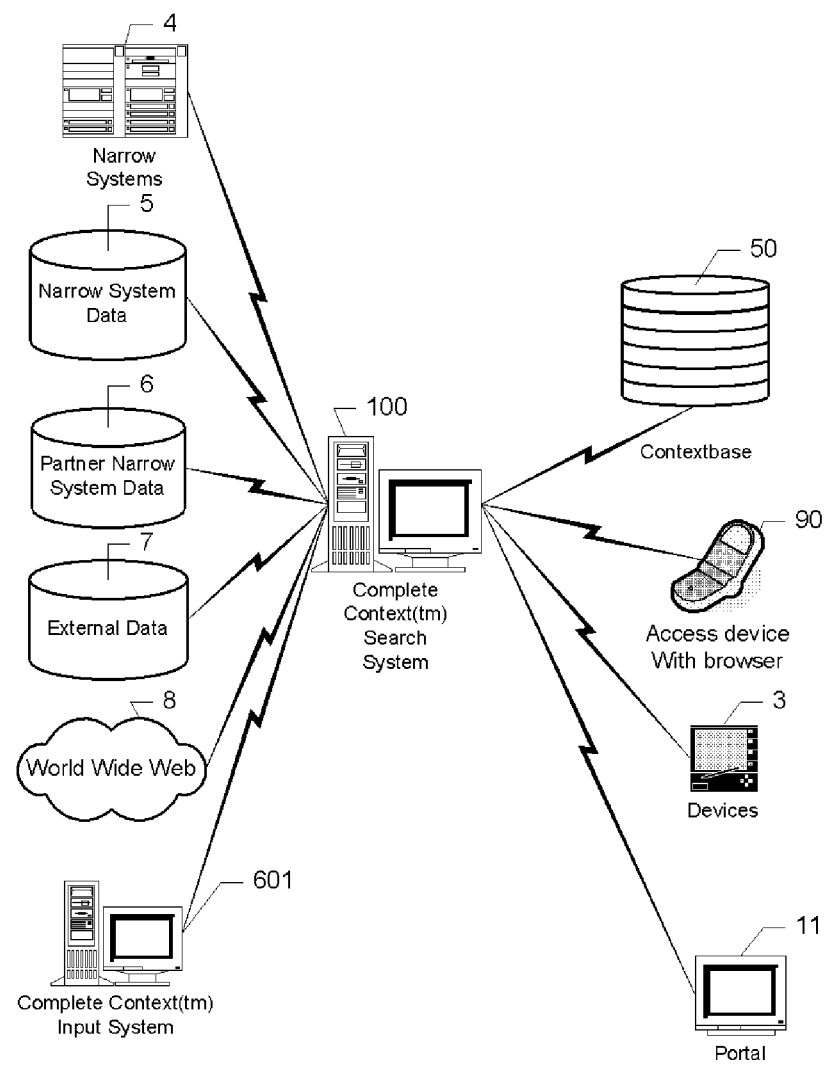
FIG. 11 is a diagram showing one embodiment of the complete context search system (100)
Figure 12:
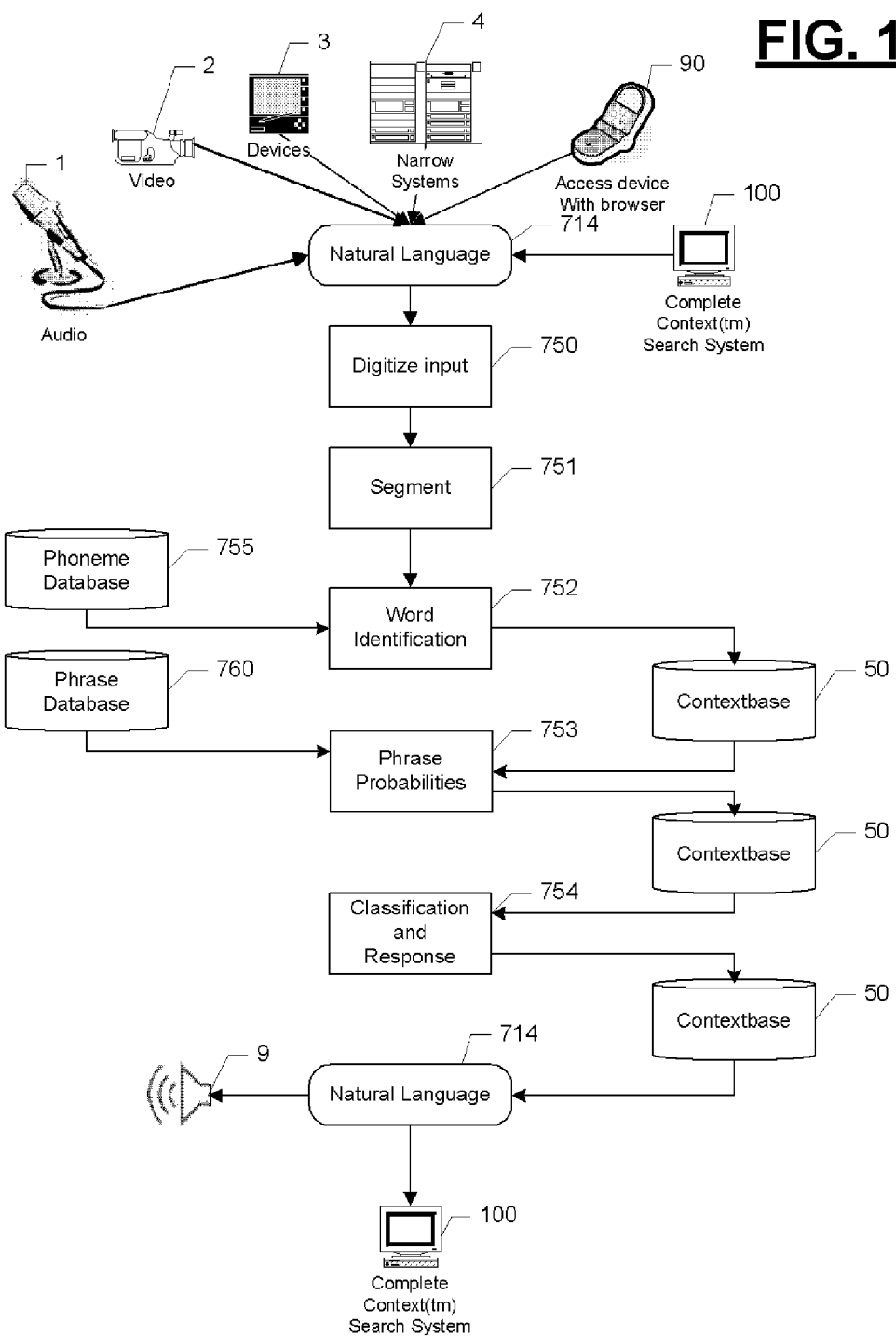
FIG. 12 is a diagram showing how the system (100) develops and supports a natural language interface (714)
Figure 13:
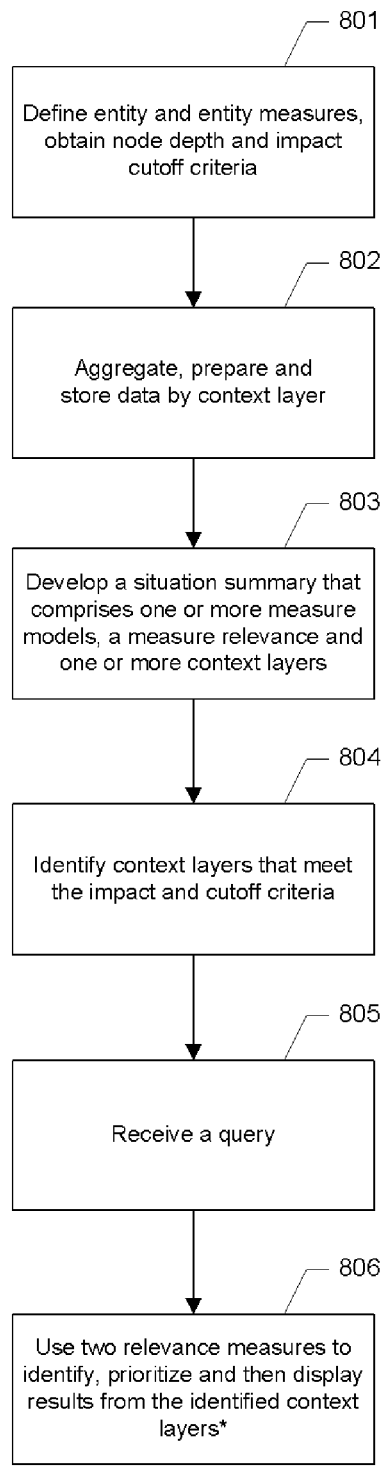
FIG. 13 is a block diagram summarizing the sequence of steps used in a parent application for completing a Complete Context™ Search.
Figure 14:
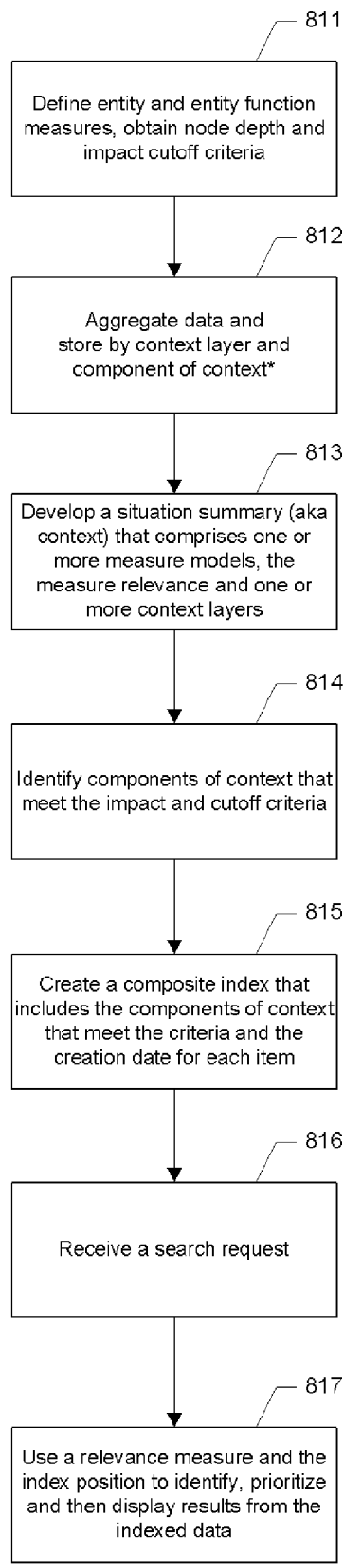
FIG. 14 is a block diagram summarizing the sequence of steps used in the instant application for completing a Complete Context™ Search.

As shown FIG. 10, the system interface (711) has provisions for an alternate data input processing path. This path is used if the data is not in the proper format. In this alternate mode, the data input session would still be managed by the session management software in block (720) that identifies the data source (3, 4, 5, 6, 7 or 8) maintains security and establishes a service level agreement with the data source (3, 4, 5, 6, 7 or 8). The session would proceed to the translation software block (722) where the data from one or more data sources (5, 6, 7 or 8) requires translation and optional analysis before proceeding to the next step. The software in block 722 translates and parses audio, image, micro-array, video and unformatted text data formats to xml. After translation is complete, the session advances to a software block (724) that would determine that the metadata associated with the data was not in alignment with the schema stored in the entity schema table (157). Processing then advances to the software in block 736 which would use a series of schema matching algorithms including key properties, similarity, global namespace, value pattern and value range algorithms to align the input data schema with the entity schema. Processing, then advances to a software block 738 where the metadata associated with the data is compared with the schema stored in the entity schema table (157). If the metadata is aligned, then processing is completed using the path described previously. Alternatively, if the metadata is still not aligned, then processing advances to a software block 740 where joins and intersections between the two schemas are completed. Processing advances then advances to a software block 742 where the results of these operations are compared with the schema stored in the entity schema table (157). If the metadata from one of these operations is aligned, then processing is completed using the path described previously. Alternatively, if the metadata is still not aligned, then processing advances to a software block 742 where the schemas are checked for partial alignment. If there is partial alignment, then processing advances to a software block 744. Alternatively, if there is no alignment, then processing advances to a software block 748 where the data is tagged for manual review and stored in the unassigned data table (146). The software in block 744 cleaves the data as required to separate the portion that is in alignment from the portion that is not in alignment. The portion of the data that is not in alignment is forwarded to software block 748 where it is tagged for manual alignment and stored in the unassigned data table (146). The portion of the data that is in alignment is processed using the path described previously.

After system interface (711) processing is completed for all available data from the sources (3 and 4), databases (5, 6 and 7) and the World Wide Web (8), processing advances to a software block 206 where the software in block 206 optionally prompts the system interface (711) to communicate via a network (45) with the Complete Context™ Input System (601). The system interface uses the path described previously for data input to map the identified data to the appropriate context layers and store the mapping information in the Contextbase (50) as described previously. After storage of the Complete Context™ Input System (601) related information is complete, processing advances to a software block 207.

The software in block 207 prompts the user (40) via the review data window (703) to optionally review the context layer data that has been stored in the first few steps of processing. The user (40) has the option of changing the data on a one time basis or permanently. Any changes the user (40) makes are stored in the table for the corresponding context layer (i.e. transaction layer changes are saved in the transaction layer table (142), etc.). As part of the processing in this block, an interactive GEL algorithm prompts the user (40) via the review data window (703) to check the hierarchy or group assignment of any new elements, factors and resources that have been identified. Any newly defined categories are stored in the relationship layer table (144) and the entity schema table (157) in the Contextbase (50) before processing advances to a software block 208.

The software in block 208 prompts the user (40) via the requirement data window (710) to optionally identify requirements for the subject entity. Requirements can take a variety of forms but the two most common types of requirements are absolute and relative. For example, a requirement that the level of cash should never drop below $50,000 is an absolute requirement while a requirement that there should never be less than two months of cash on hand is a relative requirement. The user (40) also has the option of specifying requirements as a subject entity function later in this stage of processing. Examples of different requirements are shown in Table 17.

TABLE 17

| Entity | Requirement (reason) |
| --- | --- |
| Individual (1401) | Stop working at 67 |
| | Keep blood pressure below 155/95 |
| | Available funds > $X by 01/01/14 |
| Government Organization (1607) | Foreign currency reserves > $X (IMF requirement) 3 functional divisions on standby (defense) Pension assets > liabilities (legal) |
| Circulatory System (2304) | Cholesterol level between 120 and 180 Pressure between 110/75 and 150/100 |

The software in this block provides the ability to specify absolute requirements, relative requirements and standard "requirements" for any reporting format that is defined for use by the Complete Context™ Review System (i.e. Basel II, FASB earnings, etc.). After requirements are specified, they are stored in the requirement table (159) in the Contextbase (50) by entity before processing advances to a software block 211.

The software in block 211 checks the unassigned data table (146) in the Contextbase (50) to see if there is any data that has not been assigned to an entity and/or context layer. If there is no data without a complete assignment (entity and element, resource, factor or transaction context layer constitutes a complete assignment), then processing advances to a software block 214. Alternatively, if there are data without an assignment, then processing advances to a software block 212. The software in block 212 prompts the user (40) via the identification and classification data window (705) to identify the context layer and entity assignment for the data in the unassigned data table (146). After assignments have been specified for every data element, the resulting assignments are stored in the appropriate context layer tables in the Contextbase (50) by entity before processing advances to a software block 214.

The software in block 214 checks the element layer table (141), the transaction layer table (142) and the resource layer table (143) and the environment layer table (149) in the Contextbase (50) to see if data is missing for any required time period. If data is not missing for any required time period, then processing advances to a software block 218. Alternatively, if data for one or more of the required time periods identified in the system settings table (162) for one or more items is missing from one or more context layers, then processing advances to a software block 216. The software in block 216 prompts the user (40) via the review data window (703) to specify the procedure that will be used for generating values for the items that are missing data by time period. Options the user (40) can choose at this point include: the average value for the item over the entire time period, the average value for the item over a specified time period, zero or the average of the preceding item and the following item values and direct user input for each missing value. If the user (40) does not provide input within a specified interval, then the default missing data procedure specified in the system settings table (162) is used. When the missing time periods have been filled and stored for all the items that were missing data, then system processing advances to a block 218.

The software in block 218 retrieves data from the element layer table (141), the transaction layer table (142) and the resource layer table (143) and the environment layer table (149). It uses this data to calculate pre-defined indicators for the data associated with each element, resource and environmental factor. The indicators calculated in this step are comprised of comparisons, regulatory measures and statistics. Comparisons and statistics are derived for: appearance, description, numeric, shape, shape/time and time characteristics. These comparisons and statistics are developed for different types of data as shown below in Table 18.

TABLE 18

| Data type | Characteristic | | | | | |
|---|---|---|---|---|---|---|
| | Appearance | Description | Numeric | Shape | Shape-Time | Time |
| audio | | X | X | | | X |
| coordinate | | X | X | X | X | X |
| image | X | | X | X | X | X |
| text | | X | X | | | X |
| transaction | | | X | | | X |
| video | X | | X | X | X | X |

X = comparisons and statistics are developed for these characteristic/data type combinations Numeric characteristics are pre-assigned to different domains. Numeric characteristics include amperage, area, density, depth, distance, hardness, height, hops, impedance, level, nodes, quantity, rate, resistance, speed, tensile strength, voltage, volume, weight and combinations thereof. Time characteristics include frequency measures, gap measures (i.e. time since last occurrence, average time between occurrences, etc.) and combinations thereof. The numeric and time characteristics are also combined to calculate additional indicators. Comparisons include: comparisons to baseline (can be binary, 1 if above, 0 if below), comparisons to external expectations, comparisons to forecasts, comparisons to goals, comparisons to historical trends, comparisons to known bad, comparisons to known good, life cycle comparisons, comparisons to normal, comparisons to peers, comparisons to regulations, comparison to requirements, comparisons to a standard, sequence comparisons, comparisons to a threshold (can be binary, 1 if above, 0 if below) and combinations thereof. Statistics include: averages (mean, median and mode), convexity, copulas, correlation, covariance, derivatives, slopes, trends and variability. Time lagged versions of each piece of data, each statistic, each comparison are also developed. The numbers derived from these calculations are collectively referred to as "indicators" (also known as item performance indicators and factor performance indicators). The software in block 218 also calculates pre-specified mathematical and/or logical combinations of variables called composite variables (also known as composite factors when associated with environmental factors). The indicators and the composite variables are tagged and stored in the appropriate context layer table—the element layer table (141), the resource layer table (143) or the environment layer table (149) before processing advances to a software block 220.

The software in block 220 uses attribute derivation algorithms such as the AQ program to create combinations of variables from the element layer table (141), the transaction layer table (142) and the resource layer table (143) and the environment layer table (149) that were not pre-specified for combination in the prior processing step. While the AQ program is used in an embodiment of the present invention, other attribute derivation algorithms, such as the LINUS algorithms, may be used to the same effect. The resulting composite variables are tagged and stored in the element layer table (141), the resource layer table (143) or the environment layer table (149) before processing advances to a software block 222.

The software in block 222 checks the bot date table (163) and deactivates pattern bots with creation dates before the current system date and retrieves information from the system settings table (162), the element layer table (141), the transaction layer table (142), the resource layer table (143) and the environment layer table (149). The software in block 222 then initializes pattern bots for each layer to identify patterns in each layer. Bots are independent components of the application software of the present invention that complete specific tasks. In the case of pattern bots, their tasks are to identify patterns in the data associated with each context layer. In one embodiment, pattern bots use Apriori algorithms identify patterns including frequent patterns, sequential patterns and multi-dimensional patterns. However, a number of other pattern identification algorithms including the sliding window algorithm; beam-search, frequent pattern growth, decision trees and the PASCAL algorithm can be used alone or in combination to the same effect. Every pattern bot contains the information shown in Table 19.

TABLE 19

1. Unique ID number (based on date, hour, minute, second of creation)
2. Creation date (date, hour, minute, second)
3. Storage location
4. Entity Type(s)
5. Entity
6. Context Layer
7. Algorithm After being initialized, the bots identify patterns for the data associated with elements, resources, factors and combinations thereof. Each pattern is given a unique identifier and the frequency and type of each pattern is determined. The numeric values associated with the patterns are indicators. The values are stored in the appropriate context layer table before processing advances to a software block 224.

The software in block 224 uses causal association algorithms including LCD, CC and CU to identify causal associations between indicators, composite variables, element data, factor data, resource data and events, actions, processes and measures. The identified associations are stored in the causal link table (148) for possible addition to the relationship layer table (144) before processing advances to a software block 226.

The software in block 226 prompts the user (40) via the review data window (703) to review the associations stored in the causal link table (148). Associations that have already been specified or approved by the user (40) will not be displayed. The user (40) has the option of accepting or rejecting each identified association. Any associations the user (40) accepts are stored in the relationship layer table (144) before processing advances a software block 242.

The software in block 242 checks the measure layer table (145) in the Contextbase (50) to determine if there are current models for all measures for every entity. If all measure models are current, then processing advances to a software block 301. Alternatively, if all measure models are not current, then the next measure for the next entity is selected and processing advances to a software block 244.

The software in block 244 checks the bot date table (163) and deactivates event risk bots with creation dates before the current system date. The software in the block then retrieves the information from the transaction layer table (142), the relationship layer table (144), the event risk table (156), the entity schema table (157) and the system settings table (162) as required to initialize event risk bots for the subject entity in accordance with the frequency specified by the user (40) in the system settings table (162). Bots are independent components of the application software that complete specific tasks. In the case of event risk bots, their primary tasks are to forecast the frequency and magnitude of events that are associated with negative measure performance in the relationship layer table (144). In addition to forecasting risks that are traditionally covered by insurance such as fires, floods, earthquakes and accidents, the system of the present invention also uses the data to forecast standard, "non-insured" event risks such as the risk of employee resignation and the risk of customer defection. The system of the present invention uses a tournament forecasting method for event risk frequency and duration. The mapping information from the relationship layer is used to identify the elements, factors, resources and/or actions that will be affected by each event. Other forecasting methods can be used to the same effect. Every event risk bot contains the information shown in Table 20.

TABLE 20

1. Unique ID number (based on date, hour, minute, second of creation)
2. Creation date (date, hour, minute, second)
3. Mapping information
4. Storage location
5. Hierarchy of Group
6. Entity
7. Event (fire, flood, earthquake, tornado, accident, defection, etc.)

After the event risk bots are initialized they activate in accordance with the frequency specified by the user (40) in the system settings table (162). After being activated the bots retrieve the required data and forecast the frequency and measure impact of the event risks. The resulting forecasts are stored in the event risk table (156) before processing advances to a software block 246.

The software in block 246 checks the bot date table (163) and deactivates extreme risk bots with creation dates before the current system date. The software in block 246 then retrieves the information from the transaction layer table (142), the relationship layer table (144), the event risk table (156), the entity schema table (157) and the system settings table (162) as required to initialize extreme risk bots in accordance with the frequency specified by the user (40) in the system settings table (162). Bots are independent components of the application software that complete specific tasks. In the case of extreme risk bots, their primary task is to forecast the probability of extreme events for events that are associated with negative measure performance in the relationship layer table (144). The extreme risks bots use the Blocks method and the peak over threshold method to forecast extreme risk magnitude and frequency. Other extreme risk algorithms can be used to the same effect. The mapping information is then used to identify the elements, factors, resources and/or actions that will be affected by each extreme risk. Every extreme risk bot activated in this block contains the information shown in Table 21.

TABLE 21

1. Unique ID number (based on date, hour, minute, second of creation)
2. Creation date (date, hour, minute, second)
3. Mapping information
4. Storage location
5. Hierarchy of Group
6. Entity
7. Method: blocks or peak over threshold
8. Event (fire, flood, earthquake, tornado, accident, defection, etc.)

After the extreme risk bots are initialized, they activate in accordance with the frequency specified by the user (40) in the system settings table (162). Once activated, they retrieve the required information, forecast extreme event risks and map the impacts to the different elements, factors, resources and/or actions. The extreme event risk information is stored in the event risk table (156) in the Contextbase (50) before processing advances to a software block 248.

The software in block 248 checks the bot date table (163) and deactivates competitor risk bots with creation dates before the current system date. The software in block 248 then retrieves the information from the transaction layer table (142), the relationship layer table (144), the event risk table (156), the entity schema table (157) and the system settings table (162) as required to initialize competitor risk bots in accordance with the frequency specified by the user (40) in the system settings table (162). Bots are independent components of the application software that complete specific tasks. In the case of competitor risk bots, their primary task is to identify the probability of competitor actions and/or events that events that are associated with negative measure performance in the relationship layer table (144). The competitor risk bots use game theoretic real option models to forecast competitor risks. Other risk forecasting algorithms can be used to the same effect. The mapping information is then used to identify the elements, factors, resources and/or actions that will be affected by each customer risk. Every competitor risk bot activated in this block contains the information shown in Table 22

TABLE 22

1. Unique ID number (based on date, hour, minute, second of creation)
2. Creation date (date, hour, minute, second)
3. Mapping information
4. Storage location
5. Entity Type(s)
6. Entity
7. Competitor After the competitor risk bots are initialized, they retrieve the required information and forecast the frequency and magnitude of competitor risks. The bots save the competitor risk information in the event risk table (156) in the Contextbase (50) and processing advances to a block 250.

The software in block 250 retrieves data from the event risk table (156) and the entity schema table (157) before using a measures data window (704) to display a table showing the distribution of risk impacts by element, factor, resource and action. After the review of the table is complete, the software in block 250 prompts the manager (41) via the measures data window (704) to specify one or more measures for the subject entity. Measures are quantitative indications of subject entity behavior or performance. The primary types of behavior are production, destruction and maintenance. As discussed previously, the manager (41) is given the option of using pre-defined measures or creating new measures using terms defined in the entity schema table (157). The measures can combine performance and risk measures or the performance and risk measures can be kept separate. If more than one measure is defined for the subject entity, then the manager (41) is prompted to assign a weighting or relative priority to the different measures that have been defined. As system processing advances, the assigned priorities can be compared to the priorities that entity actions indicate are most important. The priorities used to guide analysis can be the stated priorities, the inferred priorities or some combination thereof. The gap between stated priorities and actual priorities is a congruence indicator that can be used in analyzing performance.

After the specification of measures and priorities has been completed, the values of each of the newly defined measures are calculated using historical data and forecast data. These values are then stored in the measure layer table (145) along with the measure definitions and priorities. When data storage is complete, processing advances to a software block 252.

The software in block 252 checks the bot date table (163) and deactivates forecast update bots with creation dates before the current system date. The software in block 252 then retrieves the information from the system settings table (162) and environment layer table (149) as required to initialize forecast bots in accordance with the frequency specified by the user (40) in the system settings table (162). Bots are independent components of the application software of the present invention that complete specific tasks. In the case of forecast update bots, their task is to compare the forecasts for context factors and with the information available from futures exchanges (including idea markets) and update the existing forecasts as required. This function is generally only required when the system is not run continuously. Every forecast update bot activated in this block contains the information shown in Table 23.

TABLE 23

1. Unique ID number (based on date, hour, minute, second of creation)
2. Creation date (date, hour, minute, second)
3. Mapping information
4. Storage location
5. Entity Type(s)
6. Entity
7. Context factor
8. Measure
9. Forecast time period After the forecast update bots are initialized, they activate in accordance with the frequency specified by the user (40) in the system settings table (162). Once activated, they retrieve the required information and determine if any forecasts need to be updated to bring them in line with the market data. The bots save the updated forecasts in the environment layer table (149) by entity and processing advances to a software block 254.

The software in block 254 checks the bot date table (163) and deactivates scenario bots with creation dates before the current system date. The software in block 254 then retrieves the information from the system settings table (162), the element layer table (141), the transaction layer table (142), the resource layer table (143), the relationship layer table (144), the environment layer table (149), the event risk table (156) and the entity schema table (157) as required to initialize scenario bots in accordance with the frequency specified by the user (40) in the system settings table (162).

Bots are independent components of the application software of the present invention that complete specific tasks. In the case of scenario bots, their primary task is to identify likely scenarios for the evolution of the elements, factors, resources and event risks by entity. The scenario bots use the statistics calculated in block 218 together with the layer information retrieved from the Contextbase (50) to develop forecasts for the evolution of the elements, factors, resources, events and actions under normal conditions, extreme conditions and a blended extreme-normal scenario. Every scenario bot activated in this block contains the information shown in Table 24.

TABLE 24

1. Unique ID number (based on date, hour, minute, second of creation)
2. Creation date (date, hour, minute, second)
3. Mapping information
4. Storage location
5. Type: normal, extreme or blended
6. Entity Type(s)
7. Entity
8. Measure After the scenario bots are initialized, they activate in accordance with the frequency specified by the user (40) in the system settings table (162). Once activated, they retrieve the required information and develop a variety of scenarios as described previously. After the scenario bots complete their calculations, they save the resulting scenarios in the scenario table (168) by entity in the Contextbase (50) and processing advances to a block 301.

Contextbase Development

The flow diagrams in FIG. 7A, FIG. 7B, FIG. 7C, FIG. 7D, FIG. 7E, FIG. 7F, FIG. 7G and FIG. 7H detail the processing that is completed by the portion of the application software (300) that continually develops a function measure oriented Contextbase (50) by creating and activating analysis bots that:

1. Supplement the relationship layer (144) information developed previously by identifying relationships between the elements, factors, resources, events, actions and one or more measures;
2. Complete the measure layer (145) by developing robust models of the elements, factors, resources, events and/or actions driving measure performance;
3. Develop robust models of the elements, factors, resources and events driving action and/or event occurrence rates and impact levels;
4. Analyze measures for the subject entity hierarchy as required to evaluate alignment and adjust measures as required to achieve alignment in an automated fashion; and
5. Determine the relationship between function measures and subject entity performance.

Each analysis bot generally normalizes the data being analyzed before processing begins. As discussed previously, processing in this embodiment includes an analysis of all measures and alternative architectures include a web and/or grid service architecture can be used. The system of the present invention can combine any number of measures as required to evaluate the performance of any entity in the seventeen hierarchies described previously.

Before discussing this stage of processing in more detail, it will be helpful to review the processing already completed. As discussed previously, we are interested developing knowledge regarding the behavior of a subject entity. We will develop this knowledge by developing a detailed understanding of the impact of elements, environmental factors, resources, events and actions on one or more subject entity function measures. Some of the elements and resources may have been grouped together to complete processes (a special class of element). The first stage of processing reviewed the data from some or all of the narrow systems (4) listed in Table 4, 5, 6 and 7 and the devices (3) listed in Table 8 and established a layered Contextbase (50) that formalized the understanding of the identity and description of the elements, factors, resources, events and transactions that impact subject entity function measure performance. The layered Contextbase (50) also ensures ready access to the required data for the second and third stages of computation in the complete context search system (100). In the second stage of processing we will use the Contextbase (50) to develop an understanding of the relative impact of the different elements, factors, resources, events and transactions on subject entity measures.

Because processes rely on elements and resources to produce actions, the user (40) is given the choice between a process view and an element view for measure analysis to avoid double counting. If the user (40) chooses the element approach, then the process impact can be obtained by allocating element and resource impacts to the processes. Alternatively, if the user (40) chooses the process approach, then the process impacts can be divided by element and resource.

Processing in this portion of the application begins in software block 301. The software in block 301 checks the measure layer table (145) in the Contextbase (50) to determine if there are current models for all measures for every entity. Measures that are integrated to combine the performance and risk measures into an overall measure are considered two measures for purposes of this evaluation. If all measure models are current, then processing advances to a software block 322. Alternatively, if all measure models are not current, then processing advances to a software block 303.

The software in block 303 retrieves the previously calculated values for the next measure from the measure layer table (145) before processing advances to a software block 304. The software in block 304 checks the bot date table (163) and deactivates temporal clustering bots with creation dates before the current system date. The software in block 304 then initializes bots in accordance with the frequency specified by the user (40) in the system settings table (162). The bots retrieve information from the measure layer table (145) for the entity being analyzed and defines regimes for the measure being analyzed before saving the resulting cluster information in the relationship layer table (144) in the Contextbase (50). Bots are independent components of the application software of the present invention that complete specific tasks. In the case of temporal clustering bots, their primary task is to segment measure performance into distinct time regimes that share similar characteristics. The temporal clustering bot assigns a unique identification (id) number to each "regime" it identifies before tagging and storing the unique id numbers in the relationship layer table (144). Every time period with data are assigned to one of the regimes. The cluster id for each regime is associated with the measure and entity being analyzed. The time regimes are developed using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The processing continues until adding a new model does not improve accuracy. Other temporal clustering algorithms may be used to the same effect. Every temporal clustering bot contains the information shown in Table 25.

TABLE 25

1. Unique ID number (based on date, hour, minute, second of creation)
2. Creation date (date, hour, minute, second)
3. Mapping information
4. Storage location
5. Maximum number of clusters
6. Entity Type(s)
7. Entity
8. Measure When bots in block 304 have identified and stored regime assignments for all time periods with measure data for the current entity, processing advances to a software block 305.

The software in block 305 checks the bot date table (163) and deactivates variable clustering bots with creation dates before the current system date. The software in block 305 then initializes bots as required for each element, resource and factor for the current entity. The bots activate in accordance with the frequency specified by the user (40) in the system settings table (162), retrieve the information from the element layer table (141), the transaction layer table (142), the resource layer table (143), the environment layer table (149) and the entity schema table (157) as required and define segments for element, resource and factor data before tagging and saving the resulting cluster information in the relationship layer table (144).

Bots are independent components of the application software of the present invention that complete specific tasks. In the case of variable clustering bots, their primary task is to segment the element, resource and factor data—including performance indicators—into distinct clusters that share similar characteristics. The clustering bot assigns a unique id number to each "cluster" it identifies, tags and stores the unique id numbers in the relationship layer table (144). Every item variable for each element, resource and factor is assigned to one of the unique clusters. The element data, resource data and factor data are segmented into a number of clusters less than or equal to the maximum specified by the user (40) in the system settings table (162). The data are segmented using several clustering algorithms including: an unsupervised "Kohonen" neural network, decision tree, support vector method, K-nearest neighbor, expectation maximization (EM) and the segmental K-means algorithm. For algorithms that normally require the number of clusters to be specified, the bot will use the maximum number of clusters specified by the user (40). Every variable clustering bot contains the information shown in Table 26.

TABLE 26

1. Unique ID number (based on date, hour, minute, second of creation)
2. Creation date (date, hour, minute, second)
3. Mapping information
4. Storage location
5. Element, factor or resource
6. Clustering algorithm type
7. Entity Type(s)
8. Entity
9. Measure
10. Maximum number of clusters
11. Variable 1
    ... to
11 + n. Variable n When bots in block 305 have identified, tagged and stored cluster assignments for the data associated with every element, resource and factor in the relationship layer table (144), processing advances to a software block 307.

The software in block 307 checks the measure layer table (145) in the Contextbase (50) to see if the current measure is an options based measure like contingent liabilities, real options or competitor risk. If the current measure is not an options based measure, then processing advances to a software block 309. Alternatively, if the current measure is an options based measure, then processing advances to a software block 308.

The software in block 308 checks the bot date table (163) and deactivates option bots with creation dates before the current system date. The software in block 308 then retrieves the information from the system settings table (162), the entity schema table (157) and the element layer table (141), the transaction layer table (142), the resource layer table (143), the relationship layer table (144), the environment layer table (149) and the scenarios table (168) as required to initialize option bots in accordance with the frequency specified by the user (40) in the system settings table (162).

Bots are independent components of the application software of the present invention that complete specific tasks. In the case of option bots, their primary task is to determine the impact of each element, resource and factor on the entity option measure under different scenarios. The option simulation bots run a normal scenario, an extreme scenario and a combined scenario with and without clusters. In one embodiment, Monte Carlo models are used to complete the probabilistic simulation, however other option models including binomial models, multinomial models and dynamic programming can be used to the same effect. The element, resource and factor impacts on option measures could be determined using the processed detailed below for the other types of measures, however, in the embodiment being described herein a separate procedure is used. Every option bot activated in this block contains the information shown in Table 27.

TABLE 27

1. Unique ID number (based on date, hour, minute, second of creation)
2. Creation date (date, hour, minute, second)
3. Mapping information
4. Storage location
5. Scenario: normal, extreme or combined
6. Option type: real option, contingent liability or competitor risk
7. Entity Type(s)
8. Entity
9. Measure
10. Clustered data? (Yes or No)
11. Algorithm After the option bots are initialized, they activate in accordance with the frequency specified by the user (40) in the system settings table (162). Once activated, the bots retrieve the required information and simulate the measure over the time periods specified by the user (40) in the system settings table (162) as required to determine the impact of each element, resource and factor on the option. After the option bots complete their calculations, the impacts and sensitivities for the option (clustered data—yes or no) that produced the best result under each scenario are saved in the measure layer table (145) in the Contextbase (50) and processing returns to software block 301.

If the current measure was not an option measure, then processing advanced to software block 309. The software in block 309 checks the bot date table (163) and deactivates all predictive model bots with creation dates before the current system date. The software in block 309 then retrieves the information from the system settings table (162), the entity schema table (157) and the element layer table (141), the transaction layer table (142), the resource layer table (143), the relationship layer table (144) and the environment layer table (149) as required to initialize predictive model bots for each measure layer.

Bots are independent components of the application software that complete specific tasks. In the case of predictive model bots, their primary task is to determine the relationship between the indicators and the one or more measures being evaluated. Predictive model bots are initialized for each cluster and regime of data in accordance with the cluster and regime assignments specified by the bots in blocks 304 and 305. A series of predictive model bots is initialized at this stage because it is impossible to know in advance which predictive model type will produce the "best" predictive model for the data from each entity. The series for each model includes: neural network; CART; GARCH, projection pursuit regression; stepwise regression, logistic regression, probit regression, factor analysis, growth modeling, linear regression; redundant regression network; boosted Naive Bayes Regression; support vector method, markov models, kriging, multivalent models, relevance vector method, MARS, roughset analysis and generalized additive model (GAM). Other types of predictive models can optionally be used to the same effect and those of average skill in the art will recognize that neural processors could be used in place of software in a standard processor as described herein for at least part of the processing. Every predictive model bot contains the information shown in Table 28.

TABLE 28

1. Unique ID number (based on date, hour, minute, second of creation)
2. Creation date (date, hour, minute, second)
3. Mapping information
4. Storage location
5. Entity Type(s)
6. Entity
7. Measure
8. Type: Cluster (ID), Regime (ID), Cluster (ID) & Regime (ID)
9. Predictive model type After predictive model bots are initialized, the bots activate in accordance with the frequency specified by the user (40) in the system settings table (162). Once activated, the bots retrieve the required data from the appropriate table in the Contextbase (50) and randomly partition the element, resource or factor data into a training set and a test set. The software in block 309 uses "bootstrapping" where the different training data sets are created by re-sampling with replacement from the original training set so data records may occur more than once. Training with genetic algorithms can also be used. After the predictive model bots complete their training and testing, the best fit predictive model assessments of element, resource and factor impacts on measure performance are saved in the measure layer table (145) before processing advances to a block 310.

The software in block 310 determines if clustering improved the accuracy of the predictive models generated by the bots in software block 309 by entity. The software in block 310 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the root mean squared error algorithm to the test data are given preference in determining the best set of variables for use in later analysis. Other error algorithms including entropy measures may also be used. There are four possible outcomes from this analysis as shown in Table 29.

TABLE 29

1. Best model has no clustering
2. Best model has temporal clustering, no variable clustering
3. Best model has variable clustering, no temporal clustering
4. Best model has temporal clustering and variable clustering If the software in block 310 determines that clustering improves the accuracy of the predictive models for an entity, then processing advances to a software block 314. Alternatively, if clustering does not improve the overall accuracy of the predictive models for an entity, then processing advances to a software block 312.

The software in block 312 uses a variable selection algorithm such as stepwise regression (other types of variable selection algorithms can be used) to combine the results from the predictive model bot analyses for each model to determine the best set of variables for each model. The models having the smallest amount of error, as measured by applying the root mean squared error algorithm to the test data, are given preference in determining the best set of variables. Other error algorithms including entropy measures may also be used. As a result of this processing, the best set of variables contain the: variables (aka element, resource and factor data), indicators and composite variables that correlate most strongly with changes in the measure being analyzed. The best set of variables will hereinafter be referred to as the "performance drivers".

Eliminating low correlation factors from the initial configuration of the vector creation algorithms increases the efficiency of the next stage of system processing. Other error algorithms including entropy measures may be substituted for the root mean squared error algorithm. After the best set of variables have been selected, tagged and stored in the relationship layer table (144) for each entity, the software in block 312 tests the independence of the performance drivers for each entity before processing advances to a block 313.

The software in block 313 checks the bot date table (163) and deactivates causal predictive model bots with creation dates before the current system date. The software in block 313 then retrieves the information from the system settings table (162), the entity schema table (157) and the element layer table (141), the transaction layer table (142), the resource layer table (143), the relationship layer table (144) and the environment layer table (149) as required to initialize causal predictive model bots for each element, resource and factor in accordance with the frequency specified by the user (40) in the system settings table (162). Sub-context elements, resources and factors may be used in the same manner.

Bots are independent components of the application software that complete specific tasks. In the case of causal predictive model bots, their primary task is to refine the performance driver selection to reflect only causal variables. A series of causal predictive model bots are initialized at this stage because it is impossible to know in advance which causal predictive model will produce the "best" vector for the best fit variables from each model. The series for each model includes six causal predictive model bot types: Tetrad, MML, LaGrange, Bayesian, Probabilistic Relational Model (if allowed) and path analysis. The Bayesian bots in this step also refine the estimates of element, resource and/or factor impact developed by the predictive model bots in a prior processing step by assigning a probability to the impact estimate. The software in block 313 generates this series of causal predictive model bots for each set of performance drivers stored in the relationship layer table (144) in the previous stage in processing. Every causal predictive model bot activated in this block contains the information shown in Table 30.

TABLE 30

1. Unique ID number (based on date, hour, minute, second of creation)
2. Creation date (date, hour, minute, second)
3. Mapping information
4. Storage location
5. Causal predictive model type
6. Entity Type(s)
7. Entity
8. Measure After the causal predictive model bots are initialized by the software in block 313, the bots activate in accordance with the frequency specified by the user (40) in the system settings table (162). Once activated, they retrieve the required information for each model and sub-divide the variables into two sets, one for training and one for testing. After the causal predictive model bots complete their processing for each model, the software in block 313 uses a model selection algorithm to identify the model that best fits the data. For the system of the present invention, a cross validation algorithm is used for model selection. The software in block 313 then saves the refined impact estimates in the measure layer table (145) and the best fit causal element, resource and/or factor indicators are identified in the relationship layer table (144) in the Contextbase (50) before processing returns to software block 301.

If software in block 310 determines that clustering improves predictive model accuracy, then processing advances directly to block 314 as described previously. The software in block 314 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the root mean squared error algorithm to the test data are given preference in determining the best set of variables. Other error algorithms including entropy measures may also be used. As a result of this processing, the best set of variables contains: the element data and factor data that correlate most strongly with changes in the function measure. The best set of variables will hereinafter be referred to as the "performance drivers". Eliminating low correlation factors from the initial configuration increases the efficiency of the next stage of system processing. Other error algorithms including entropy measures may be substituted for the root mean squared error algorithm. After the best set of variables have been selected, they are tagged as performance drivers and stored in the relationship layer table (144), the software in block 314 tests the independence of the performance drivers before processing advances to a block 315.

The software in block 315 checks the bot date table (163) and deactivates causal predictive model bots with creation dates before the current system date. The software in block 315 then retrieves the information from the system settings table (162), the entity schema table (157) and the element layer table (141), the transaction layer table (142), the resource layer table (143), the relationship layer table (144) and the environment layer table (149) as required to initialize causal predictive model bots in accordance with the frequency specified by the user (40) in the system settings table (162). Bots are independent components of the application software of the present invention that complete specific tasks. In the case of causal predictive model bots, their primary task is to refine the element, resource and factor performance driver selection to reflect only causal variables. (Note: these variables are grouped together to represent a single element vector when they are dependent). In some cases it may be possible to skip the correlation step before selecting causal item variables, factor variables, indicators, and composite variables. A series of causal predictive model bots are initialized at this stage because it is impossible to know in advance which causal predictive model will produce the "best" vector for the best fit variables from each model. The series for each model includes: Tetrad, LaGrange, Bayesian, Probabilistic Relational Model and path analysis. The Bayesian bots in this step also refine the estimates of element or factor impact developed by the predictive model bots in a prior processing step by assigning a probability to the impact estimate. The software in block 315 generates this series of causal predictive model bots for each set of performance drivers stored in the entity schema table (157) in the previous stage in processing. Every causal predictive model bot activated in this block contains the information shown in Table 31.

TABLE 31

1. Unique ID number (based on date, hour, minute, second of creation)
2. Creation date (date, hour, minute, second)
3. Mapping information
4. Storage location
5. Type: Cluster (ID), Regime (ID), Cluster (ID) & Regime (ID)
5. Entity Type(s)
6. Entity
7. Measure
8. Causal predictive model type After the causal predictive model bots are initialized by the software in block 315, the bots activate in accordance with the frequency specified by the user (40) in the system settings table (162). Once activated, they retrieve the required information for each model and sub-divide the variables into two sets, one for training and one for testing. The same set of training data are used by each of the different types of bots for each model. After the causal predictive model bots complete their processing for each model, the software in block 315 uses a model selection algorithm to identify the model that best fits the data for each element, resource and factor being analyzed by model and/or regime by entity. For the system of the present invention, a cross validation algorithm is used for model selection. The software in block 315 saves the refined impact estimates in the measure layer table (145) and identifies the best fit causal element, resource and/or factor indicators in the relationship layer table (144) in the Contextbase (50) before processing returns to software block 301.

When the software in block 301 determines that all measure models are current, then processing advances to a software block 322. The software in block 322 checks the measure layer table (145) and the event model table (158) in the Contextbase (50) to determine if all event models are current. If all event models are current, then processing advances to a software block 332. Alternatively, if new event models need to be developed, then processing advances to a software block 325. The software in block 325 retrieves information from the system settings table (162), the entity schema table (157) and the element layer table (141), the transaction layer table (142), the resource layer table (143), the relationship layer table (144), the environment layer table (149) and the event model table (158) as required to complete summaries of event history and forecasts before processing advances to a software block 304 where the processing sequence described above (save for the option bot processing)—is used to identify drivers for event frequency. After all event frequency models have been developed they are stored in the event model table (158), processing advances to a software block 332.

The software in block 332 checks the measure layer table (145) and impact model table (166) in the Contextbase (50) to determine if impact models are current for all event risks and transactions. If all impact models are current, then processing advances to a software block 341. Alternatively, if new impact models need to be developed, then processing advances to a software block 335. The software in block 335 retrieves information from the system settings table (162), the entity schema table (157) and the element layer table (141), the transaction layer table (142), the resource layer table (143), the relationship layer table (144), the environment layer table (149) and the impact model table (166) as required to complete summaries of impact history and forecasts before processing advances to a software block 304 where the processing sequence described above—save for the option bot processing—is used to identify drivers for event and action impact (or magnitude). After impact models have been developed for all event risks and transaction impacts they are stored in the impact model table (166) and processing advances to a software block 341.

If a spatial coordinate system is being used, then processing advances to a block 341 before processing begins. The software in block 341 checks the measure layer table (145) in the Contextbase (50) to determine if there are current models for all measures for every entity level. If all measure models are current, then processing advances to a software block 350. Alternatively, if all measure models are not current, then processing advances to a software block 303. The software in block 303 retrieves the previously calculated values for the measure from the measure layer table (145) before processing advances to software block 304.

The software in block 304 checks the bot date table (163) and deactivates temporal clustering bots with creation dates before the current system date. The software in block 304 then initializes bots in accordance with the frequency specified by the user (40) in the system settings table (162). The bots retrieve information from the measure layer table (145) for the entity being analyzed and defines regimes for the measure being analyzed before saving the resulting cluster information in the relationship layer table (144) in the Contextbase (50). Bots are independent components of the application software of the present invention that complete specific tasks. In the case of temporal clustering bots, their primary task is to segment measure performance into distinct time regimes that share similar characteristics. The temporal clustering bot assigns a unique identification (id) number to each "regime" it identifies before tagging and storing the unique id numbers in the relationship layer table (144). Every time period with data are assigned to one of the regimes. The cluster id for each regime is associated with the measure and entity being analyzed. The time regimes are developed using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The processing continues until adding a new model does not improve accuracy. Other temporal clustering algorithms may be used to the same effect. Every temporal clustering bot contains the information shown in Table 32.

TABLE 32

1. Unique ID number (based on date, hour, minute, second of creation)
2. Creation date (date, hour, minute, second)
3. Mapping information
4. Storage location
5. Maximum number of clusters
6. Entity Type(s)
7. Entity
8. Measure When bots in block 304 have identified and stored regime assignments for all time periods with measure data for the current entity, processing advances to a software block 305.

The software in block 305 checks the bot date table (163) and deactivates variable clustering bots with creation dates before the current system date. The software in block 305 then initializes bots as required for each context element, resource and factor for the current entity level. The bots activate in accordance with the frequency specified by the user (40) in the system settings table (162), retrieve the information from the element layer table (141), the transaction layer table (142), the resource layer table (143), the environment layer table (149) and the entity schema table (157) as required and define segments for context element, resource and factor data before tagging and saving the resulting cluster information in the relationship layer table (144). Bots are independent components of the application software of the present invention that complete specific tasks. In the case of variable clustering bots, their primary task is to segment the element, resource and factor data—including indicators—into distinct clusters that share similar characteristics. The clustering bot assigns a unique id number to each "cluster" it identifies, tags and stores the unique id numbers in the relationship layer table (144). Every variable for every context element, resource and factor is assigned to one of the unique clusters. The element data, resource data and factor data are segmented into a number of clusters less than or equal to the maximum specified by the user (40) in the system settings table (162). The data are segmented using several clustering algorithms including: an unsupervised "Kohonen" neural network, decision tree, support vector method, K-nearest neighbor, expectation maximization (EM) and the segmental K-means algorithm. For algorithms that normally require the number of clusters to be specified, the bot will use the maximum number of clusters specified by the user (40). Every variable clustering bot contains the information shown in Table 33.

TABLE 33

1. Unique ID number (based on date, hour, minute, second of creation)
2. Creation date (date, hour, minute, second)
3. Mapping information
4. Storage location
5. Context element, resource or factor
6. Clustering algorithm
7. Entity Type(s)
8. Entity
9. Measure
10. Maximum number of clusters
11. Variable 1
    ... to
11 + n. Variable n When bots in block 305 have identified, tagged and stored cluster assignments for the data associated with every element, resource and factor in the relationship layer table (144), processing advances to a software block 343.

The software in block 343 checks the bot date table (163) and deactivates spatial clustering bots with creation dates before the current system date. The software in block 343 then retrieves the information from the system settings table (162), the entity schema table (157) and the element layer table (141), the transaction layer table (142), the resource layer table (143), the relationship layer table (144), the environment layer table (149), the spatial reference layer (154) and the scenarios table (168) as required to initialize spatial clustering bots in accordance with the frequency specified by the user (40) in the system settings table (162). Bots are independent components of the application software that complete specific tasks. In the case of spatial clustering bots, their primary task is to segment the element, resource and factor data—including performance indicators—into distinct clusters that share similar characteristics. The clustering bot assigns a unique id number to each "cluster" it identifies, tags and stores the unique id numbers in the relationship layer table (144). Data for each context element, resource and factor is assigned to one of the unique clusters. The element, resource and factor data are segmented into a number of clusters less than or equal to the maximum specified by the user (40) in the system settings table (162). The system of the present invention uses several spatial clustering algorithms including: hierarchical clustering, cluster detection, k-ary clustering, variance to mean ratio, lacunarity analysis, pair correlation, join correlation, mark correlation, fractal dimension, wavelet, nearest neighbor, local index of spatial association (LISA), spatial analysis by distance indices (SADIE), mantel test and circumcircle. Every spatial clustering bot activated in this block contains the information shown in Table 34.

TABLE 34

1. Unique ID number (based on date, hour, minute, second of creation)
2. Creation date (date, hour, minute, second)
3. Mapping information
4. Storage location
5. Element, resource or factor
6. Clustering algorithm
7. Entity Type(s)
8. Entity
9. Measure
10. Maximum number of clusters
11. Variable 1
    ... to
11 + n. Variable n When bots in block 343 have identified, tagged and stored cluster assignments for the data associated with every element, resource and factor in the relationship layer table (144), processing advances to a software block 307.

The software in block 307 checks the measure layer table (145) in the Contextbase (50) to see if the current measure is an options based measure like contingent liabilities, real options or competitor risk. If the current measure is not an options based measure, then processing advances to a software block 309. Alternatively, if the current measure is an options based measure, then processing advances to a software block 308.

The software in block 308 checks the bot date table (163) and deactivates option bots with creation dates before the current system date. The software in block 308 then retrieves the information from the system settings table (162), the entity schema table (157) and the element layer table (141), the transaction layer table (142), the resource layer table (143), the relationship layer table (144), the environment layer table (149), the spatial reference layer (154) and the scenarios table (168) as required to initialize option bots in accordance with the frequency specified by the user (40) in the system settings table (162).

bots are independent components of the application software of the present invention that complete specific tasks. In the case of option bots, their primary task is to determine the impact of each element, resource and factor on the entity option measure under different scenarios. The option simulation bots run a normal scenario, an extreme scenario and a combined scenario with and without clusters. In one embodiment, Monte Carlo models are used to complete the probabilistic simulation, however other option models including binomial models, multinomial models and dynamic programming can be used to the same effect. The element, resource and factor impacts on option measures could be determined using the processed detailed below for the other types of measures, however, in this embodiment a separate procedure is used. The models are initialized with specifications used in the baseline calculations. Every option bot activated in this block contains the information shown in Table 35.

TABLE 35

1. Unique ID number (based on date, hour, minute, second of creation)
2. Creation date (date, hour, minute, second)
3. Mapping information
4. Storage location
5. Scenario: normal, extreme or combined
6. Option type: real option, contingent liability or competitor risk
7. Entity Type(s)
8. Entity
9. Measure
10. Clustered data? (Yes or No)
11. Algorithm After the option bots are initialized, they activate in accordance with the frequency specified by the user (40) in the system settings table (162). Once activated, the bots retrieve the required information and simulate the measure over the time periods specified by the user (40) in the system settings table (162) as required to determine the impact of each element, resource and factor on the option. After the option bots complete their calculations, the impacts and sensitivities for the option (clustered data—yes or no) that produced the best result under each scenario are saved in the measure layer table (145) in the Contextbase (50) and processing returns to software block 341.

If the current measure was not an option measure, then processing advanced to software block 309. The software in block 309 checks the bot date table (163) and deactivates all predictive model bots with creation dates before the current system date. The software in block 309 then retrieves the information from the system settings table (162), the entity schema table (157) and the element layer table (141), the transaction layer table (142), the resource layer table (143), the relationship layer table (144), the environment layer table (149) and the spatial reference layer (154) as required to initialize predictive model bots for the measure being evaluated.

Bots are independent components of the application software that complete specific tasks. In the case of predictive model bots, their primary task is to determine the relationship between the indicators and the measure being evaluated. Predictive model bots are initialized for each cluster of data in accordance with the cluster and regime assignments specified by the bots in blocks 304, 305 and 343. A series of predictive model bots is initialized at this stage because it is impossible to know in advance which predictive model type will produce the "best" predictive model for the data from each entity. The series for each model includes: neural network; CART; GARCH, projection pursuit regression; stepwise regression, logistic regression, probit regression, factor analysis, growth modeling, linear regression; redundant regression network; boosted naive Bayes regression; support vector method, markov models, rough-set analysis, kriging, simulated annealing, latent class models, Gaussian mixture models, triangulated probability and kernel estimation. Each model includes spatial autocorrelation indicators as performance indicators. Other types predictive models can be used to the same effect. Every predictive model bot contains the information shown in Table 36.

TABLE 36

1. Unique ID number (based on date, hour, minute, second of creation)
2. Creation date (date, hour, minute, second)
3. Mapping information
4. Storage location
5. Entity Type(s)
6. Entity
7. Measure
8. Type: variable (y or n), spatial (y or n), spatial-temporal (y or n)
9. Predictive model type After predictive model bots are initialized, the bots activate in accordance with the frequency specified by the user (40) in the system settings table (162). Once activated, the bots retrieve the required data from the appropriate table in the Contextbase (50) and randomly partition the element, resource and/or factor data into a training set and a test set. The software in block 309 uses "bootstrapping" where the different training data sets are created by re-sampling with replacement from the original training set so data records may occur more than once. Training with genetic algorithms can also be used. After the predictive model bots complete their training and testing, the best fit predictive model assessments of element, resource and factor impacts on measure performance are saved in the measure layer table (145) before processing advances to a block 345.

The software in block 345 determines if clustering improved the accuracy of the predictive models generated by the bots in software block 344. The software in block 345 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the root mean squared error algorithm to the test data are given preference in determining the best set of variables for use in later analysis. Other error algorithms including entropy measures may also be used. There are eight possible outcomes from this analysis as shown in Table 37.

TABLE 37

1. Best model has no clustering
2. Best model has temporal clustering, no variable clustering, no spatial clustering
3. Best model has variable clustering, no temporal clustering, no spatial clustering
4. Best model has temporal clustering, variable clustering, no spatial clustering TABLE 37-continued 5. Best model has no temporal clustering, no variable clustering, spatial clustering
6. Best model has temporal clustering, no variable clustering, spatial clustering
7. Best model has variable clustering, no temporal clustering, spatial clustering
8. Best model has temporal clustering, variable clustering, spatial clustering If the software in block 345 determines that clustering improves the accuracy of the predictive models for an entity, then processing advances to a software block 348. Alternatively, if clustering does not improve the overall accuracy of the predictive models for an entity, then processing advances to a software block 346.

The software in block 346 uses a variable selection algorithm such as stepwise regression (other types of variable selection algorithms can be used) to combine the results from the predictive model bot analyses for each model to determine the best set of variables for each model. The models having the smallest amount of error, as measured by applying the root mean squared error algorithm to the test data, are given preference in determining the best set of variables. Other error algorithms including entropy measures may also be used. As a result of this processing, the best set of variables contain the: variables (aka element, resource and factor data), indicators, and composite variables that correlate most strongly with changes in the measure being analyzed. The best set of variables will hereinafter be referred to as the "performance drivers".

Eliminating low correlation factors from the initial configuration of the vector creation algorithms increases the efficiency of the next stage of system processing. Other error algorithms including entropy measures may be substituted for the root mean squared error algorithm. After the best set of variables have been selected, tagged and stored in the relationship layer table (144) for each entity level, the software in block 346 tests the independence of the performance drivers for each entity level before processing advances to a block 347.

The software in block 347 checks the bot date table (163) and deactivates causal predictive model bots with creation dates before the current system date. The software in block 347 then retrieves the information from the system settings table (162), the entity schema table (157) and the element layer table (141), the transaction layer table (142), the resource layer table (143), the relationship layer table (144) and the environment layer table (149) as required to initialize causal predictive model bots for each element, resource and factor in accordance with the frequency specified by the user (40) in the system settings table (162). Sub-context elements, resources and factors may be used in the same manner.

Bots are independent components of the application software that complete specific tasks. In the case of causal predictive model bots, their primary task is to refine the performance driver selection to reflect only causal variables. A series of causal predictive model bots are initialized at this stage because it is impossible to know in advance which causal predictive model will produce the "best" fit for variables from each model. The series for each model includes six causal predictive model bot types: kriging, latent class models, Gaussian mixture models, kernel estimation and Markov-Bayes. The software in block 347 generates this series of causal predictive model bots for each set of performance drivers stored in the relationship layer table (144) in the previous stage in processing. Every causal predictive model bot activated in this block contains the information shown in Table 38.

TABLE 38

1. Unique ID number (based on date, hour, minute, second of creation)
2. Creation date (date, hour, minute, second)
3. Mapping information
4. Storage location
5. Causal predictive model type
6. Entity Type(s)
7. Entity
8. Measure After the causal predictive model bots are initialized by the software in block 347, the bots activate in accordance with the frequency specified by the user (40) in the system settings table (162). Once activated, they retrieve the required information for each model and sub-divide the variables into two sets, one for training and one for testing. After the causal predictive model bots complete their processing for each model, the software in block 347 uses a model selection algorithm to identify the model that best fits the data. For the system of the present invention, a cross validation algorithm is used for model selection. The software in block 347 then saves the refined impact estimates in the measure layer table (145) and the best fit causal element, resource and/or factor indicators are identified in the relationship layer table (144) in the Contextbase (50) before processing returns to software block 301.

If software in block 345 determines that clustering improves predictive model accuracy, then processing advances directly to block 348 as described previously. The software in block 348 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the root mean squared error algorithm to the test data are given preference in determining the best set of variables. Other error algorithms including entropy measures can also be used. As a result of this processing, the best set of variables contains: the element data, resource data and factor data that correlate most strongly with changes in the function measures. The best set of variables will hereinafter be referred to as the "performance drivers". Eliminating low correlation factors from the initial configuration of the vector creation algorithms increases the efficiency of the next stage of system processing. Other error algorithms including entropy measures may be substituted for the root mean squared error algorithm. After the best set of variables have been selected, they are tagged as performance drivers and stored in the relationship layer table (144), the software in block 348 tests the independence of the performance drivers before processing advances to a block 349.

The software in block 349 checks the bot date table (163) and deactivates causal predictive model bots with creation dates before the current system date. The software in block 349 then retrieves the information from the system settings table (162), the entity schema table (157) and the element layer table (141), the transaction layer table (142), the resource layer table (143), the relationship layer table (144) and the environment layer table (149) as required to initialize causal predictive model bots in accordance with the frequency specified by the user (40) in the system settings table (162). bots are independent components of the application software of the present invention that complete specific tasks. In the case of causal predictive model bots, their primary task is to refine the element, resource and factor performance driver selection to reflect only causal variables. (Note: these variables are grouped together to represent a single vector when they are dependent). In some cases it may be possible to skip the correlation step before selecting causal the item variables, factor variables, indicators and composite variables. A series of causal predictive model bots are initialized at this stage because it is impossible to know in advance which causal predictive model will produce the "best" fit variables for each measure. The series for each measure includes six causal predictive model bot types: kriging, latent class models, Gaussian mixture models, kernel estimation and Markov-Bayes. The software in block 349 generates this series of causal predictive model bots for each set of performance drivers stored in the entity schema table (157) in the previous stage in processing. Every causal predictive model bot activated in this block contains the information shown in Table 39.

TABLE 39

1. Unique ID number (based on date, hour, minute, second of creation)
2. Creation date (date, hour, minute, second)
3. Mapping information
4. Storage location
5. Type: Cluster (ID), Regime (ID), Cluster (ID) & Regime (ID)
6. Entity Type(s)
7. Entity
8. Measure
9. Causal predictive model type After the causal predictive model bots are initialized by the software in block 349, the bots activate in accordance with the frequency specified by the user (40) in the system settings table (162). Once activated, they retrieve the required information for each model and sub-divide the variables into two sets, one for training and one for testing. The same set of training data are used by each of the different types of bots for each model. After the causal predictive model bots complete their processing for each model, the software in block 349 uses a model selection algorithm to identify the model that best fits the data for each process, element, resource and/or factor being analyzed by model and/or regime by entity. For the system of the present invention, a cross validation algorithm is used for model selection. The software in block 349 saves the refined impact estimates in the measure layer table (145) and identifies the best fit causal element, resource and/or factor indicators in the relationship layer table (144) in the Contextbase (50) before processing returns to software block 341.

When the software in block 341 determines that all measure models are current processing advances to a software block 351. The software in block 351 checks the measure layer table (145) and the event model table (158) in the Contextbase (50) to determine if all event models are current. If all event models are current, then processing advances to a software block 361. Alternatively, if new event models need to be developed, then processing advances to a software block 325. The software in block 325 retrieves information from the system settings table (162), the entity schema table (157) and the element layer table (141), the transaction layer table (142), the resource layer table (143), the relationship layer table (144), the environment layer table (149), the spatial reference table (154) and the event model table (158) as required to complete summaries of event history and forecasts before processing advances to a software block 304 where the processing sequence described above—save for the option bot processing—is used to identify drivers for event risk and transaction frequency. After all event frequency models have been developed they are stored in the event model table (158) and processing advances to software block 361.

The software in block 361 checks the measure layer table (145) and impact model table (166) in the Contextbase (50) to determine if impact models are current for all event risks and actions. If all impact models are current, then processing advances to a software block 370. Alternatively, if new impact models need to be developed, then processing advances to a software block 335. The software in block 335 retrieves information from the system settings table (162), the entity schema table (157) and the element layer table (141), the transaction layer table (142), the resource layer table (143), the relationship layer table (144), the environment layer table (149)), the spatial reference table (154) and the impact model table (166) as required to complete summaries of impact history and forecasts before processing advances to a software block 304 where the processing sequence described above—save for the option bot processing—is used to identify drivers for event risk and transaction impact (or magnitude). After impact models have been developed for all event risks and action impacts they are stored in the impact model table (166) and processing advances to software block 370.

The software in block 370 determines if adding spatial data improves the accuracy of the predictive models. The software in block 370 uses a variable selection algorithm such as stepwise regression (other types of variable selection algorithms can be used) to combine the results from each type of prior analysis—with and without spatial data—to determine the best set of variables for each type of analysis. The type of analysis having the smallest amount of error as measured by applying the root mean squared error algorithm to the test data are used for subsequent later analysis. Other error algorithms including entropy measures may also be used. There are eight possible outcomes from this analysis as shown in Table 40.

TABLE 40

1. Best measure, event and impact models are spatial
2. Best measure and event models are spatial, best impact model is not spatial
3. Best measure and impact models are spatial, best event model is not spatial
4. Best measure models are spatial, best event and impact models are not spatial
5. Best measure models are not spatial, best event and impact models are spatial
6. Best measure and impact models are not spatial, best event model is spatial
7. Best measure and event models are not spatial, best impact model is spatial
8. Best measure, event and impact models are not spatial The best set of models identified by the software in block 370 are tagged for use in subsequent processing before processing advances to a software block 371.

The software in block 371 checks the measure layer table (145) in the Contextbase (50) to determine if probabilistic relational models were used in measure impacts. If probabilistic relational models were used, then processing advances to a software block 377. Alternatively, if probabilistic relational models were not used, then processing advances to a software block 372.

The software in block 372 tests the performance drivers to see if there is interaction between elements, factors and/or resources by entity. The software in this block identifies interaction by evaluating a chosen model based on stochasticdriven pairs of value-driver subsets. If the accuracy of such a model is higher that the accuracy of statistically combined models trained on attribute subsets, then the attributes from subsets are considered to be interacting and then they form an interacting set. Other tests of driver interaction can be used to the same effect. The software in block 372 also tests the performance drivers to see if there are "missing" performance drivers that are influencing the results. If the software in block 372 does not detect any performance driver interaction or missing variables for each entity, then system processing advances to a block 376. Alternatively, if missing data or performance driver interactions across elements, factors and/or resources are detected by the software in block 372 for one or more measure processing advances to a software block 373.

The software in block 373 evaluates the interaction between performance drivers as required to classify the performance driver set. The performance driver set generally matches one of the six patterns of interaction: a multi-component loop, a feed forward loop, a single input driver, a multi input driver, auto-regulation and a chain. After classifying each performance driver set the software in block 373 prompts the user (40) via the structure revision window (706) to accept the classification and continue processing, establish probabilistic relational models as the primary causal model and/or adjust the specification(s) for the context elements and factors in some other way as required to minimize or eliminate interaction that was identified. For example, the user (40) can also choose to re-assign a performance driver to a new context element or factor to eliminate an identified interdependency. After the optional input from the user (40) is saved in the element layer table (141), the environment layer table (149) and the system settings table (162) processing advances to a software block 374. The software in block 374 checks the element layer table (141), the environment layer table (149) and system settings table (162) to see if there any changes in structure. If there have been changes in the structure, then processing returns to block 201 and the system processing described previously is repeated. Alternatively, if there are no changes in structure, then the information regarding the element interaction is saved in the relationship layer table (144) before processing advances to a block 376.

The software in block 376 checks the bot date table (163) and deactivates vector generation bots with creation dates before the current system date. The software in block 376 then initializes vector generation bots for each context element, sub-context element, element combination, factor combination, context factor and sub-context factor. The bots activate in accordance with the frequency specified by the user (40) in the system settings table (162) and retrieve information from the element layer table (141), the transaction layer table (142), the resource layer table (143), the relationship layer table (144) and the environment layer table (149). Bots are independent components of the application software that complete specific tasks. In the case of vector generation bots, their primary task is to produce vectors that summarize the relationship between the causal performance drivers and changes in the measure being examined. The vector generation bots use induction algorithms to generate the vectors. Other vector generation algorithms can be used to the same effect. Every vector generation bot contains the information shown in Table 41.

TABLE 41

1. Unique ID number (based on date, hour, minute, second of creation)

TABLE 41-continued

2. Creation date (date, hour, minute, second)
3. Mapping information
4. Storage location
5. Hierarchy of Group
6. Entity
7. Measure
8. Element, sub-element, factor, sub-factor, resource, sub-resource or combination
9. Factor 1
   ... to
9 + n. Factor n When bots in block 376 have created and stored vectors for all time periods with data for all the elements, sub-elements, factors, sub-factors, resources, sub-resources and combinations that have vectors in the entity schema table (157) by entity, processing advances to a software block 377.

The software in block 377 checks the bot date table (163) and deactivates life bots with creation dates before the current system date. The software in block 377 then retrieves the information from the system settings table (162), the element layer table (141), the transaction layer table (142), the resource layer table (143), the relationship layer table (144) and the environment layer table (149) as required to initialize life bots for each element and factor. Bots are independent components of the application software that complete specific tasks. In the case of life bots, their primary task is to determine the expected life of each element, resource and factor. There are three methods for evaluating the expected life:

1. Elements, resources and factors that are defined by a population of members or items (such as: channel partners, customers, employees and vendors) will have their lives estimated by forecasting the lives of members of the population and then integrating the results into an overall population density matrix. The forecast of member lives will be determined by the "best" fit solution from competing life estimation methods including the Iowa type survivor curves, Weibull distribution survivor curves, growth models, Gompertz-Makeham survivor curves, Bayesian population matrix estimation and polynomial equations using the tournament method for selecting from competing forecasts;
2. Elements, resources and factors (such as patents, long term supply agreements, certain laws and insurance contracts) that have legally defined lives will have their lives calculated using the time period between the current date and the expiration date of their defined life; and
3. Finally, elements, resources and factors that do not have defined lives will have their lives estimated to equal the forecast time period.

Every element life bot contains the information shown in Table 42.

TABLE 42

1. Unique ID number (based on date, hour, minute, second of creation)
2. Creation date (date, hour, minute, second)
3. Mapping information
4. Storage location
5. Hierarchy of Group
6. Entity
7. Measure
8. Element, sub-element, factor, sub-factor, resource, sub-resource or combination
9. Life estimation method (item analysis, defined or forecast period)

After the life bots are initialized, they are activated in accordance with the frequency specified by the user (40) in the system settings table (162). After being activated, the bots retrieve information for each element and sub-context element from the Contextbase (50) as required to complete the estimate of element life. The resulting values are then tagged and stored in the element layer table (141), the resource layer table (143) or the environment layer table (149) in the Contextbase (50) before processing advances to a block 379.

The software in block 379 checks the bot date table (163) and deactivates dynamic relationship bots with creation dates before the current system date. The software in block 379 then retrieves the information from the system settings table (162), the element layer table (141), the transaction layer table (142), the resource layer table (143), the relationship layer table (144), the environment layer table (149) and the event risk table (156) as required to initialize dynamic relationship bots for the measure. bots are independent components of the application software that complete specific tasks. In the case of dynamic relationship bots, their primary task is to identify the best fit dynamic model of the interrelationship between the different elements, factors, resources and events that are driving measure performance. The best fit model is selected from a group of potential linear models and non-linear models including swarm models, complexity models, simple regression models, power law models and fractal models. Every dynamic relationship bot contains the information shown in Table 43.

TABLE 43

1. Unique ID number (based on date, hour, minute, second of creation)
2. Creation date (date, hour, minute, second)
3. Mapping information
4. Storage location
5. Hierarchy of Group
6. Entity
7. Measure
8. Algorithm The bots in block 379 identify the best fit model of the dynamic interrelationship between the elements, factors, resources and risks for the reviewed measure and store information regarding the best fit model in the relationship layer table (144) before processing advances to a software block 380.

The software in block 380 checks the bot date table (163) and deactivates partition bots with creation dates before the current system date. The software in the block then retrieves the information from the system settings table (162), the element layer table (141), the transaction layer table (142), the resource layer table (143), the relationship layer table (144), the measure layer table (145), the environment layer table (149), the event risk table (156) and the scenario table (168) to initialize partition bots in accordance with the frequency specified by the user (40) in the system settings table (162). bots are independent components of the application software of the present invention that complete specific tasks. In the case of partition bots, their primary task is to use the historical and forecast data to segment the performance measure contribution of each element, factor, resource, combination and performance driver into a base value and a variability or risk component. The system of the present invention uses wavelet algorithms to segment the performance contribution into two components although other segmentation algorithms such as GARCH could be used to the same effect. Every partition bot contains the information shown in Table 44.

TABLE 44

1. Unique ID number (based on date, hour, minute, second of creation)
2. Creation date (date, hour, minute, second)
3. Mapping information
4. Storage location
5. Hierarchy of Group
6. Entity
7. Measure
8. Element, factor, resource or combination
9. Segmentation algorithm After the partition bots are initialized, the bots activate in accordance with the frequency specified by the user (40) in the system settings table (162). After being activated the bots retrieve data from the Contextbase (50) and then segment the performance contribution of each element, factor, resource or combination into two segments. The resulting values by period for each entity are then stored in the measure layer table (145), before processing advances to a software block 382.

The software in block 382 retrieves the information from the event table (158) and the impact table (166) and combines the information from both tables as required to update the event risk estimate for the entity. The resulting values by period for each entity are then stored in the event risk table (156), before processing advances to a software block 389.

The software in block 389 checks the bot date table (163) and deactivates simulation bots with creation dates before the current system date. The software in block 389 then retrieves the information from the relationship layer table (144), the measure layer table (145), the event risk table (156), the entity schema table (157), the system settings table (162) and the scenario table (168) as required to initialize simulation bots in accordance with the frequency specified by the user (40) in the system settings table (162).

Bots are independent components of the application software that complete specific tasks. In the case of simulation bots, their primary task is to run three different types of simulations of entity measure performance. The simulation bots run probabilistic simulations of measure performance using: the normal scenario, the extreme scenario and the blended scenario. They also run an unconstrained genetic algorithm simulation that evolves to the most negative value possible over the specified time period. In one embodiment, Monte Carlo models are used to complete the probabilistic simulation, however other probabilistic simulation models such as Quasi Monte Carlo, genetic algorithm and Markov Chain Monte Carlo can be used to the same effect. The models are initialized using the statistics and relationships derived from the calculations completed in the prior stages of processing to relate measure performance to the performance driver, element, factor, resource and event risk scenarios. Every simulation bot activated in this block contains the information shown in Table 46.

TABLE 46

1. Unique ID number (based on date, hour, minute, second of creation)
2. Creation date (date, hour, minute, second)
3. Mapping information
4. Storage location
5. Type: normal, extreme, blended or genetic algorithm
6. Measure
7. Hierarchy of Group
8. Entity After the simulation bots are initialized, they activate in accordance with the frequency specified by the user (40) in the system settings table (162). Once activated, they retrieve the required information and simulate measure performance by entity over the time periods specified by the user (40) in the system settings table (162). In doing so, the bots will forecast the range of performance and risk that can be expected for the specified measure by entity within the confidence interval defined by the user (40) in the system settings table (162) for each scenario. The bots also create a summary of the overall risks facing the entity for the current measure. After the simulation bots complete their calculations, the resulting forecasts are saved in the scenario table (168) by entity and the risk summary is saved in the report table (153) in the Contextbase (50) before processing advances to a software block 390.

The software in block 390 checks the measure layer table (145) and the system settings table (162) in the Contextbase (50) to see if probabilistic relational models were used. If probabilistic relational models were used, then processing advances to a software block 398. Alternatively, if the current calculations did not rely on probabilistic relational models, then processing advances to a software block 391.

The software in block 391 checks the bot date table (163) and deactivates measure bots with creation dates before the current system date. The software in block 391 then retrieves the information from the system settings table (162), the measure layer table (145), the entity schema table (157) as required to initialize bots for each context element, context factor, context resource, combination or performance driver for the measure being analyzed. Bots are independent components of the application software of the present invention that complete specific tasks. In the case of measure bots, their task is to determine the net contribution of the network of elements, factors, resources, events, combinations and performance drivers to the measure being analyzed. The relative contribution of each element, factor, resource, combination and performance driver is determined by using a series of predictive models to find the best fit relationship between the context element vectors, context factor vectors, combination vectors and performance drivers and the measure. The system of the present invention uses different types of predictive models to identify the best fit relationship: neural network; CART; projection pursuit regression; generalized additive model (GAM); GARCH; MMDR; MARS, redundant regression network; boosted Naïve Bayes Regression; relevance vector, hierarchical Bayes, the support vector method; markov; linear regression; and stepwise regression. The model having the smallest amount of error as measured by applying the root mean squared error algorithm to the test data is the best fit model. Other error algorithms and/or uncertainty measures including entropy measures may also be used. The "relative contribution algorithm" used for completing the analysis varies with the model that was selected as the "best-fit". For example, if the "best-fit" model is a neural net model, then the portion of the measure attributable to each input vector is determined by the formula shown in Table 47.

TABLE 47

$$\left(\sum_{k=1}^{k=m}\sum_{j=1}^{j=n}I_{jk}\times O_k / \sum_{j=1}^{j=n}I_{ik}\right) / \sum_{k=1}^{k=m}\sum_{j=1}^{j=n}I_{jk}\times O_k$$

Where
$I_{jk}$ = Absolute value of the input weight from input node j to hidden node k
$O_k$ = Absolute value of output weight from hidden node k
M = number of hidden nodes
N = number of input nodes After completing the best fit calculations, the bots review the lives of the context elements that impact measure performance. If one or more of the elements has an expected life that is shorter than the forecast time period stored in the system settings, then a separate model will be developed to reflect the removal of the impact from the element(s) that are expiring. The resulting values for relative context element and context factor contributions to measure performance are and saved in the entity schema table (157) by entity and entity. If the calculations are related to a commercial business then the value of each contribution will be saved. The overall model of measure performance is saved in the measure layer table (145) by entity and entity. Every measure bot contains the information shown in Table 48.

TABLE 48

1. Unique ID number (based on date, hour, minute, second of creation)
2. Creation date (date, hour, minute, second)
3. Mapping information
4. Storage location
5. Hierarchy of Group
6. Entity
7. Measure
8. Element, factor, resource combination or performance driver After the measure bots are initialized by the software in block 366 they activate in accordance with the frequency specified by the user (40) in the system settings table (162). After being activated, the bots retrieve information and complete the analysis of the measure performance. As described previously, the resulting relative contribution percentages are saved in the entity schema table (157) by entity. The overall model of measure performance is saved in the measure layer table (145) by entity before processing advances to a software block 392.

Before continuing the discussion the remaining calculations in this section it is appropriate to briefly review the processing that has been completed in this portion of system (100) processing. At this point, the element layer table (141), transaction layer table (142), resource layer table (143) and environment layer table (149) contain information that defines the administrative status of the entity by element and factor. As detailed above, the relationship layer table (144) now contains information that identifies the inter-relationship between the different elements, resources, risks and factors that drive measure performance. The measure layer table (145) now contains information that identifies the elements, resources and factors that support measure performance by entity. The measure layer table (145) also contains a summary of the event risks, element risks, resource risks and factor risks that threaten measure performance. The event risks include standard event risks, competitor risks, contingent liabilities and extreme risks while the element, factor and resource risks are primarily variability risks. In short, the Contextbase (50) now contains a complete picture of entity function measure performance. In the steps that follow, the Contextbase (50) will be updated to support the analysis of entity measure relevance, the alignment of measures for the relevant hierarchy will be evaluated, the efficient frontier for entity measure performance will be defined and the relevant entity ontology will be formalized and stored. The next step in this processing is completed in software block 392.

The software in block 392 checks the measure layer table (145) in the Contextbase (50) to determine if all entity measures are current. If all measures are not current, then processing returns to software block 302 and the processing described above for this portion (300) of the application software is repeated. Alternatively, if all measure models are current, then processing advances to a software block 394.

The software in block 394 retrieves the previously stored values for measure performance from the measure layer table (145) before processing advances to a software block 395. The software in block 395 checks the bot date table (163) and deactivates measure relevance bots with creation dates before the current system date. The software in block 395 then retrieves the information from the system settings table (162) and the measure layer table (145) as required to initialize a bot for each entity being analyzed. bots are independent components of the application software of the present invention that complete specific tasks. In the case of measure relevance bots, their tasks are to determine the relevance of each of the different measures to entity performance and determine the priority that appears to be placed on each of the different measures is there is more than one. The relevance and ranking of each measure is determined by using a series of predictive models to find the best fit relationship between the measures and entity performance. The system of the present invention uses several different types of predictive models to identify the best fit relationship: neural network; CART; projection pursuit regression; generalized additive model (GAM); GARCH; MMDR; redundant regression network; markov, boosted naive Bayes Regression; the support vector method; linear regression; and stepwise regression. The model having the smallest amount of error as measured by applying the root mean squared error algorithm to the test data is the best fit model. Other error algorithms including entropy measures may also be used. Bayes models are used to define the probability associated with each relevance measure and the Viterbi algorithm is used to identify the most likely contribution of all elements, factors, resources and risks by entity. The relative contributions are saved in the measure layer table (145) by entity. Every measure relevance bot contains the information shown in Table 49.

TABLE 49

1. Unique ID number (based on date, hour, minute, second of creation)
2. Creation date (date, hour, minute, second)
3. Mapping information
4. Storage location
5. Hierarchy of Group
6. Entity
7. Measure After the measure relevance bots are initialized by the software in block 375 they activate in accordance with the frequency specified by the user (40) in the system settings table (162). After being activated, the bots retrieve information and complete the analysis of the measure performance. As described previously, the relative measure contributions to measure performance and the associated probability are saved in the measure layer table (145) by entity before processing advances to a software block 396.

The software in block 396 retrieves information from the measure table (145) and then checks the measures for the entity hierarchy to determine if the different levels are in alignment. As discussed previously, lower level measures that are out of alignment can be identified by the presence of measures from the same level with more impact on entity measure performance. For example, employee training could be shown to be a strong performance driver for the entity. If the human resources department (that is responsible for both training and performance evaluations) was using only a timely performance evaluation measure, then the measures would be out of alignment. If measures are out of alignment, then the software in block 396 prompts the manager (41) via the measure edit data window (708) to change the measures by entity as required to bring them into alignment. Alternatively, if measures by entity are in alignment, then processing advances to a software block 397.

The software in block 397 checks the bot date table (163) and deactivates frontier bots with creation dates before the current system date. The software in block 377 then retrieves information from the event risk table (156), the system settings table (162) and the scenarios table (168) as required to initialize frontier bots for each scenario. Bots are independent components of the application software of the present invention that complete specific tasks. In the case of frontier bots, their primary task is to define the efficient frontier for entity performance measures under each scenario. The top leg of the efficient frontier for each scenario is defined by successively adding the features, options and performance drivers that improve performance while increasing risk to the optimal mix in resource efficiency order. The bottom leg of the efficient frontier for each scenario is defined by successively adding the features, options and performance drivers that decrease performance while decreasing risk to the optimal mix in resource efficiency order. Every frontier bot contains the information shown in Table 50.

TABLE 50

1. Unique ID number (based on date, hour, minute, second of creation)
2. Creation date (date, hour, minute, second)
3. Mapping information
4. Storage location
5. Entity
6. Scenario: normal, extreme and blended After the software in block 397 initializes the frontier bots, they activate in accordance with the frequency specified by the user (40) in the system settings table (162). After completing their calculations, the results of all 3 sets of calculations (normal, extreme and most likely) are saved in the report table (153) in sufficient detail to generate a chart before processing advances to a software block 398.

The software in block 398 takes the previously stored entity schema from the entity schema table (157) and combines it with the relationship information in the relationship layer table (144) and the measure layer table (145) to develop the entity ontology. The ontology is then stored in the ontology table (152) using the OWL language. Use of the rdf (resource description framework) based OWL language will enable the communication and synchronization of the entities ontology with other entities and will facilitate the extraction and use of information from the semantic web. After the relevant entity ontology is saved in the Contextbase (50), processing advances to a software block 402.

Context Frame Definition

The flow diagram in FIG. 8 details the processing that is completed by the portion of the application software (400) that identifies valid context space (and principles), and responds to search requests. Processing in this portion of the application starts in software block 402.

The software in block 402 calculates expected uncertainty by multiplying the user (40) and subject matter expert (42) estimates of narrow system (4) uncertainty by the relative importance of the data from the narrow system for each measure. The expected uncertainty for each measure is expected to be lower than the actual uncertainty (measured using $R^2$ as discussed previously) because total uncertainty is a function of data uncertainty plus parameter uncertainty (i.e. are the specified elements, resources and factors the correct ones) and model uncertainty (does the model accurately reflect the relationship between the data and the measure). After saving the uncertainty information in the uncertainty table (150) processing advances to a software block 403.

The software in block 403 retrieves information from the system settings table (162), the element layer table (141), the transaction layer table (142), the resource layer table (143), the relationship layer table (144), the measure layer table (145), the environment layer table (149), the registration layer table (154), the event risk table (156) and the entity schema table (157) as required to define a context frame for every entity specified by the user (40) in the system settings table. Context frames can also be developed for other entities or combinations of entities. Context frames include all context layers relevant to function measure performance for the subject entity and one or more entity functions. The resulting context frames are given a unique identification number that identifies the time, data and entity before being stored in the context frame table (160). After storage is complete, processing advances to a software block 410.

Figure 2B:
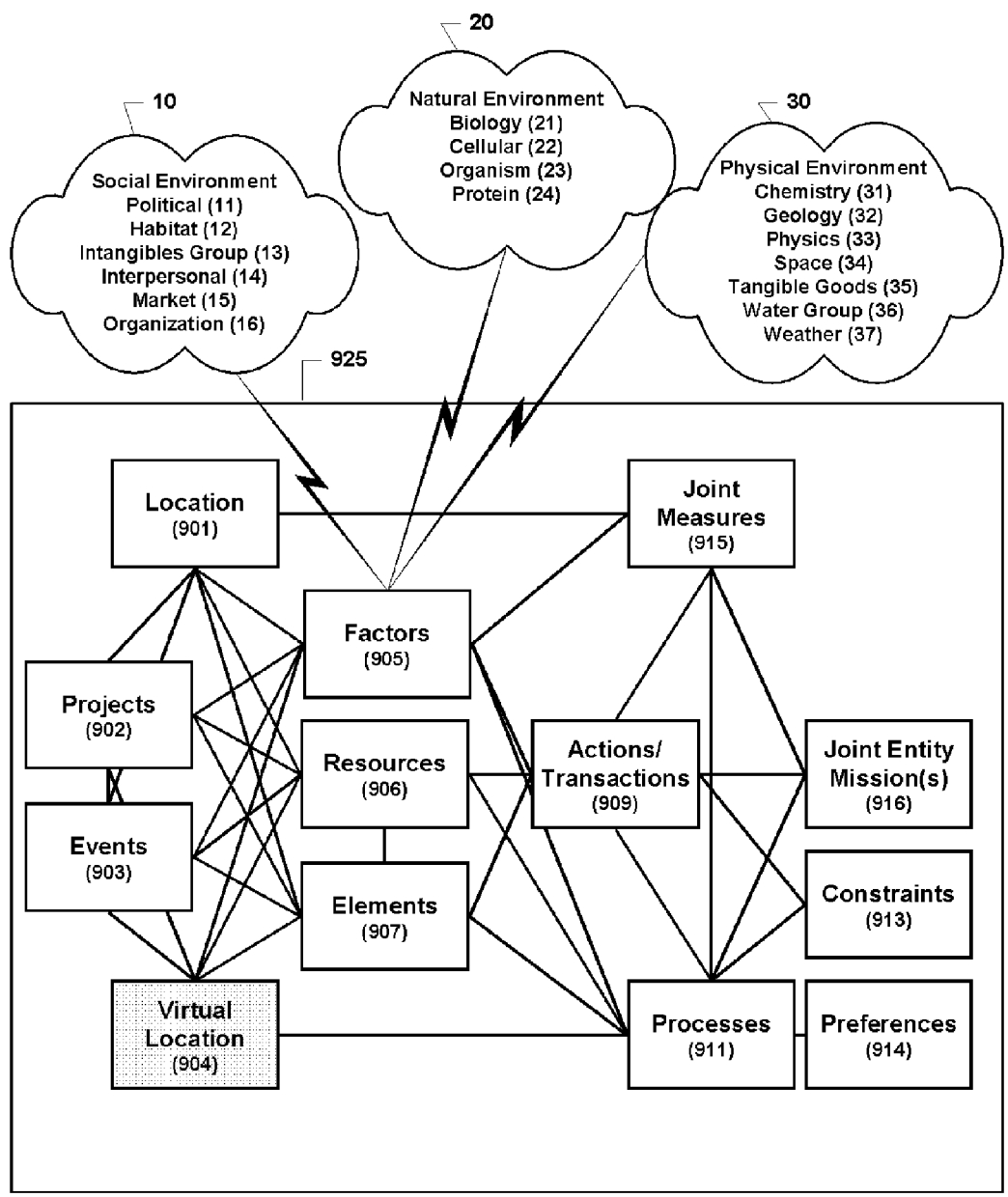

The software in block 410 retrieves information from the relationship layer table (144), the measure layer table (145) and the context frame table (160) as required to define the valid context space for the current relationships and measures stored in the Contextbase (50). The current measures and relationships are compared to previously stored context frames to determine the range of contexts in which they are valid with the confidence interval specified by the user (40) in the system settings table (162). The resulting list of valid frame definitions stored in the context space table (151). The software in this block also completes a stepwise elimination of each user specified constraint. This analysis helps determine the sensitivity of the results and may indicate that it would be desirable to use some resources to relax one or more of the established constraints. The results of this analysis is stored in the context space table (151). The software in this block also develops composite indices for data, information and knowledge in the Contextbase (50) using the impact cutoff, node depth and level of detail (layers of context, components of context or subcomponents of context) specified by the user (40) in the system settings table (162) as illustrated by FIG. 15 and FIG. 16. In accordance with the example shown in FIG. 15, the element and factor layers would be used in a composite index. One column of the index would be the element descriptions and another column of the index would be the factor descriptions. In accordance with the example shown in FIG. 16, the equipment and weather components of context would be used in a composite index. One column of the index would be the equipment descriptions and another column of the index would be the weather data descriptions. The node depth identifies the number of node connections that are used to identify context layers, components of context or sub-components of context that will be indexed. For example, if a single entity (as shown in FIG. 2A) was expected to need information about a resource (906) and a node depth of one had been selected, then the relevance rankings would consider the context layers, components of context and/or sub-components of context that are linked to resources by a single link. The composite indices include item creation data as an index column and give each item of data, information and/or knowledge a position ranking based on recency of item creation. The indices are saved in the context space table by entity and context frame before processing advances to a software block 411.

The software in block 411 receives a search request and then uses a relevance measure in a weighted combination with the composite index positions for the appropriate context frame to identify and prioritize the most relevant data and/or information for a user's context. The weight given to the index position is determined by the user (40) in the system settings and the relevance measure is selected from the group consisting of cover density rankings, vector space model measurements, okapi similarity measurements, three level relevance scores and hypertext induced topic selection algorithm. The relevance measure used for identifying and ranking relevant data can be specified in the system settings (see Table 16). If the relevance measure is not specified, then the software in block 411 uses the Q learning algorithm (learning rate=3/8, discount rate=0.8) to identify the best relevance measure for each context frame. It does this by presenting a randomized listing of the best results from each type of measure as the initial set of results (i.e. the best result from vector space model measurements may be displayed first, the best result from cover density rankings may be displayed second, etc.—a process repeated for the first 20 or 30 results from each measure) and assigning values to the user's selection of results to generate the values required for reinforcement learning (value=100 for being the first result selected, 90 for being the second result selected, 80 for being the third result selected, 70 for being the fourth result selected, 60 for being the fifth result selected, 50 for being the sixth result selected, 40 for being the seventh result selected, 30 for being the eighth result selected, 20 for being the ninth result selected and 5 for being any result selected tenth or later). Using this method, the system of the present invention learns the best relevance measure for each context frame. Other temporal difference reinforcement learning algorithms such as Sarsa can be used to the same effect. Search requests generally comprise one or two "keywords" that the user enters via a browser (see FIG. 1) or that are generated by the Complete Context™ Scout Service (616) as described in cross referenced patent application Ser. No. 12/497,656. Search requests can also take the form of written or spoken questions if the Natural Language Interface (714) is activated.

As shown in FIG. 17, the processing to support the development of a true natural language interface starts with the receipt of audio input to the natural language interface (714) from audio sources (1), video sources (2), devices (3), narrow systems (4), a portal (11), an access device (90) with a browser (800) and/or the software in block 411. From there, the audio input passes to a software block 750 where the input is digitized in a manner that is well know. After being digitized, the input passes to a software block 751 where it is segmented in phonemes in a manner that is well known. The phonemes are then passed to a software block 752 where in a manner that is well known, they are compared to previously stored phonemes in the phoneme database (755) to identify the most probable set of words contained in the input. The most probable set of words are saved in the natural language table (169) in the Contextbase (50) before processing advances to a software block 753. The software in block 753 compares the word set to previously stored phrases in the phrase database (760) and the ontology from the ontology table (152) to classify the word set as one or more phrases. After the classification is completed and saved in the natural language table (169), the software in block 754 uses the classified input and ontology to guide the completion of any actions that may be required by other parts of the system (100), generate a response to the translated input and transmit response to the natural language interface (714) that is then forwarded to a device (3), a narrow system (4), an audio output device (9), a portal (11) or the access device (90) with the browser (800). This process continues until all natural language input has been processed and the context information has been synchronized with the appropriate device, systems and/or applications. When this processing is complete, processing advances to a software block 411.

Figure 3:
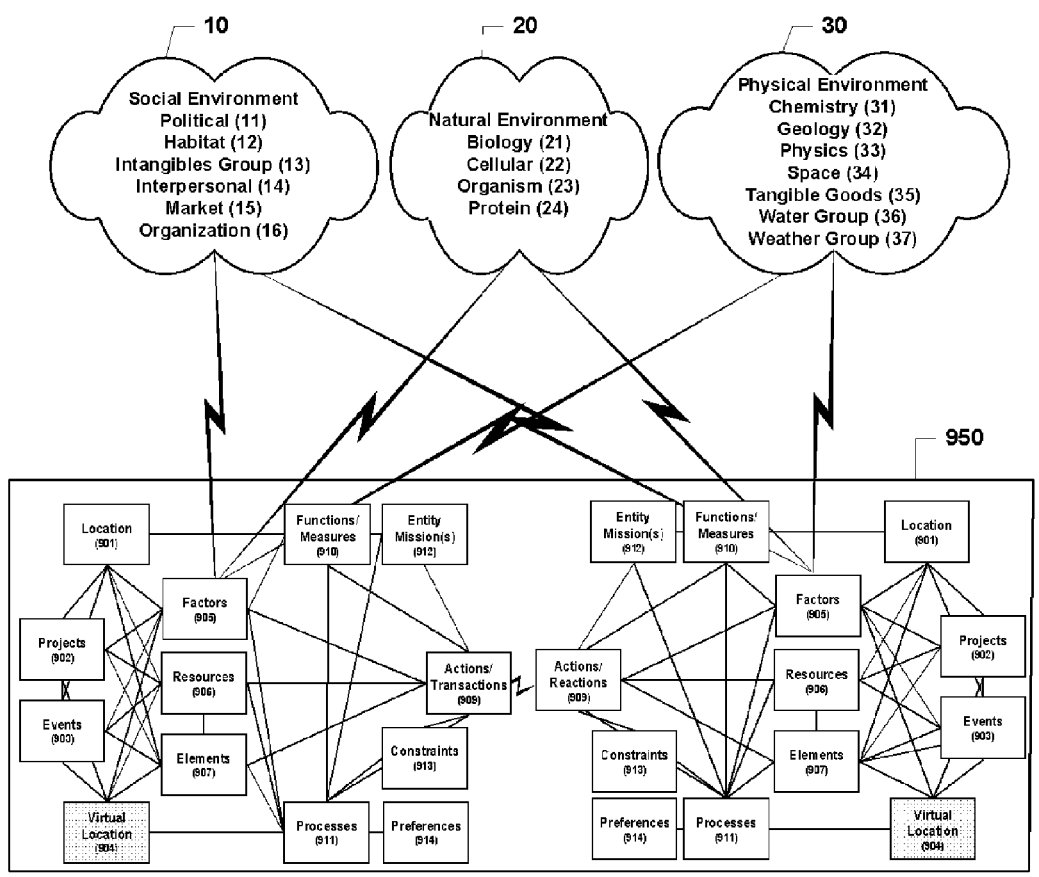
FIG. 3 is a block diagram showing one type of multi-entity system.

The standard response to the search request is an electronic display on the user's browser listing the location of the identified data and information in order of relevance and providing links to said data and information in a format that is well known. Responses to search requests received from the natural language interface (714) and Complete Context™ Scout (616) are returned via the source of the search. Although not shown in the drawings, the Complete Context™ Input System (601) can also transmit search requests and receive results. The search results can also be displayed in a graphical format using the formats shown in FIG. 2A, FIG. 2B and/or FIG. 3. If this option is chosen, then the user (40) has the option of focusing on any block in the graph, for example the user (40) could choose to retrieve information about the resources (906) that support an entity (900). Health information may optionally be included as part of the search results. After the search results have been displayed, processing advances to a software block 413.

The software in block 413 creates and stores prioritized context frames. As discussed previously, context frames provide the models and information that Complete Context™ applications use to adapt to and manage the performance situation of an entity. The Prioritized Context Frame includes only the context layers, components of context or subcomponents of context (depending on level of detail chosen by the user (40) in the System Settings table) that meet the impact cutoff and node depth criteria specified by the user (40). Complete Context™ Suite applications such as those described in cross referenced U.S. patent application Ser. No. 13/239,241, other cross referenced patents and patent applications including benefit plan analysis, customization, display, exchange, forecast, input capture, knowledge capture, metric development, optimization, planning, profile development, review, rule development, summary, sustainability forecast and wellness program optimization utilize the models and information from a prioritized context frame to adapt to and manage the performance situation of an entity. The resulting prioritized context frames are given a unique identification number that identifies the time, data and entity before being stored in the context frame table (160). After storage is complete, processing advances to a software block 431.

The software in block 431 checks the system settings table (162) to determine if the system is operating in a continuous run mode. If the system is operating in a continuous run mode, then processing returns to block 205 and the processing described previously is repeated in accordance with the frequency specified by the user (40) in the system settings table (162). Alternatively, if the system is not running in continuous mode, then the processing advances to a block 438 where the system stops.

Thus, the reader will see that the system and method described above transforms data, information and knowledge from disparate devices (3), narrow systems (4) and the World Wide Web (8) into a Complete Context™ Search System (100).

While the above description contains many specificities, these should not be construed as limitations on the scope of the invention, but rather as an exemplification of one embodiment thereof. Accordingly, the scope of the invention should be determined not by the embodiment illustrated, but by the appended claims and their legal equivalents.

The invention claimed is:

1. A non-transitory computer-readable medium having computer-executable instructions stored thereon that, if executed by a computing device, cause the computing device to perform operations comprising:
    obtaining a subject entity definition of a subject entity, a node depth criteria and an impact cutoff criteria;
    aggregating and preparing a plurality of data items that include data related to the subject entity for processing, wherein the data comprises at least one entity function, one or more entity function measures and a creation date for each of the plurality of data items;
    storing the aggregated plurality of data items in one or more context layers by a component of context;
    developing a subject entity situation summary by analyzing the subject entity related data, wherein the subject entity situation summary comprises a linear or nonlinear regression model of each of the one or more entity function measures, a relevance for each of the measures and one or more of the context layers;
    using the subject entity situation summary, the node depth criteria and the impact cutoff criteria to identify components of context to include in a composite index;
    creating a composite index for the data associated with the identified components of context, wherein the composite index comprises a column for the creation dates of the plurality of data items, a column for each of the identified components of context and a ranking for each of the plurality of data items of the composite index;
    receiving a search request; and
    providing a plurality of search results in response to the search request, wherein the plurality of search results are prioritized using a weight comprised of a mathematical combination of an index position ranking and a ranking provided by a relevance measure.

2. The non-transitory computer-readable medium of claim 1, wherein the plurality of search results comprise a plurality of health related data, wherein the health related data comprises a plurality of microbiome data.

3. The non-transitory computer-readable medium of claim 1, wherein the subject entity is selected from the group consisting of: team, group, department, division, company, organization or multi-entity organization.

4. The non-transitory computer-readable medium of claim 1, wherein the subject entity situation summary comprises a context frame, and wherein the operations further comprise:
    developing a prioritized context frame that comprises of the identified components of context that meet the impact cutoff and node depth criteria specified by the user; and
    providing one or more applications that use the prioritized context frame to adapt to and manage a performance situation for the subject entity, wherein the one or more applications are selected from the group consisting of: benefit plan analysis, customization, database, display, exchange, forecast, metric development, optimization, planning, profile development, review, rule development, summary, sustainability forecast and wellness program optimization.

5. The non-transitory computer-readable medium of claim 1, wherein the search request is received from a browser.

6. The non-transitory computer-readable medium of claim 1, wherein the relevance measure is selected from the group consisting of: cover density rankings, vector space model measurements, okapi similarity measurements, three level relevance scores and hypertext induced topic selection algorithm scores, and wherein reinforcement learning determines which relevance measure is selected.

7. The non-transitory computer-readable medium of claim 1, wherein the search request comprises one or more keywords or a question, wherein the search request is received from a natural language interface or an anticipated need for data automatically initiates the search request.

8. The non-transitory computer-readable medium of claim 1, wherein the one or more context layers are stored in a database that automatically captures and incorporates any changes in a performance situation of the subject entity.

9. The non-transitory computer-readable medium of claim 1, wherein the computing device comprises at least one processor in a computer, at least one processor in a mobile access device or a combination thereof.

10. The non-transitory computer-readable medium of claim 1, wherein the linear or nonlinear regression model is developed using automated learning, and wherein the automated learning comprises:
    completing a multi-stage process, wherein each stage of the multi-stage process comprises an automated selection of an output from a plurality of outputs produced by a plurality of modeling algorithms after processing at least part of the data, wherein linearity of the linear or nonlinear regression model is determined by learning from the data, and wherein the plurality of modeling algorithms are selected from the group consisting of: neural network; classification and regression tree; generalized autoregressive conditional heteroskedasticity; projection pursuit regression; generalized additive model; linear regression, path analysis; Bayesian; multivariate adaptive regression spline and support vector method.

11. A method, comprising:
    using a computer and a mobile access device to complete processing comprising:
    obtaining a subject entity definition of a subject entity, a node depth criteria and an impact cutoff criteria;
    aggregating and preparing a plurality of data items that include data related to the subject entity for processing, wherein the data comprises at least one entity function, one or more entity function measures and a creation date for each of the plurality of data items;
    storing the aggregated plurality of data items in one or more context layers by a component of context;
    developing a subject entity situation summary by analyzing the subject entity related data, wherein the summary comprises a linear or nonlinear regression model of each of the one or more entity function measures, a relevance for each of the measures and one or more of the context layers;
    using the subject entity situation summary, the node depth criteria and the impact cutoff criteria to identify components of context to include in a composite index;
    creating a composite index for the data associated with the identified components of context, wherein the composite index comprises a column for the creation dates of the plurality of data items, a column for each of the identified components of context and a ranking for each of the plurality of data items of the composite index;
    receiving a search request; and
    providing a plurality of search results in response to the search request, wherein the plurality of search results are prioritized using a weight comprised of a mathematical combination of an index position ranking and a ranking provided by a relevance measure, wherein the subject entity physically exists, and wherein the subject entity situation summary supports a graphical display of a relative contribution of one or more drivers to the one or more entity function measures.

12. The method of claim 11, wherein the plurality of search results comprise a plurality of health related data, wherein the health related data comprises a plurality of microbiome data.

13. The method of claim 11, wherein the one or more context layers are selected from the group consisting of: Physical, Tactical, Organization, Social Environment and combinations thereof when the subject entity is selected from the group consisting of team, group, department, division, company, organization or multi-entity organization and has a single financial or a single non-financial function, and wherein the one or more context layers are selected from the group consisting of: Element, Environment, Resource, Reference Frame, Relationship, Transaction and combinations thereof when the subject entity is selected from the group consisting of team, group, department, division, company, organization or multi-entity organization and has two or more functions and when the subject entity is not a member of the group consisting of team, group, department, division, company, organization or multi-entity organization.

14. The method of claim 11, wherein the subject entity situation summary comprises a context frame and wherein the method further comprises:
    developing a prioritized context frame that comprises the identified components of context that meet the impact cutoff and node depth criteria; and
    providing one or more applications that use the prioritized context frame to adapt to and manage a performance situation for the subject entity, wherein the one or more applications are selected from the group consisting of: benefit plan analysis, customization, database, display, exchange, forecast, metric development, optimization, planning, profile development, review, rule development, summary, sustainability forecast and wellness program optimization.

15. The method of claim 11, wherein the search request is received from a browser.

16. The method of claim 11, wherein the relevance measure is selected from the group consisting of: cover density rankings, vector space model measurements, okapi similarity measurements, three level relevance scores and hypertext induced topic selection algorithm scores, and wherein reinforcement learning determines which relevance measure is selected.

17. The method of claim 11, wherein the search request comprises one or more keywords or a question, and wherein the search request is received from a natural language interface or an anticipated need for data automatically initiates the search request.

18. The method of claim 11, wherein the one or more context layers are stored in a database that automatically captures and incorporates any changes in a performance situation of the subject entity.

19. A system, comprising:
    a computing device and a storage device having computer-executable instructions stored therein which, if executed by the computing device, cause the computing device to perform operations comprising:
    obtaining a subject entity definition of a subject entity, a node depth criteria and an impact cutoff criteria;
    aggregating and preparing a plurality of data items that include data related to the subject entity for processing, wherein the data comprises at least one entity function, one or more entity function measures and a creation date for each of the plurality of data items;

storing the aggregated plurality of data items in one or more context layers by a component of context;

developing a subject entity situation summary by analyzing the subject entity related data, wherein the subject entity situation summary comprises a linear or nonlinear regression model of each of the one or more entity function measures, a relevance for each of the measures and one or more of the context layers;

using the subject entity situation summary, the node depth criteria and the impact cutoff criteria to identify components of context to include in a composite index;

creating a composite index for the data associated with the identified components of context, wherein the composite index comprises a column for the creation dates of the plurality of data items, a column for each of the identified components of context and a ranking for each of the plurality of data items of the composite index;

receiving a search request from a mobile access device, and providing a plurality of search results in response to the search request, wherein the plurality of search results are prioritized using a weight comprised of a mathematical combination of an index position ranking and a ranking provided by a relevance measure, and wherein at least part of the data and the search request are obtained from a mobile device.

20. The system of claim 19, wherein the linear or nonlinear regression model is developed using automated learning, and wherein the automated learning comprises:

completing a multi-stage process, wherein each stage of the multi-stage process comprises an automated selection of an output from a plurality of outputs produced by a plurality of modeling algorithms after processing at least part of the data, wherein linearity of the linear or nonlinear regression model is determined by learning from the data, and wherein the plurality of modeling algorithms are selected from the group consisting of: neural network; classification and regression tree; generalized autoregressive conditional heteroskedasticity; projection pursuit regression; generalized additive model; linear regression, path analysis; Bayesian; multivariate adaptive regression spline and support vector method.

21. The system of claim 19, wherein the plurality of search results comprise a plurality of health related data, and wherein the health related data comprises a plurality of microbiome data.

22. The system of claim 19, wherein the subject entity is selected from the group consisting of: team, group, department, division, company, organization or multi-entity organization.

23. The system of claim 19, wherein the subject entity situation summary comprises a context frame, and wherein the operations further comprise:

developing a prioritized context frame that comprises the identified components of context that meet the impact cutoff and node depth criteria; and providing one or more applications that use the prioritized context frame to adapt to and manage a performance situation for the subject entity, wherein the one or more applications are selected from the group consisting of: benefit plan analysis, customization, database, display, exchange, forecast, metric development, optimization, planning, profile development, review, rule development, summary, sustainability forecast and wellness program optimization.

24. The system of claim 19, wherein the search request is received from a browser.

25. The system of claim 19, wherein the relevance measure is selected from the group consisting of: cover density rankings, vector space model measurements, okapi similarity measurements, three level relevance scores and hypertext induced topic selection algorithm scores, and wherein reinforcement learning determines which relevance measure is selected.

26. The system of claim 19, wherein the search request comprises one or more keywords or a question, and wherein the search request is received from a natural language interface or an anticipated need for data automatically initiates the search request.

27. The system of claim 19, wherein the one or more context layers are stored in a database that automatically captures and incorporates any changes in a performance situation of the subject entity.

28. The system of claim 19, wherein the computing device includes at least one processor in a mobile access device or a combination thereof.

* * * * *